(12) United States Patent
Icho et al.

(10) Patent No.: US 7,971,233 B2
(45) Date of Patent: Jun. 28, 2011

(54) COMMUNICATION DEVICE, COMMUNICATION METHOD, COMMUNICATION PROGRAM, STORAGE MEDIUM THEREOF, AND INTEGRATED CIRCUIT

(75) Inventors: Keiji Icho, Osaka (JP); Noriaki Horii, Osaka (JP); Masayuki Misaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 866 days.

(21) Appl. No.: 11/915,108

(22) PCT Filed: May 23, 2006

(86) PCT No.: PCT/JP2006/310244
§ 371 (c)(1),
(2), (4) Date: Nov. 20, 2007

(87) PCT Pub. No.: WO2006/126537
PCT Pub. Date: Nov. 30, 2006

(65) Prior Publication Data
US 2009/0077633 A1 Mar. 19, 2009

(30) Foreign Application Priority Data

May 23, 2005 (JP) ................................ 2005-149687
May 23, 2005 (JP) ................................ 2005-149688
May 23, 2005 (JP) ................................ 2005-149689

(51) Int. Cl.
*G06F 7/04* (2006.01)
*G06F 15/16* (2006.01)
*G06F 17/30* (2006.01)
*H04L 29/06* (2006.01)

(52) U.S. Cl. ............................................. 726/3; 726/31
(58) Field of Classification Search .................. 726/3, 5, 726/31
See application file for complete search history.

(56) References Cited

U.S. PATENT DOCUMENTS

| 7,284,202 | B1 * | 10/2007 | Zenith ........................... 715/744 |
| 7,373,318 | B2 * | 5/2008 | Kutsumi et al. .............. 705/26.7 |
| 7,387,254 | B2 * | 6/2008 | Saito ........................ 235/472.01 |
| 7,577,645 | B2 * | 8/2009 | Yamamoto et al. ................... 1/1 |
| 7,587,382 | B2 * | 9/2009 | Yamamoto et al. ................... 1/1 |
| 7,707,283 | B2 * | 4/2010 | Tsunoda et al. .............. 709/224 |

(Continued)

FOREIGN PATENT DOCUMENTS

JP 10-257405 9/1998

(Continued)

OTHER PUBLICATIONS

International Search Report issued Aug. 29, 2006 in the International Application No. PCT/JP2006/310244.

*Primary Examiner* — David Garcia Cervetti
(74) *Attorney, Agent, or Firm* — Wenderoth, Lind & Ponack, L.L.P.

(57) ABSTRACT

A communication device sends content or content identification information to another communication device and receives content or content identification information from another communication device. The communication device includes an evaluation value calculation unit that calculates an evaluation value; an evaluation value data receiving unit that receives the evaluation value from each of other communication devices aside from the terminal itself; a ranking processing portion that ranks the evaluation values of the terminal itself and the other communication devices, and generates an evaluation value ranking; and a user input/output accepting portion that presents the evaluation value ranking to the user of the terminal itself.

16 Claims, 39 Drawing Sheets

U.S. PATENT DOCUMENTS

| | | |
|---|---|---|
| 7,747,468 B2 * | 6/2010 | Ji et al. .................. 705/26 |
| 2003/0058866 A1 * | 3/2003 | Kitayama .................. 370/394 |
| 2003/0217007 A1 * | 11/2003 | Fukushima et al. .......... 705/51 |
| 2004/0049779 A1 * | 3/2004 | Sjoblom et al. ............ 725/13 |
| 2004/0221018 A1 * | 11/2004 | Ji .......................... 709/217 |
| 2004/0255326 A1 * | 12/2004 | Hicks et al. .............. 725/81 |
| 2005/0086694 A1 * | 4/2005 | Hicks et al. .............. 725/79 |
| 2005/0251411 A1 * | 11/2005 | Ishii et al. ............... 705/1 |
| 2006/0161950 A1 * | 7/2006 | Imai et al. ............... 725/46 |
| 2006/0173838 A1 * | 8/2006 | Garg et al. ............... 707/5 |
| 2006/0242259 A1 * | 10/2006 | Vallabh et al. ............ 709/217 |
| 2007/0201822 A1 * | 8/2007 | Kusunoki et al. .......... 386/83 |
| 2007/0209049 A1 * | 9/2007 | Kelly et al. .............. 725/53 |

FOREIGN PATENT DOCUMENTS

| | | |
|---|---|---|
| JP | 2002-342370 | 11/2002 |
| JP | 2003-186904 | 7/2003 |
| JP | 2003-216521 | 7/2003 |
| JP | 2003-348565 | 12/2003 |
| JP | 2004-173252 | 6/2004 |
| JP | 2004-207897 | 7/2004 |
| JP | 2006-309660 | 11/2006 |

* cited by examiner

| Introducer ID | ID of Viewer that Sent Viewing Results | Content ID | Viewing Results (Viewed "Yes", Not Viewed "No") |
|---|---|---|---|
| Communication Device (Introducer) A | Communication Device (Viewer) a | Content α | Yes |
| | Communication Device (Viewer) b | Content α | No |
| | Communication Device (Viewer) c | Content β | Yes |
| | ⋮ | ⋮ | ⋮ |

Fig. 3

| Viewer ID |
|---|
| Communication Device (Viewer) a |
| Communication Device (Viewer) b |
| Communication Device (Viewer) c |
| ⋮ |

} Number of Introduction Authorizations

Fig. 4

| Introducer ID | Introducer Evaluation Value |
|---|---|
| Communication Device (Introducer) A | 70 |
| Communication Device (Introducer) B | 100 |
| Communication Device (Introducer) C | 50 |
| ⋮ | ⋮ |

*Fig. 5*

| Content ID | Introducer ID | Number of Introductions |
|---|---|---|
| Content α | Communication Device (Introducer) A | 2 |
| | Communication Device (Introducer) B | 3 |
| | Communication Device (Introducer) C | 1 |
| Content β | Communication Device (Introducer) D | 5 |
| | Communication Device (Introducer) E | 1 |
| ⋮ | ⋮ | ⋮ |

*Fig. 6*

| Content ID | Content Evaluation Value |
|---|---|
| Content α | 220 |
| Content β | 400 |
| Content γ | 300 |
| ⋮ | ⋮ |

Fig. 7

| Introducer ID | Content ID | ID of Viewer that Sent Viewing Results | Viewing Results (Viewed "Yes", Not Viewed "No") |
|---|---|---|---|
| Communication Device (Introducer) A | Content α | Communication Device (Viewer) a | Yes |
| | | Communication Device (Viewer) b | No |
| | | ⋮ | ⋮ |
| | Content β | Communication Device (Viewer) a | Yes |
| | ⋮ | ⋮ | ⋮ |

Fig. 8

| Content ID | Introducer ID | Number of Views |
|---|---|---|
| Content α | Communication Device (Introducer) A | 45 |
| | Communication Device (Introducer) B | 60 |
| | Communication Device (Introducer) C | 15 |
| Content β | Communication Device (Introducer) D | 20 |
| | Communication Device (Introducer) E | 10 |
| ⋮ | ⋮ | |

*Fig. 9*

| Rank | Introducer ID | Introducer Evaluation Value |
|---|---|---|
| 1 | Communication Device (Introducer) B | 100 |
| 2 | Communication Device (Introducer) D | 75 |
| 3 | | |
| ⋮ | ⋮ | ⋮ |

*Fig. 10*

| Rank | Content ID | Content Evaluation Value |
|---|---|---|
| 1 | Content $\alpha$ | 500 |
| 2 | Content $\beta$ | 400 |
| 3 | Content $\gamma$ | 300 |
| ⋮ | ⋮ | ⋮ |

*Fig. 11*

| Content Introducer ID | ID of Viewer that Sent Viewing Results | Content ID | Viewing Results (Viewed "Yes", Not Viewed "No") | |
|---|---|---|---|---|
| Communication Device (Introducer) A | Communication Device (Viewer) a | Content α | Yes | ⎫ Communication Device (Introducer) A Introducer Evaluation Value Calculation |
| Communication Device (Introducer) A | Communication Device (Viewer) b | Content α | Yes | |
| Communication Device (Introducer) A | Communication Device (Viewer) c | Content β | No | |
| ⋮ | ⋮ | ⋮ | ⋮ | ⎭ |
| Communication Device (Introducer) B | Communication Device (Viewer) a | Content β | Yes | ⎫ Communication Device (Introducer) B Introducer Evaluation Value Calculation |
| Communication Device (Introducer) B | Communication Device (Viewer) c | Content α | No | |
| ⋮ | ⋮ | ⋮ | ⋮ | |
| | | | | ⎭ |
| Communication Device (Introducer) C | Communication Device (Viewer) e | Content β | No | ⎫ Communication Device (Introducer) C Introducer Evaluation Value Calculation |
| ⋮ | ⋮ | ⋮ | ⋮ | ⎭ |

*Fig. 21*

| Introducer ID | Introducer Evaluation Value |
|---|---|
| Communication Device (Introducer) A | 60 |
| Communication Device (Introducer) B | 75 |
| Communication Device (Introducer) C | 55 |
| ⋮ | ⋮ |

*Fig. 22*

| Content ID | Introducer ID | Number of Introductions |
|---|---|---|
| Content α | Communication Device (Introducer) A | 2 |
| | Communication Device (Introducer) B | 3 |
| | Communication Device (Introducer) C | 1 |
| Content β | Communication Device (Introducer) D | 5 |
| | Communication Device (Introducer) E | 1 |
| ⋮ | ⋮ | ⋮ |

Fig. 23

| Rank | Introducer ID | Introducer Evaluation Value |
|---|---|---|
| 1 | Communication Device (Introducer) D | 80 |
| 2 | Communication Device (Introducer) B | 75 |
| 3 | | |
| ⋮ | ⋮ | ⋮ |

Fig. 24

| Rank | Content ID | Content Evaluation Value |
|---|---|---|
| 1 | Content $\alpha$ | 500 |
| 2 | Content $\beta$ | 400 |
| 3 | Content $\gamma$ | 300 |
| ⋮ | ⋮ | ⋮ |

Fig. 25

| Content ID | ID of Viewer that Sent Viewing Results | Viewing Results (Viewed "Yes", Not Viewed "No") |
|---|---|---|
| Content α | Communication Device D | Yes |
| | Communication Device E | No |
| | Communication Device B | Yes |
| | ⋮ | ⋮ |
| Content β | Communication Device E | No |
| | Communication Device F | Yes |
| ⋮ | ⋮ | ⋮ |

} Total Number of Introductions of Content

*Fig. 34*

| Content ID | Primary Introduction Destination | Viewing Results | Secondary Introduction Destination | Viewing Results | Tertiary Introduction Destination | Viewing Results |
|---|---|---|---|---|---|---|
| Content α | Communication Device B1 | Yes | Communication Device C11 | Yes | Communication Device D111 | Yes |
| | | | | | Communication Device D112 | Yes |
| | | | | | Communication Device D113 | Yes |
| | | | | | Communication Device D114 | No |
| | | | | | Communication Device D115 | No |
| | | | Communication Device C12 | Yes | Communication Device D121 | Yes |
| | | | | | Communication Device D122 | No |
| | Communication Device B2 | Yes | Communication Device C21 | Yes | Communication Device D211 | Yes |
| | | | | | Communication Device D212 | No |
| | | | | | Communication Device D213 | No |
| | | | Communication Device C22 | No | | |
| | Communication Device B3 | No | | | | |
| Content β | Communication Device E1 | Yes | | | | |
| | Communication Device E2 | No | | | | |

*Fig. 35*

| Introducer ID | Introducer Evaluation Value |
|---|---|
| Communication Device A | 70 |
| Communication Device B | 100 |
| Communication Device C | 50 |
| ⋮ | ⋮ |

Fig. 36

| Content ID | Introducer ID | Number of Introductions |
|---|---|---|
| Content α | Communication Device A | 2 |
| | Communication Device B | 3 |
| | Communication Device C | 1 |
| Content β | Communication Device A | 5 |
| | Communication Device B | 1 |
| ⋮ | ⋮ | ⋮ |

Fig. 37

| Content ID | Content Evaluation Value |
|---|---|
| Content α | 220 |
| Content β | 400 |
| Content γ | 300 |
| ⋮ | ⋮ |

*Fig. 38*

| Rank | Introducer ID | Introducer Evaluation Value |
|---|---|---|
| 1 | Communication Device B | 100 |
| 2 | Communication Device D | 80 |
| 3 | Communication Device A | 70 |
| ⋮ | ⋮ | ⋮ |

*Fig. 39*

| Rank | Content ID | Content Evaluation Value |
|---|---|---|
| 1 | Content $\alpha$ | 500 |
| 2 | Content $\beta$ | 400 |
| 3 | Content $\gamma$ | 300 |
| ⋮ | ⋮ | ⋮ |

*Fig. 40*

COMMUNICATION DEVICE, COMMUNICATION METHOD, COMMUNICATION PROGRAM, STORAGE MEDIUM THEREOF, AND INTEGRATED CIRCUIT

TECHNICAL FIELD

The present invention relates to a communication device, a communication method, a communication program, a storage medium thereof, and an integrated circuit.

BACKGROUND ART

At present, a broadcasting station or the like provides a viewer with various content, and a technique whereby content optimal to a viewer from among various content is under research. Patent Document 1 discloses a technique whereby content selected in accordance with the viewer's past viewing history is selected and recommended to the viewer. The program selection device of Patent Document 1 calculates the viewer's preferences based on information of the viewer switching from viewing one content to viewing a different content. The content selected in accordance with these preferences is then recommended to the viewer. Through this, the viewer can receive content recommendations that reflect his/her own preferences, decreasing the chance of the viewer missing content she/he wishes to view.

Furthermore, Patent Document 2 discloses a scheme for introducing information of content recommended by one viewer to another viewer. Through such a scheme, a viewer receives introductions of content recommended by another person, thereby widening the range of content for that viewer.
[Patent Document 1] JP H10-257405A
[Patent Document 2] JP 2004-207897A However, with Patent Document 1, the introduction of content is carried out based on the viewing history of the viewer, such as the history of content selection and the history of recording performed by the viewer; thus, the range of introduced content tends to be gradually constrained. For example, assume that the viewer views only a specific piece of content, and does not view other pieces of content such as current events. In a case such as this, if the introduction is based on the viewing history of the viewer, the current event content will not be selected as content to be introduced to the viewer regardless of how topical the current event content is. Therefore, only the same types of content are recommended, narrowing the range of content viewed by the viewer.

Furthermore, with Patent Document 2, although the range of content expands through the reception of content introductions from other people, the viewer can only accept content provided from the other people in a one-sided manner. In other words, the viewer has no choice regarding the selection of the introducer that recommends content. Moreover, there is no useful information provided for the viewer to select the introducer. Further still, there is no useful information for the viewer to select the content, such as whether or not the introduced content is current, whether it is topical, and so on.

Accordingly, it is an object of the present invention to provide a technique whereby it is possible to provide information for selecting the content and the introducer thereof.

SUMMARY OF THE INVENTION

To solve the abovementioned problems, a first invention of the present application is a communication device comprising a sending/receiving unit operable to send content or content identification information to another communication device, or operable to receive content or content identification information from another communication device; an evaluation value calculation unit operable to calculate an evaluation value based on an evaluation element for evaluating a value of a content introducer and/or content; an evaluation value receiving unit operable to receive the evaluation value from each of other communication devices aside from a terminal itself, a ranking generation unit operable to rank the evaluation values of the terminal itself and the other communication devices, and generate an evaluation value ranking; and a presentation unit operable to present the evaluation value ranking to a user of the terminal itself.

The communication device calculates evaluation a value of itself as a content introducer and of content, and receives evaluation values of other communication devices. The communication device then ranks the content introducer evaluation values and the content evaluation values, generates an introducer evaluation value ranking and a content evaluation value ranking, and presents these to the user of the terminal itself. The following can be given as examples of evaluation elements, which are elements used to calculate the evaluation values: the number of introduction authorizations the communication device has received; the number of content introductions performed by the communication device; the number of views that content introduced by the communication device has been viewed in communication devices to which the content has been introduced; the number of re-introductions; and so on. Note that although the communication device can send/receive content identification information for identifying the content, the descriptions below assume that content is sent/received.

Here, the user of a communication device can grasp which communication device has a high introducer evaluation value, or in other words, the rank of the communication device among all of the communication devices, based on the presented introducer evaluation value ranking. Accordingly, the user of a communication device can obtain information regarding the selection of introducers; for example, the user can select the communication device having the highest introducer evaluation value as the introducer. Here, the possibility of receiving highly useful content increases when a communication device having a high introducer evaluation value is selected. In addition, the user of the communication device can use the introducer evaluation value ranking as information for determining whether or to view the content, such as determining whether or not to view the introduced content, by referring to the introducer evaluation value ranking. For example, the user can use the introducer evaluation value ranking as a basis for selection of the content, whereby she/he views the content in the case where the content has been introduced by a communication device positioned higher in the introducer evaluation value ranking but does not view the content in the case where the introducer evaluation value rank is lower. Further still, the introducer evaluation value ranking can also be used as a basis for selection of the content in the case where the communication device introduces the content by itself. For example, the user of a communication device can select the content introduced by a communication device that has a high introducer evaluation value as the content to introduce by itself, from among the content received from the other communication devices.

On the other hand, the user of the communication device can grasp which content has a high content evaluation value, or in other words, the rank of the content among all the content, based on the presented content evaluation value ranking. Accordingly, the user of the communication device can obtain information regarding the selection of content, such as that an introduced content is selected for viewing when the rank of that content is higher and so on. Here, the possibility that the user can receive highly useful content increases when content having a high content evaluation value is selected. Additionally, in the case where a communication device introduces the content by itself, it is possible to obtain information regarding the selection of the content to introduce; i.e. content that has a high content evaluation value can be selected as the content to introduce to other communication devices.

In the above first invention, the evaluation value ranking is presented to the user of the terminal itself, however, a ranking sending unit may further be included in the communication device, and the ranking sending unit may send the evaluation value ranking to the other communication devices.

A second invention of the present application is the communication device according to the first invention, wherein the evaluation element include an introducer evaluation element for evaluating the value of the content introducer or a content evaluation element for evaluating the value of the content; the evaluation value includes an introducer evaluation value calculated based on the introducer evaluation element and a content evaluation value calculated based on the content evaluation element; and the evaluation value ranking includes an introducer evaluation value ranking that is the result of ranking the introducer evaluation value and a content evaluation value ranking that is the result of ranking the content evaluation values.

In the same manner as the stated first invention, the user of the communication device can select the content she/he will view, the communication device that receives a content introduction and so on, based on the introducer evaluation value ranking and content evaluation value ranking.

A third invention of the present application is the communication device of the first invention, further comprising: an introduction authorization receiving unit operable to receive an introduction authorization authorizing sending of the content or the content identification information from any one of the other communication devices, wherein the sending/receiving unit introduces the content to the communication device that is the source of the introduction authorization; and the evaluation element is the number of the introduction authorizations received by the introduction authorization receiving unit.

The user of the communication device can select the communication device to receive the introduction of content by sending an introduction authorization. Accordingly, it is possible to avoid content being sent from a specific communication device in a one-sided manner while reflecting which communication device the user of a communication device intends for the content to be received from. The range of content that is viewed tends to be constrained in the case where content introductions are received with the range of content being limited in advance. However, by limiting the communication devices that are introduced through the use of introduction authorizations, it is possible to prevent the content from being constrained more than in the case where the range itself of the content is directly limited. In addition, the communication device that introduces content may send the content to the source of the introduction authorization; therefore, wasteful sending of content to communication devices for which the content introduction has not been authorized is not carried out.

Furthermore, the evaluation element is the number of introduction authorizations, and the introducer evaluation value and content evaluation value are calculated based on the number of introduction authorizations. Here, for example, a higher number of introduction authorizations means that the introduction of content is being requested by a higher number of communication devices, and thus the evaluation value as an introducer is ranked higher. Therefore, by being presented with an introducer evaluation value ranking ranked in order from a high number of introduction authorizations, the user can grasp which communication device has a high evaluation value as an introducer. Additionally, it is possible to use an introducer evaluation value calculated based on the number of introduction authorizations as the evaluation element of content. For example, in the case where the introducer evaluation value based on the number of introduction authorizations is high for the communication device that is the source of the introduction of the content, the content evaluation value of the content introduced by that communication device is ranked higher. Therefore, by being presented with the content evaluation value ranking based on the number of introduction authorizations, the user can grasp which content has a high content evaluation value.

A fourth invention of the present application is the communication device according to the first invention, wherein the evaluation element is the number of introductions of the content or the content identification information.

For example, a higher number of introductions means that the introduction of content is being requested by a higher number of communication devices, and thus the evaluation value as an introducer is ranked higher. Therefore, the user can grasp which communication device has a high evaluation value as an introducer based on the introducer evaluation value ranking ranked in order from a high number of introductions. Furthermore, a high number of introductions for a certain content means that that content is being introduced to a high number of communication devices, and thus the content evaluation value of that content is ranked higher. Accordingly, by receiving the content evaluation value ranking ranked based on the number of introductions, the user of the communication device can grasp the overall rank of the introduced content.

A fifth invention of the present application is the communication device according to the first invention, wherein the evaluation element is the number of pieces of content aside from the introduced content or the number of views of content aside from the introduced content.

A large number of introductions of content aside from the introduced content means that the introduced content has been selected and introduced from among a larger pool of content and therefore the content evaluation value is ranked higher. A large number of views of other content means that the introduced content has been more stringently selected and therefore the content evaluation value is ranked higher.

A sixth invention of the present application is the communication device according to the first invention, further comprising a viewing result receiving unit operable to receive, from the communication device to which the content has been introduced, a viewing result indicating whether or not the user of the communication device to which the content has been introduced has viewed the content introduced by the terminal itself or the content corresponding to the content identification information introduced by the terminal itself, wherein the evaluation element is the viewing result.

The number of times content has been viewed by the user of a communication device, the ratio of the number of views to the number of introductions, and so on can be given as examples of the viewing results. Here, for example, the higher the total number of times the user of a communication device has viewed introduced content is, the higher the introducer evaluation value of the communication device is ranked. The user of a communication device can obtain information regarding the selection of introducers, such as which communication device has a high introducer evaluation value, through the introducer evaluation value ranking based on the viewing results. Also, for example, the content evaluation value is ranked higher the greater the number of views of the content. The user of a communication device can obtain information regarding the selection of content, such as which content has a high content evaluation value, through the content evaluation value ranking, based on the viewing results.

Note that the ratio of the number of views can also be used in the evaluation of the introducer evaluation values and content evaluation values, in the same manner; through this, information regarding the selection of introducers and content can be obtained. Also note that in the case where the ratio of the number of views is used as an evaluation element, the introducer evaluation value is ranked high if the ratio of views to introductions is high, even if the number of times the user of the communication device viewed the content is low. The communication device can calculate its own introducer evaluation value in an objective manner by using such an evaluation element.

A seventh invention of the present application is the communication device according to the sixth invention, wherein the viewing result is the number of times the content introduced by the terminal itself or the content corresponding to the content identification information introduced by the terminal itself has been viewed by the user of the communication device to which the content was introduced, or the ratio of the number of views to the number of introductions of the content or of the content identification information performed by the terminal itself This invention has the same effects as the stated sixth invention.

An eighth invention of the present application is the communication device according to the first invention, further comprising a viewing result receiving unit operable to receive, from the communication device to which the content was directly introduced, a viewing result indicating whether or not the content has been viewed by the user of a communication device subsequent to the communication device to which the content was directly introduced, or an introducer evaluation value of the communication device to which the content was introduced calculated based on the viewing result, in addition to the viewing result indicating whether or not the user of the communication device to which the content was directly introduced has viewed the content introduced by the terminal itself or the content corresponding to the content identification information introduced by the terminal itself, wherein the evaluation element is the viewing result or the introducer evaluation value of the communication device to which the content was introduced.

The communication device not only receives the viewing results of a direct introduction destination, but also receives the viewing results of an introduction destination subsequent to the direct introduction destination or an introducer evaluation value of the communication device that is the introduction destination, the introducer evaluation value being calculated based on the viewing results of the direct introduction destination. By using the viewing results or the introducer evaluation value of the introduction destination as the evaluation element, it is possible to calculate the evaluation value with the spread and length of the introduction path factored in.

A ninth invention of the present application is the communication device of the first invention, further comprising: a specification accepting unit operable to accept a specification from the user that specifies the communication device that is to be the source of the introduction of the content or the content identification information; and a first introduction authorization sending unit operable to send, to the specified communication device, an introduction authorization authorizing the content or the content identification information to be sent to the terminal itself, wherein the sending/receiving unit receives the content or the content identification information from the communication device that is the destination of the introduction authorization.

The user of a communication device is able to accept an introduction of content from only communication devices she/he selects by sending an introduction authorization. For example, in the case where the user of a communication device is presented with an introducer evaluation value ranking, she/he can select the communication device having the highest introducer evaluation value as the introducer and receive an introduction of content from the selected communication device. Accordingly, the possibility of receiving highly useful content is increased while at the same time avoiding introductions of content from undesired communication devices.

A tenth invention of the present application is the communication device according to the first invention, wherein the sending/receiving unit further receives introduction information in which the content identification information of the received content, introducer identification information for identifying the communication device that sent the content, and an introduction history of the content spanning up until when the content was sent to the introduction device that sent the content, are associated with one another; and the evaluation element is the introduction history.

The user of a communication device is the viewer that, for example, receives an introduction of content and views that content. In addition, the format in which content is introduced includes a situation in which a viewer that received content introduces the content to another viewer. The stated communication device receives introduction information and extracts introducer identification information of the communication device with which it directly communicated and an introduction history from the introduction information. Through this, the viewer, who is the user of the communication device, can grasp the transfer history of the content.

For example, content is sent from a third communication device to a second communication device, and is further sent from a second communication device to a first communication device. At this time, a fourth communication device receives first introduction information from the first communication device, which is the introducer. The first introduction information includes a content ID and the ID of the first communication device, which sent the content, and also includes the IDs of the third and second communication devices as an introduction history spanning up until the content was sent to the first communication device. Accordingly, the communication device obtains information indicating that the content was sent through the third, second, and first communication devices. In this manner, the viewer can obtain an introduction history as information regarding the selection of an introducer. Accordingly, the degree of freedom that the viewer has regarding the selection of communication devices as introducers is increased; the viewer can, for example, perform a setting so that the content is received directly from the communication device that is the source of the sent content, which is, in this case, the third communication device.

Furthermore, because the introduction history is information regarding which communication device was involved in the introduction of the content, the viewer can obtain introducer information indicating the competence of a communication device as an introducer. In other words, because introducer information of no relevance to the introduction of content is not obtained, introducer information of introducers that have the potential to introduce content that is highly useful to the viewer that received the content introduction can be obtained. In particular, in the case where the viewer of a received content evaluates the content as being interesting, the content will often be sent to other viewers and will spread out. Here, there are also cases where the evaluation value as an introducer that sends the content is determined by, for example, whether or not the device has sent content having high spread results. Accordingly, as content is transferred, the evaluation value of the original introducer that first sent that content rises. In such a case, when the viewer selects the original introducer of the content as the next introducer based on the introduction history, the chances of receiving content that is highly useful or interesting increase. In this manner, by presenting the introduction history, it is possible to present information regarding the selection of introducers to the user of the communication device, such as which communication device is introducing content with a high spread results, and so on.

Additionally, the degree of freedom regarding the viewing of content also increases; tor example, the viewer can refer to the introduction history to see what sort of sending history the introduced content has, and can determine whether or not to view the content based thereupon. Furthermore, the degree of freedom regarding the selection of content also increases in the case where the viewer that received the introduction history takes on the role of introducing content; for example, the viewer can select the content she/he will introduce with reference to the introduction history.

An eleventh invention of the present invention is the communication device according to the tenth invention, wherein the presentation unit further presents the introduction history to the user of the terminal itself.

By presenting the introduction history, the user of the communication device can select the content she/he will view, the communication device from which to receive a content introduction and so on, based not only on the introducer evaluation value ranking and content evaluation value ranking but also on the introduction history.

A twelfth invention of the present application is the communication device according to the tenth invention, further comprising a second introduction authorization sending unit operable to send, to the communication device that first sent the content or to any communication device in the introduction path leading up to where the content is introduced to the terminal itself, an introduction authorization authorizing the content to be sent to the terminal itself.

It is possible to refer to the introduction history, select the introducer that first sent the content, an introducer in the introduction path leading up to where the content is introduced to the terminal itself, and so on, and send an introduction authorization thereto.

A thirteenth invention of the present application is the communication device according to the tenth invention, wherein the sending/receiving unit receives the introduction information that has been sent/received among the other communication devices.

The viewer of a communication device can select an introducer and select content with reference to the introduction information received from another communication device.

A fourteenth invention of the present application is the communication device according to the thirteenth invention, wherein the presentation unit further presents, to the user of the terminal itself, the introduction information or an introduction path model obtained by integrating and diagramming the introduction information.

The viewer of a communication device can select an introducer and select content with reference to the introduction path model and so on received from another communication device.

A fifteenth invention of the present application is the communication device according to the fourteenth invention, further comprising a third introduction authorization sending unit operable to refer to the introduction information or the introduction path model and operable to send an introduction authorization authorizing the content to be sent to the terminal itself.

An introducer can be selected and an introduction authorization can be sent, with reference to the introduction path model and so on.

A sixteenth invention of the present application is the communication device according to the first invention, further comprising an introduction information generation unit operable to generate introduction information in which the content identification information of the content received by the sending/receiving unit, communication device identification information for identifying the communication device of the terminal itself, and an introduction history spanning up until when the received content was sent to the terminal itself, are associated with one another, wherein the sending/receiving unit sends the introduction information to the communication device to which the content is re-introduced.

When an introducer communication device re-introduces received content, the communication device, acting as an introducer, sends, along with the content, introducer identification indicating itself and an introduction history of the content spanning up until the content was introduced to itself, to the communication device to which the content is re-introduced. Through this, the communication device that receives the introduction history can grasp the transfer history of the content as information regarding the selection of introducers. At this time, the degree of freedom that the viewer has regarding the selection of communication devices as introducers is increased; the viewer can, for example, perform a setting so that the content is directly received from the communication device that is the source of the sent content.

A seventeenth aspect of the present invention is a communication method comprising: sending content or content identification information to another communication device, or receiving content or content identification information from another communication device; calculating an evaluation value based on an evaluation element for evaluating a value of a content introducer and/or a value of content; receiving the evaluation value from each of other communication devices aside from a terminal itself, ranking the evaluation values of the terminal itself and the other communication devices, and generating an evaluation value ranking; and presenting the evaluation value ranking to a user of the terminal itself.

An eighteenth aspect of the present invention is a communication program comprising: a sending/receiving unit operable to send content or content identification information to another communication device or operable to receive content or content identification information from another communication device; an evaluation value calculation unit operable to calculate an evaluation value based on an evaluation element for evaluating a value of a content introducer and/or a value of content; an evaluation value receiving unit operable to receive the evaluation value from each of other communication devices aside from a terminal itself; a ranking generation unit operable to rank the evaluation values of the terminal itself and the other communication devices, and generate an evaluation value ranking; and a presentation unit operable to present the evaluation value ranking to a user of the terminal itself.

A nineteenth invention of the present application is a computer-readable storage medium in which is stored a communication program executed by a computer, the communication program executing: a sending/receiving step of sending content or content identification information to another communication device or receiving content or content identification information from another communication device; an evaluation value calculation step of calculating an evaluation value based on an evaluation element for evaluating a value of a content introducer and/or a value of content; an evaluation value receiving step of receiving the evaluation value from each of other communication devices aside from a terminal itself; a ranking generation step of ranking the evaluation values of the terminal itself and the other communication devices, and generating an evaluation value ranking; and a presentation step of presenting the evaluation value ranking to a user of the terminal itself.

A twentieth invention of the present application is an integrated circuit comprising: a sending/receiving unit operable to send content or content identification information to another communication device or operable to receive content or content identification information from another communication device; an evaluation value calculation unit operable to calculate an evaluation value based on an evaluation element for evaluating a value of a content introducer and/or a value of content; an evaluation value receiving unit operable to receive the evaluation value from each of other communication devices aside from a terminal itself; a ranking generation unit operable to rank the evaluation values of the terminal itself and the other communication devices, and generate an evaluation value ranking; and a presentation unit operable to present the evaluation value ranking to the user of the terminal itself.

In the stated first invention, each communication device calculates an evaluation value; however, the evaluation elements for calculating the evaluation values may be collected in an integrating device, and the calculation and ranking of the evaluation values may be carried out by only the integrating device. For example, the integrating device is connected to plural communication devices that send/receive content, and includes the following:

a collection unit operable to collect evaluation elements for evaluating the value of a content introducer and/or content, from each of the plural communication devices;

an evaluation value calculation unit operable to calculate evaluation values based on the collected evaluation elements a ranking generation unit operable to rank the evaluation values and generate an evaluation value ranking a ranking sending unit operable to send the generated evaluation value ranking to the plural communication devices In the above descriptions, each communication device sends introducer evaluation elements for evaluating introducers and content evaluation elements for evaluating content to the integrating device. The integrating device calculates and ranks the respective introducer evaluation values and content evaluation values based on the introducer evaluation elements and content evaluation elements. The ranking results are sent to the communication devices and presented to the users. Accordingly, in the same manner as the stated first invention, the user can select the content she/he will view, the communication device that will be an introducer, and so on based on the introducer evaluation value ranking and content evaluation value ranking.

Furthermore, in the stated first invention, each communication device performs the evaluation value ranking; however, an integrating device connected to plural communication devices may perform the evaluation value ranking. For example, the integrating device is connected to a plurality of communication devices that send/receive content, and includes the following:

an evaluation value receiving unit operable to receive evaluation values calculated by each communication device;

a ranking generation unit operable to rank the evaluation values and generate an evaluation value ranking a ranking sending unit operable to send the generated evaluation value ranking to the plural communication devices Through this, in the same manner as the stated first invention, the user can select the content she/he will view, the communication device from which to receive a content introduction, and so on based on the introducer evaluation value ranking and content evaluation value ranking.

Finally, a communication system may be configured of the communication device of the stated first invention and the integrating device described above.

According to the present invention, the user of the communication device can obtain introducer evaluation value rankings and content evaluation value rankings as information for selecting the content and the introducer thereof.

BRIEF DESCRIPTION OF DRAWINGS

FIG. 3 is an example of viewing results in a communication device A.

FIG. 4 is an example of data within a viewer ID storage portion of a communication device.

FIG. 5 is an example of data in an introducer evaluation value storage portion.

FIG. 6 is an example of content introduction statuses.

FIG. 7 is an example of calculated content evaluation values.

FIG. 8 is an example of data in which the example of the viewing results shown in FIG. 3 has been arranged per content ID.

FIG. 9 is an example of the number of views the integrating device receives from the communication devices.

FIG. 10 is an example of an introducer evaluation value ranking.

FIG. 11 is an example of a content evaluation value ranking.

FIG. 21 is an example of data stored in a viewing result storage portion of an integrating device.

FIG. 22 is an example of data in an introducer evaluation value storage portion.

FIG. 23 is an example of data that makes up the content introduction status.

FIG. 24 is an example of an introducer evaluation value ranking.

FIG. 25 is an example of a content evaluation value ranking.

FIG. 34 is an example of data stored in a viewing result storage portion.

FIG. 35 is another example of data stored in a viewing result storage portion of an integrating device.

FIG. 36 is an example of introducer evaluation values.

FIG. 37 is an example of content introduction statuses.

FIG. 38 is an example of calculated content evaluation values.

FIG. 39 is an example of an introducer evaluation value ranking.

FIG. 40 is an example of a content evaluation value ranking.

DETAILED DESCRIPTION OF THE INVENTION

<Outline of the Invention>

A plurality of communication devices are connected via a network, and send/receive contents or content IDs to/from one another. A communication device on the receiving end of a content is considered the viewer, whereas a communication device on the sending end of the content is considered the introducer. Each communication device calculates an evaluation value as a content introducer (called an "introducer evaluation value" hereinafter) and an evaluation value of the content (called a "content evaluation value" hereinafter) based on evaluation elements for evaluating the value of the content introducer and/or the content. The communication device then ranks the introducer evaluation values and the content evaluation values and presents the ranking to the user.

The following can be given as examples of evaluation elements: the number of introduction authorizations each content introduction device has received; the number of content introductions performed by each content introduction device; the number of views that content introduced by each content introduction device has been viewed in the content receiving device; the source of the content introduction; and so on. For example, a large number of introduction authorizations means that content introductions have been requested from more content receiving devices and therefore the evaluation value as an introducer is ranked higher. Furthermore, for example, a large number of introductions means that the content has been introduced to more communication devices and therefore the content evaluation value is ranked higher.

Accordingly, the user of a communication device can obtain information regarding the selection of introducers; for example, the user can select the communication device having the highest introducer evaluation value based on an introducer evaluation value ranking. Furthermore, the viewer of the communication device can determine whether or not to view the received content by referring to the introducer evaluation value ranking, whether or not the content can be sent on to another communication device, and so on. Additionally, by receiving the content evaluation value ranking, the user of the communication device can obtain information regarding the selection of content, such as that an introduced content is selected for viewing when the rank of the content is high and so on.

First Embodiment (1) Configuration
(1-1) Overall Configuration

Figure 1:
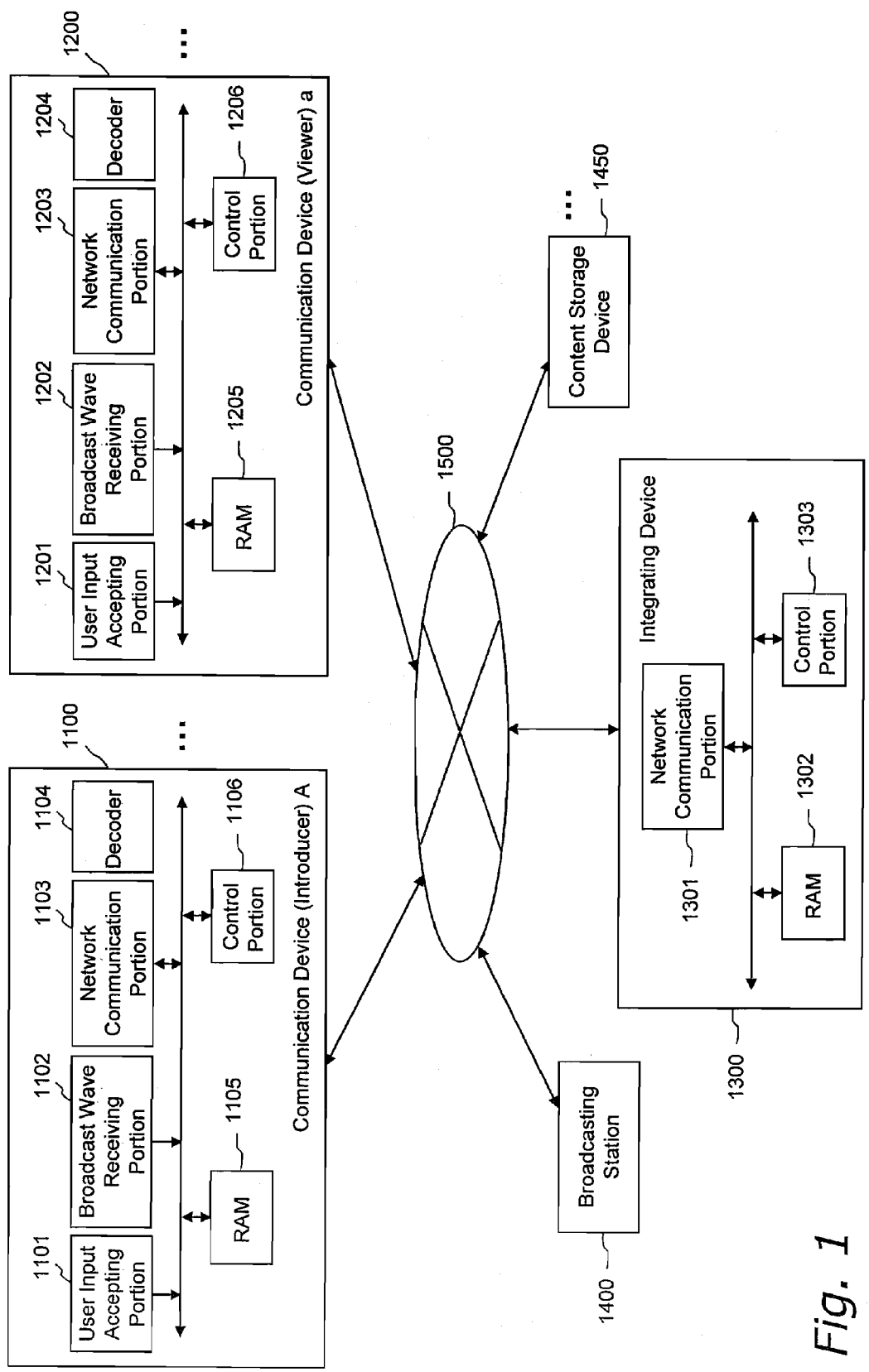
FIG. 1 is a diagram illustrating a network configuration of a content introduction system according to the first embodiment of the present invention.

FIG. 1 is a diagram illustrating a network configuration of a content introduction system according to the first embodiment of the present invention. A plurality of communication devices 1100 (communication devices A, B . . . ), a plurality of communication devices 1200 (communication devices a, b . . . ), an integrating device 1300, a broadcasting station 1400, and a content storage device 1450 are connected via a network 1500.

The communication device 1200 accepts instructions from the viewer regarding which communication device 1100 to receive an introduction of content or a content ID from. Here, "content" refers to video data, audio data, and the like, and includes, for example, data such as moving pictures, still pictures, audio, text, and the like. The "content ID" is identification information used to identify the content. Then, the communication device 1200 sends an introduction authorization authorizing the introduction of the content or the content ID to the corresponding communication device 1100. The communication device 1100 sends the content or the content ID specified by the introducer to the communication device 1200 that is the source of the introduction authorization. The communication device 1200 sends viewing results indicating whether or not the viewer has viewed the introduced content to the communication device 1100, which is the source of the content introduction. Each communication device 1100 calculates its own introducer evaluation value and the content evaluation values of each content it introduced, based on the received viewing results, and sends the resultant thereof to the integrating device 1300. The integrating device 1300 ranks the communication devices 1100 based on the introducer evaluation values, and ranks the content based on the content evaluation values. Then, the results of these rankings are sent to the communication device 1200. Through this, the viewer of the communication device 1200 receives an introducer evaluation value ranking as information regarding the selection of introducers, as well as a content evaluation value ranking as information regarding whether or not content has been selected as content to be viewed.

The broadcasting station 1400 distributes various content and the storage locations of the various content to the communication devices 1200, the communication devices 1100, and the content storage device 1450. The content storage device 1450 stores various content received from the broadcasting station 1400 and so on. Hereinafter, it is assumed that the communication device 1200 receives the storage location of content from the communication device 1100 and obtains the content by accessing the content storage device 1450, which is that storage location.

Note that the content is not limited to content distributed by the broadcasting station 1400; for example, content sent from various websites on the Internet may be used as well. The content may also be private content individually created by a user.

(1-2) Hardware Configuration

Each communication device 1100 and each communication device 1200 have hardware configurations including user input accepting portions 1101 and 1201, broadcast wave receiving portions 1102 and 1202, network communication portions 1103 and 1203, decoders 1104 and 1204, RAMs 1105 and 1205, and control portions 1106 and 1206. The integrating device 1300 includes a network communication portion 1301, a RAM 1302, and a control portion 1303.

The network communication portions 1103, 1203, and 1303 in the respective devices are, for example, modems, and carry out communication among the communication devices 1100, the communication devices 1200, the integrating device 1300, the content storage device 1450, and so on via a network. The RAMs 1105, 1205, and 1305 are memories that store various information used in the various processes performed by the respective devices. For example, the RAMs 1105 and 1205 of each of the communication devices 1100 and communication devices 1200 store the storage location of content. The control portions 1106, 1206, and 1306 of each of the devices are, for example CPUs, and execute various processes in each of the devices.

The user input accepting portions 1101 and 1201 are, for example, remote controllers or keyboards, and accept various input from the user. The broadcast wave receiving portions 1102 and 1202 receive content or the storage location of content from the broadcasting station 1400 or the like. The decoders 1104 and 1204 include, for example, AV decoders (not shown) that decode video data and audio data of the content, GUI generation portions (not shown) that generate GUIs for displaying options and the like, and so on.

(2) Outline of Processing

Figure 2:
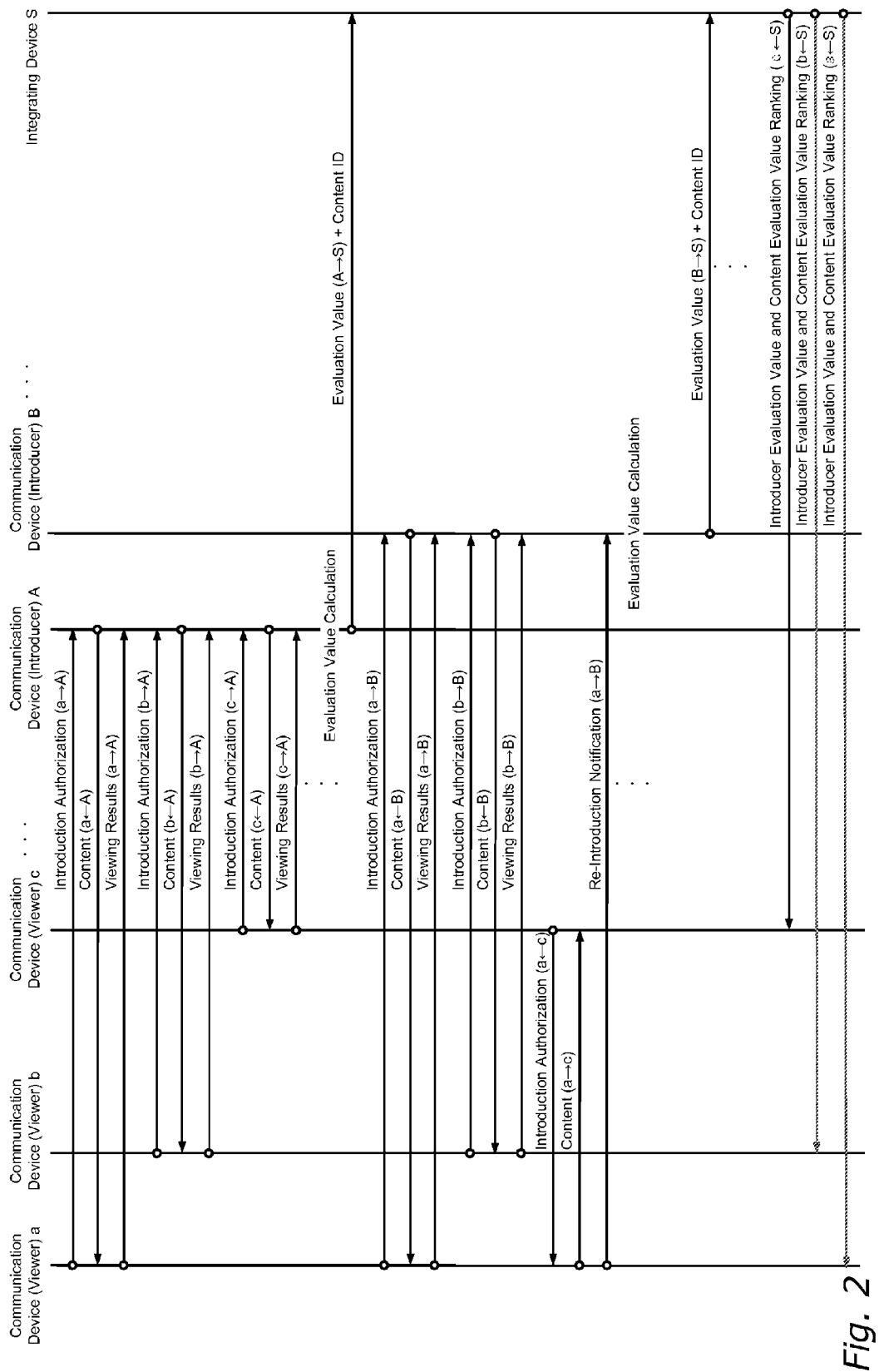
FIG. 2 is an outline of processing performed by the content introduction system according to the first embodiment of the present invention.

FIG. 2 is a diagram illustrating an outline of processing performed in the content introduction system according to the first embodiment of the present invention. Hereinafter, the processing performed among the communication devices A and B, communication devices a to c, and the integrating device 1300 shall be explained as an example. Note that these explanations assume that the communication devices A and B are content introducers and the communication devices "a" to "c" are the viewers that receive the content introductions. However, the communication devices A and B may be the viewers that receive the content introductions, and the communication devices "a" to "c" may be the content introducers.

(2-1) Introduction Authorization Reception, Introduction Information Transmission, and Viewing Result Reception Processing (2-1-1) Communication Device A First, the processing for receiving a content introduction and viewing results performed by the communication device A shall be explained with reference to FIG. 2. It is assumed that the viewer of the communication device "a" has selected the communication device A as the introducer which she/he wishes to receive a content introduction from. Accordingly, the communication device "a" sends, to the communication device A, an introduction authorization authorizing content or a content ID to be sent to itself. The introduction authorization is generated by, for example, associating an ID of the communication device that authorizes the introduction of the content or the content ID (called a "viewer ID" hereinafter) with an ID of the communication device that receives the introduction authorization (called an "introducer ID" hereinafter). An introduction authorization including a viewer ID of "communication device a" and an introducer ID of "communication device A" is sent from the communication device "a" to the communication device A.

The communication device A receives the introduction authorization from the communication device "a", and in response to this, sends introduction information including content to the communication device "a". Here, the introduction information includes a content ID for identifying the content for which the communication device A is performing the introduction, the introducer ID of the introducer, which is the communication device A itself, and the viewer ID of the viewer, which is the communication device "a". To be more specific, assuming the ID of the content introduced to the content viewing device "a" by the communication device A is "content α", the introduction information is configured so as to include a content ID of "content α", an introducer ID of "communication device A", and a viewer ID of "communication device a". Note that although the content ID is being introduced here, the content itself may be introduced as well. In other words, the introduction information may include the content itself.

Having received the introduction information, the communication device "a" sends viewing results indicating whether or not the introduced content has been viewed to the communication device A. The viewing results include, for example, the viewer ID, content ID, whether or not the content has been viewed, the introducer ID, and so on. Therefore, the communication device "a" generates, for example, a viewer ID of "communication device a", a content ID of "content α", "yes" for whether or not the content has been viewed, and an introducer ID of "communication device A" as the viewing results, and sends these to the communication device A. The communication device A stores the received viewing results on, for example, a content-by-content basis. FIG. 3 is an example of viewing results stored in a viewing result storage portion 1173 of the communication device 1100. Note that viewer feedback, such as the degree of interest the viewer has in the introduced content, may be included in the viewing results.

Referring again to FIG. 2, the communication device "b" sends an introduction authorization to the communication device A. The communication device A then sends introduction information including content to the communication device "b". Having received the introduction information, the communication device "b" sends viewing results to the communication device A. In the same manner, the communication device "c" sends an introduction authorization to the communication device A. The communication device A then sends introduction information including content to the communication device "c". Having received the introduction information, the communication device "c" sends viewing results to the communication device A.

(2-1-2) Communication Device B

Sending/receiving of introduction authorizations and introduction information including content is performed in the same manner between the communication device "a" and the communication device B. To be more specific, an introduction authorization including a viewer ID of "communication device a" and an introducer ID of "communication device B" is sent from the communication device "a" to the communication device B. In response to the reception of the introduction authorization, the communication device B sends introduction information including content to the communication device "a". Here, assuming the ID of the content introduced to the communication device "a" by the communication device B is "content β", the introduction information is configured so as to include a content ID of "content βP", an introducer ID of "communication device B", and a viewer ID of "communication device a". Having received the introduction information, the communication device "a" sends viewing results to the communication device B.

Furthermore, referring to FIG. 2, the communication device "a" introduces the content introduced by the communication device B to the communication device "c". To be more specific, an introduction authorization including a viewer ID of "communication device c" and an introducer ID of "communication device a" is sent from the communication device "c" to the communication device "a". It is assumed that the user of the communication device "a" has selected the content β, introduced by the communication device B, as the content to introduce. Therefore, the communication device "a" sends introduction information including a content ID of "content β", an introducer ID of "communication device a", and a viewer ID of "communication device c" to the communication device "c". At this time, the communication device "a" performs a re-introduction notification to the communication device B, which first introduced the content β. The re-introduction notification is configured so as to include, for example, a content ID, the introducer ID of the communication device that performed the re-introduction, the viewer ID of the communication device that received the re-introduction, and a source introducer ID of the source that originally performed the content introduction. In this case, the communication device "a" sends a re-introduction notification including a content ID of "content β", an introducer ID of "communication device a", a viewer ID of "communication device c", and a source introducer ID of "communication device B" to the communication device B.

(2-2) Evaluation Value Calculation (2-2-1) Introducer Evaluation Value Calculation (i) Calculating the Introducer Evaluation Value of the Communication Device A as an Introducer By repeating the sending/receiving of the introduction authorization and the sending/receiving of the introduction information in the above manner, the communication device A obtains viewing results from each of the communication devices 1200. FIG. 3 is an example of the viewing results obtained by the communication device A, and is data stored in the viewing result storage portion 1173, which shall be described later. Referring to FIG. 3, the viewer of the communication device "a" has viewed the content α introduced by the communication device A. However, the viewer of the communication device "b" has not viewed the content α introduced by the communication device A. The viewer of the communication device "c" has viewed the content p introduced by the communication device A. The communication device A calculates an introducer evaluation value for the communication device A based on such viewing results. For example, the introducer evaluation value is calculated through the following formula (1).

Introducer evaluation value=(Number of views of content)/(Total number of introductions of content) (1)

The above formula (1) calculates the introducer evaluation value from the ratio between the total number of content introductions performed by each communication device and the number of views by a viewer who received the introductions of content. Through this, the introducer evaluation value is high in the case where the ratio of views to introductions is high. In other words, the introducer is considered to be sending content that is highly useful or of considerable interest to the viewer since the rate at which the viewer views content introduced by the introducer is high. In particular, in the case where the introducer evaluation value has been calculated by the above formula (1), the introducer evaluation value is high if the ratio of views to introductions is high, even if the number of times the user of the communication device 1200 viewed the content is low. It should be noted that the number of views includes the number of communication devices through which content was viewed in the case where the content was introduced to a plurality of communication devices, the number of pieces of content viewed through a communication device in the case where plural pieces of content were introduced to the communication device, and so on.

Alternatively, the introducer evaluation value may be calculated from the total number of introduction authorizations received by each of the communication devices 1100. FIG. 4 is an example of data within a viewer ID storage portion 1125 of the communication device 1100. The number of introduction authorizations of the communication device 1100 is calculated based on this data, and the introducer evaluation value is calculated thereby. In addition to this, the introducer evaluation value may also be calculated based on the total number of introductions of content performed by each of the communication devices 1100, the number of views of the content, the number of re-introductions, and so on. A large number of introduction authorizations or introductions means that content introductions have been requested from more communication devices 1200 and therefore the evaluation value as an introducer is ranked higher. A large number of views means that more users of the communication devices 1200 are viewing introduced content and therefore the evaluation value as an introducer is ranked higher.

By using the number of introduction authorizations, the number of introductions, the number of views, the viewing percentage, the number of re-introductions, and so on as evaluation elements for evaluating the introducer, it is possible for a terminal to objectively calculate its own introducer evaluation value.

The communication device A sends the calculated introducer evaluation value of the communication device A to the integrating device 1300.

Note that the introducer evaluation value may be calculated with a plurality of evaluation elements being combined.

(ii) Calculating the Introducer Evaluation Value of the Communication Devices B and C as Introducers In the same manner as above, the other communication devices 1100, including the communication devices B, C, and so on, also calculate introducer evaluation values and send the resultants to the integrating device 1300.

Note that the communication device B receives a re-introduction notification of the content β from the communication device "a", in the same manner as described above. Therefore, the communication device B may calculate the introducer evaluation value with reference to this re-introduction notification. When the user of a communication device 1200 evaluates received content as being interesting or the like, there are cases where that content is introduced to another communication device 1200, and in this manner, the content spreads out. There are also cases where the introducer evaluation value is determined by, for example, whether or not the device has sent content having high spread results. For this reason, by calculating the introducer evaluation value with reference to the re-introduction notification, it is possible to know which communication device 1100 is introducing the content that has high spread results.

(2-2-2) Calculation of Content Evaluation Value

The following can be given as an example of a method for calculating the content evaluation value: calculation is performed based on the number of introductions of each of the introduced pieces of content, the number of times an introduced content has been viewed by the viewer of the communication device, the number of re-introductions of a re-introduced content, and the evaluation value of the communication device as an introducer (called an "introducer evaluation value" hereinafter).

(i) Calculation of the Content Evaluation Value Based on the Introducer Evaluation Value First, a method for calculating the content evaluation value based on the introducer evaluation value shall be described below. The method for calculating the introducer evaluation value is the same as the method mentioned earlier. The communication device 1100 sends the introducer evaluation value along with a content introduction status to the integrating device 1300. Here, the "content introduction status" is information regarding, for example, the communication devices involved in the introduction of a certain content. The integrating device 1300 receives the introducer evaluation value and the content introduction status from each of the communication devices, and calculates the content evaluation value by adding together the introducer evaluation values of the communication devices involved in the introduction of the content.

To be more specific, assume that, for example the integrating device 1300 has received and stored the introducer evaluation value illustrated in FIG. 5 and the content introduction status illustrated in FIG. 6. Here, FIG. 5 is an example of the introducer evaluation value, whereas FIG. 6 is an example of the content introduction status. According to the introducer evaluation value in FIG. 5, the integrating device 1300 has received an introducer evaluation value of "70" from the communication device A, an introducer evaluation value of "100" from the communication device B, and an introducer evaluation value of "50" from the communication device C. Furthermore, according to the content introduction status in FIG. 6, the integrating device 1300 has obtained the communication device A, the communication device B, and the communication device C as communication devices that introduced the content α. In this case, the integrating device 1300 calculates a content evaluation value of "220" for the content α, by adding together the introducer evaluation value "70" of the communication device A, the introducer evaluation value "100" of the communication device B, and the introducer evaluation value "50" of the communication device C. In other words, the content evaluation values are calculated by adding weight to the values based on who introduced the content, and adding the values together. FIG. 7 is an example of the calculated content evaluation values. By calculating the content evaluation values in this manner, the higher the introducer evaluation value of the introducer of a content is, the higher the evaluation value of the content itself becomes. It is possible to consider introducers with higher introducer evaluation values to be introducers that send content that is highly useful or of considerable interest to the viewer. Therefore, it is possible to evaluate whether content is highly useful or of considerable interest by calculating the content evaluation value thereof based on the introducer evaluation value.

The integrating device 1300 may receive the content introduction status including the number of introductions performed by each of the communication devices, such as that shown in FIG. 6. Then, the content evaluation value may be calculated with the number of introductions factored in. The integrating device 1300 calculates a content evaluation value of "490" for the content α, by adding together the introducer evaluation value "70" of the communication device A multiplied by the number of introductions of the content α by the communication device A "2", the introducer evaluation value "100" of the communication device B multiplied by the number of introductions of the content α by the communication device B "3", and the introducer evaluation value "50" of the communication device C multiplied by the number of introductions of the content α by the communication device C "1".

(ii) Calculation of the Content Evaluation Value Based on the Number of Introductions, Number of Views, Number of re-introductions, and so on Next, a method for calculating of the content evaluation value based on the number of introductions, number of views, number of re-introductions, and so on shall be described below. FIG. 8 is an example of data in which the example of the viewing results shown in FIG. 3 has been arranged per content ID. The communication device 1200 calculates the number of introductions, number of views, a number of re-introductions, and so on per content based on the data shown in FIG. 8. For example, the number of views is calculated by tallying the number of items indicated by a "circle" in the viewing results. The communication device 1200 calculates the content evaluation value based on the tallied number of introductions, number of views, number of re-introductions, and so on. The communication device 1100 sends the number of introductions, the number of views, the number of re-introductions, and so on to the integrating device 1300 as-is, or sends the content evaluation value calculated based on the number of introductions, the number of views, the number of re-introductions, and so on to the integrating device 1300. Alternatively, a total of the number of introductions and a total of the number of views may be calculated as the total number of views and the total number of introductions, respectively, by the integrating device 1300, and the content evaluation value may be calculated based on the ratio of the total number of views to the total number of introductions. FIG. 9 is an example of the number of views the integrating device receives from the communication devices. In the case where the integrating device 1300 has received the number of views indicated in FIG. 9, it calculates the content evaluation values based on the number of views.

(2-3) Processing of Integrating Device For Ranking and Sending Evaluation Value Ranking FIG. 10 is an example of an introducer evaluation value ranking, and FIG. 11 is an example of a content evaluation value ranking. The integrating device 1300 receives introducer evaluation values based on the viewing results shown in FIG. 5 from the communication devices 1100. Then, the integrating device 1300 ranks the introducers in order from, for example, the highest introducer evaluation value down, as shown in FIG. 10. Furthermore, the content is ranked in order from, for example, the highest content evaluation value down, as shown in FIG. 11. The integrating device 1300 then sends the introducer evaluation value rankings that have undergone the ranking processing to the communication devices 1200.

(2-4) Reception of Evaluation Value Ranking

The communication devices 1200 receive the introducer evaluation value ranking and content evaluation value ranking from the integrating device 1300. Through this, the viewers of the communication devices 1200 can obtain information regarding the selection of introducers; for example, the viewers can select the communication device 1100 having the highest introducer evaluation value and send introduction authorizations. Additionally, the viewer of a communication device 1200 can obtain information regarding the selection of content, such as that the introduced content is selected for viewing in the case where the content evaluation value rank of the introduced content is high.

(3) Functional Configuration

Next, the functional configurations of the devices shall be described.

(3-1) Functional Configuration of Communication Device that is a Viewer

Figure 12:
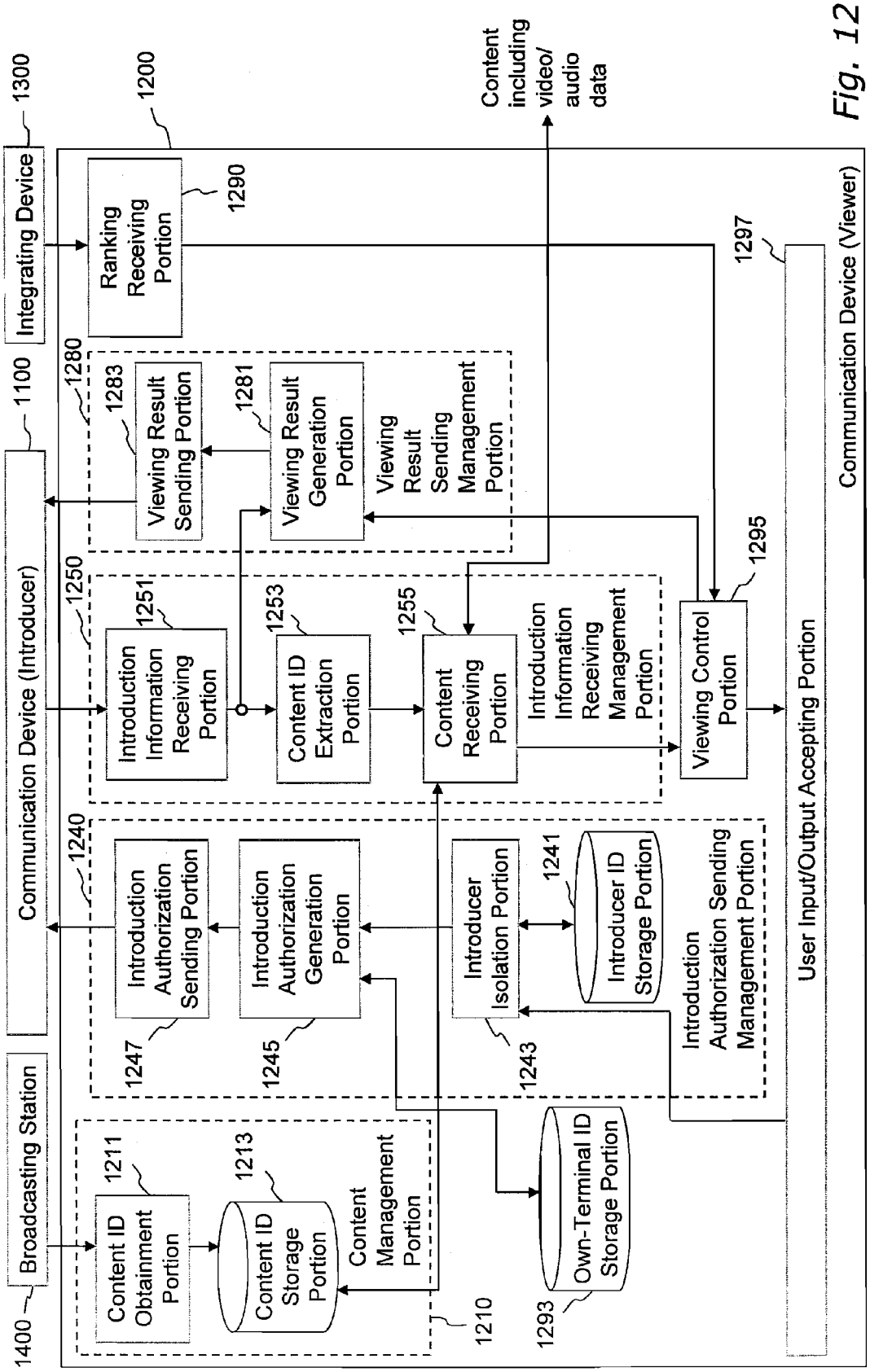
FIG. 12 is a functional configuration diagram of a communication device.

First, the functional configuration of the communication device 1200, which is the viewer, shall be described. FIG. 12 is a function block diagram of the communication device 1200. The communication device 1200 includes a content management portion 1210, an introduction authorization sending management portion 1240, an introduction information receiving management portion 1250, a viewing result sending management portion 1280, a ranking receiving portion 1290, an own-terminal ID storage portion 1293, a viewing control portion 1295, and a user input/output accepting portion 1297. The functional configurations of each of these portions shall be described hereinafter.

(3-1-1) Content Management Portion

The content management portion 1210 includes a content ID obtainment portion 1211 and a content ID storage portion 1213. The content ID obtainment portion 1211 obtains a content ID for identifying content and the storage location of content such as, URL or the like, from the broadcasting station 1400 or the like. The content ID storage portion 1213 associates the content ID with the storage location and stores these. Note that although the content ID and storage location are being stored here, the content itself may be stored within the communication device 1200 as well.

(3-1-2) User Input/Output Accepting Portion, Own-Terminal ID Storage Portion

The user input/output accepting portion 1297 accepts various inputs such as selection of introducers, selection of content to be viewed, and so on from the viewer of the communication device 1200. The own-terminal ID storage portion 1293 stores the device ID of the communication device 1200 itself.

(3-1-3) Introduction Authorization Sending Management Portion

The introduction authorization sending management portion 1240 includes an introduction authorization sending portion 1247, an introduction authorization generation portion 1245, an introducer isolation portion 1243, and an introducer ID storage portion 1241. Note that the selection of an introducer performed by the viewer is assumed to include not only cases where the viewer randomly selects an introducer but also selections based on introducer evaluation value rankings and so on presented to the viewer through the user input/output accepting portion 1297. An introducer ID for identifying the introducer is stored in the introducer ID storage portion 1241. Furthermore, the introduction authorization is generated by, for example, associating the viewer ID of the viewer that authorizes the introduction of content with the introducer ID of the communication device that receives the introduction authorization.

Here, descriptions shall be provided using the example shown in FIG. 2, in which the communication device "a" sends an introduction authorization to the communication device A. The viewer of the communication device "a" selects the communication device A as the introducer of content. The user input/output accepting portion 1297 of the communication device "a" accepts, from the viewer that is the user of the communication device "a", a specification of the communication device A as the introducer that is to introduce content. The introducer isolation portion 1243 isolates the introducer's introducer ID accepted by the user input/output accepting portion 1297, based on the introducer ID storage portion 1241. Next, the introduction authorization generation portion 1245 obtains a viewer ID of "communication device a" from the own-terminal ID storage portion 1293, and receives the introducer ID isolated by the introducer isolation portion 1243. Then, the introduction authorization generation portion 1245 generates an introduction authorization configured of a viewer ID of "communication device a" and an introducer ID of "communication device A". The introduction authorization sending portion 1247 sends the generated introduction authorization to the communication device A.

(3-1-4) Introduction Information Receiving Management Portion

The introduction information receiving management portion 1250 includes an introduction information receiving portion 1251, a content ID extraction portion 1253, and a content receiving portion 1255. As described earlier, the introduction authorization sending portion 1247 of the communication device "a" sends an introduction authorization authorizing the communication device A to send introduction information to the content receiving device "a". Through this, the introduction information receiving portion 1251 of the communication device "a" receives introduction information from the communication device A. Here, the introduction information is configured so as to include, for example, a content ID of "content α", an introducer ID of "communication device A", and a viewer ID of "communication device a". The content ID extraction portion 1253 extracts "content α" as the content ID from the introduction information.

The content receiving portion 1255 outputs information regarding the introduced content α to the viewing control portion 1295, which shall be mentioned later. Information regarding the content α is, for example, information that describes an outline of the content α. Here, it is assumed that the content receiving portion 1255 has received a notification that the viewer of the communication device "a" will view the content α, via the viewing control portion 1295, mentioned later. In this case, the content receiving portion 1255 obtains the storage location of the "content α" from the content ID storage portion 1213, accesses the obtained storage location, and obtains the video data, audio data, or the like of the "content α". Then, this video data, audio data, or the like is outputted to the viewing control portion 1295. Through this, the viewer of the communication device "a" can view content α introduced by the communication device A.

(3-1-5) Viewing Control Portion

The viewing control portion 1295 receives information regarding the content α introduced by the communication device A from the content receiving portion 1255. The viewing control portion 1295 inquires with the viewer whether or not she/he will view the content α, via the user input/output accepting portion 1297 of the communication device "a". When the user input/output accepting portion 1297 accepts input from the viewer indicating she/he will view the content α, the viewing control portion 1295 notifies the content receiving portion 1255 of the viewer's intent. Then, the content receiving portion 1255 obtains the video data, audio data, or the like of the "content α" from the content storage device 1450. After this, the viewing control portion 1295 receives the video data, audio data, or the like of the "content α" from the content receiving portion 1255, and outputs this to the user input/output portion.

Furthermore, the viewing control portion 1295 outputs the introducer evaluation value ranking received from the ranking receiving portion 1290, which shall be described later, to the user input/output accepting portion 1297. Through this, the viewer of the communication device "a" can be aware of the introducer evaluation value ranking. Therefore, the viewer can select a communication device based on the introducer evaluation value ranking.

Furthermore, upon receiving the notification that the viewer of the communication device "a" will view the content from that viewer, the viewing control portion 1295 notifies a viewing result generation portion 1281 that the viewer of the communication device "a" will view the content α.

(3-1-6) Viewing Result Sending Management Portion

The viewing result sending management portion 1280 includes the viewing result generation portion 1281 and a viewing result sending portion 1283. Upon receiving the notification that the viewer of the communication device "a" will view the content from that viewer via the viewing control portion 1295, the viewing result generation portion 1281 generates the viewing results based on that notification. At this time, the viewing results are generated so as to include, for example, a viewer ID of "communication device a", a content ID of "content α", "yes" for whether or not the content has been viewed, and an introducer ID of "communication device A". The viewing result sending portion 1283 sends the generated viewing results to communication devices.

(3-1-7) Ranking Receiving Portion

The ranking receiving portion 1290 receives the introducer evaluation value ranking and content evaluation value ranking from the integrating device 1300, and sends these to the viewing control portion 1295. The viewing control portion 1295 outputs the received introducer evaluation value ranking and content evaluation value ranking to the user input/output accepting portion 1297, and presents these rankings to the viewer of the communication device.

(3-2) Functional Configuration of Communication Device that is an Introducer

Figure 13:
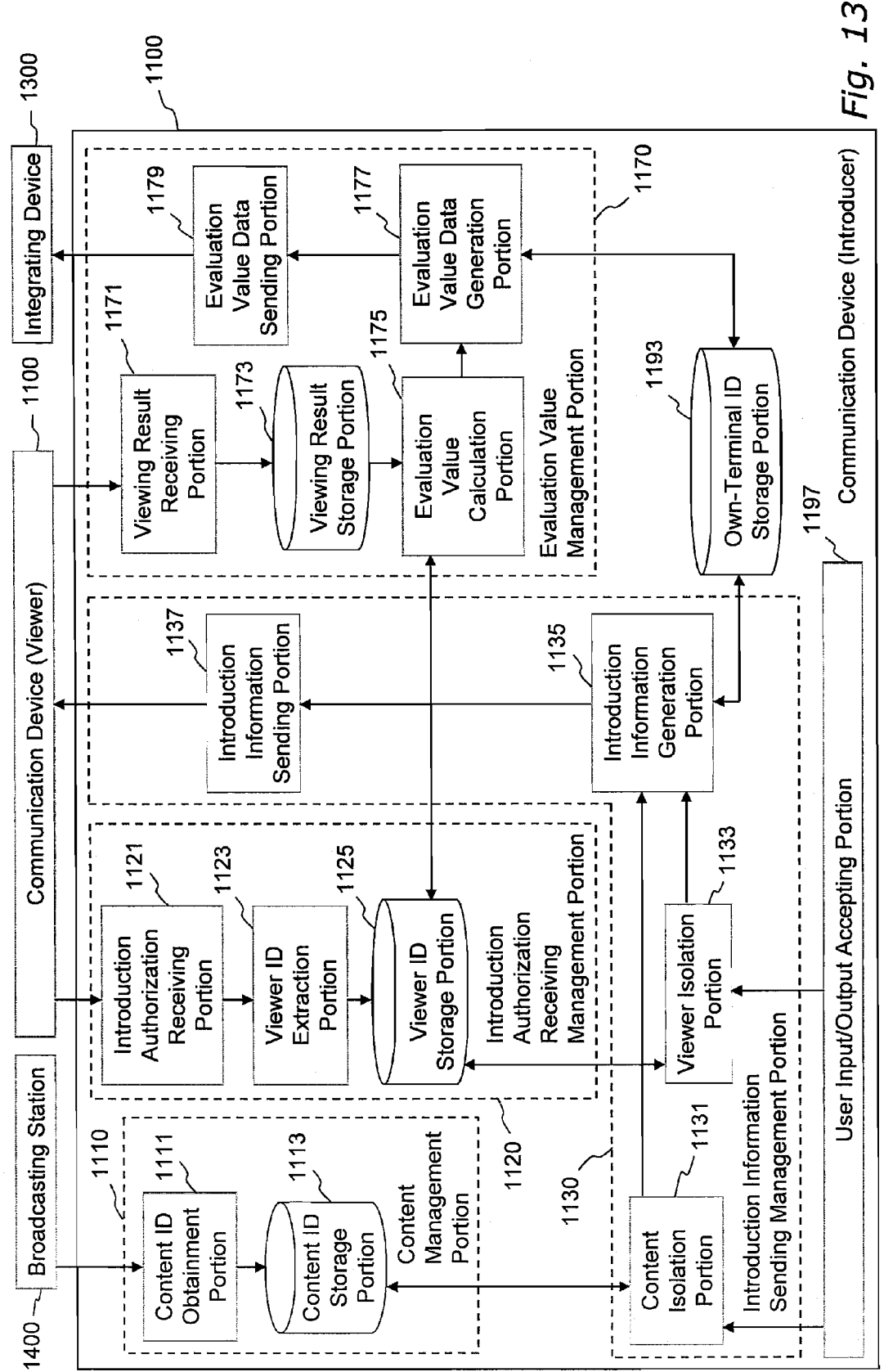
FIG. 13 is a functional configuration diagram of a communication device.

Next, the functional configuration of the communication device 1100, which is the introducer, shall be described. FIG. 13 is a function block diagram of the communication device 1100. The communication device 1100 includes a content management portion 1110, an introduction authorization receiving management portion 1120, an introduction information sending management portion 1130, an evaluation value management portion 1170, an own-terminal ID storage portion 1193, and a user input/output accepting portion 1197. The functional configuration of each of these portions shall be described hereinafter.

(3-2-1) Content Management Portion

The content management portion 1110 of the communication device 1100 is configured in the same manner as the content management portion 1210 of the communication device 1200 mentioned above, and includes a content ID obtainment portion 1111 and a content ID storage portion 1113. The content ID storage portion 1113 associates the content ID with the storage location and stores these.

(3-2-2) User Input/Output Accepting Portion, Own-Terminal ID Storage Portion

The user input/output accepting portion 1197 accepts various inputs such as selection of content and so on from the user of the communication device 1100. The own-terminal ID storage portion 1193 stores the device ID of the communication device 1100 itself.

(3-2-3) Introduction Authorization Receiving Management Portion

The introduction authorization receiving management portion 1120 includes an introduction authorization receiving portion 1121, a viewer ID extraction portion 1123, and the viewer ID storage portion 1125. Descriptions shall be provided using the example shown in FIG. 2, where the communication device A receives an introduction authorization from the communication device "a" and sends introduction information. The introduction authorization receiving portion 1121 of the communication device A receives an introduction authorization from the communication device "a". In this case, the introduction authorization receiving portion 1121 of the communication device A receives an introduction authorization configured of a viewer ID of "communication device a" and an introducer ID of "communication device A". This introduction authorization means that the communication device "a", which is a viewer, has specified the communication device A as an introducer.

The viewer ID extraction portion 1123 extracts the viewer ID from the introduction authorization received by the introduction authorization receiving portion 1121 in order to identify which communication device 1200 the introduction authorization was received from. The viewer ID storage portion 1125 stores the extracted viewer ID and manages, for example, which viewer the communication device A has received the introduction authorization from, as illustrated in the aforementioned FIG. 4.

(3-2-4) Introduction Information Sending Management Portion

The introduction information sending management portion 1130 includes a content isolation portion 1131, a viewer isolation portion 1133, an introduction information generation portion 1135, and an introduction information sending portion 1137. As mentioned above, the communication device A has received an introduction authorization from the communication device "a", and therefore is capable of sending introduction information including content to the communication device "a".

Here, the user input/output accepting portion 1197 accepts a specification of content introduced by the introducer, which is the user of the communication device A, and a specification of the viewer to which that content is to be introduced.

The content isolation portion 1131 isolates the content ID of the content accepted by the user input/output accepting portion 1197 based on the content ID storage portion 1113. Furthermore, the viewer isolation portion 1133 isolates the viewer ID of the viewer accepted by the user input/output accepting portion 1197 based on the viewer ID storage portion 1125. Here, in the case where the communication device A introduces the content α to the communication device "a", the content isolation portion 1131 and the viewer isolation portion 1133 respectively output a content ID of "content α" and a viewer ID of "communication device a" to the introduction information generation portion 1135. The introduction information generation portion 1135 obtains the ID of the communication device A itself, as the introducer ID, from the own-terminal ID storage portion 1193.

Through this, the introduction information generation portion 1135 generates introduction information including a content ID of "content α", a viewer ID of "communication device a", and an introducer ID of "communication device A". The introduction information sending portion 1137 sends the generated introduction information to the communication device "a", which is the viewer.

It should be noted that the communication devices 1100 that receive the content introductions may receive the content evaluation value ranking from the integrating device 1300. The content to be introduced may then be selected based on this content evaluation value ranking. Through this, it is possible for the introducer, or the communication device 1100, to introduce content that is more useful to the viewer.

(3-2-5) Evaluation Value Management Portion

The evaluation value management portion 1170 includes a viewing result receiving portion 1171, the viewing result storage portion 1173, an evaluation value calculation portion 1175, an evaluation value data generation portion 1177, and an evaluation value data sending portion 1179.

Descriptions shall be provided using the example shown in FIG. 2, where, for example, the communication device A sends introduction information to the communication device "a" and the communication device "b". The viewing result receiving portion 1171 of the communication device A receives viewing results from the viewing result sending portions 1283 of the communication device "a" and the communication device "b". The viewing result storage portion 1173 stores these viewing results in the manner previously shown in FIG. 3. The evaluation value calculation portion 1175 calculates an introducer evaluation value for the communication device A itself based on the viewing results stored in the viewing result storage portion 1173. The introducer evaluation value is calculated from the viewing percentage, total number of introductions, number of views, number of re-introductions, and so on of content, based on the aforementioned data of the viewing result storage portion 1173 shown in FIG. 3 and the data of the viewer ID storage portion 1125 shown in FIG. 4.

Furthermore, the evaluation value calculation portion 1175 generates the content introduction status expressing which content the communication device A has introduced, and sends this content introduction status along with the introducer evaluation value to the evaluation value data generation portion 1177. The evaluation value calculation portion 1175 generates the content introduction status by, for example, obtaining the content ID of the content its own terminal introduced from the introduction information generation portion 1135. Here, the content introduction status of the communication device A is generated so as to include, for example, an introducer ID for the communication device A of "communication device A" and a content ID for the content introduced by the communication device A of "content α" and "content β".

The evaluation value data generation portion 1177 generates evaluation value data for sending to the integrating device 1300. Here, the evaluation value data is generated so as to include, for example, the introducer evaluation value, the introducer ID, and the content introduction status. Therefore, assuming the introducer evaluation value of the communication device A is "70", the evaluation value data generation portion 1177 generates evaluation value data including an introducer evaluation value of "70", an introducer ID of "communication device A", and content IDs of "content α" and "content β". The evaluation value data sending portion 1179 sends the generated evaluation value data to the integrating device 1300.

It should be noted that the number of introductions, number of views, and number of re-introductions per content may be sent, rather than the introducer evaluation value and content introduction status being sent as mentioned earlier. In other words, the evaluation value calculation portion 1175 calculates the number of introductions, number of views, and number of re-introductions per content based on the data in the viewing result storage portion 1173. The evaluation value data generation portion 1177 generates the evaluation value data including the calculated number of introductions, number of views, and number of re-introductions, and the evaluation value data sending portion 1179 sends this evaluation value data to the integrating device 1300.

(4) Functional Configuration of Integrating Device

Figure 14:
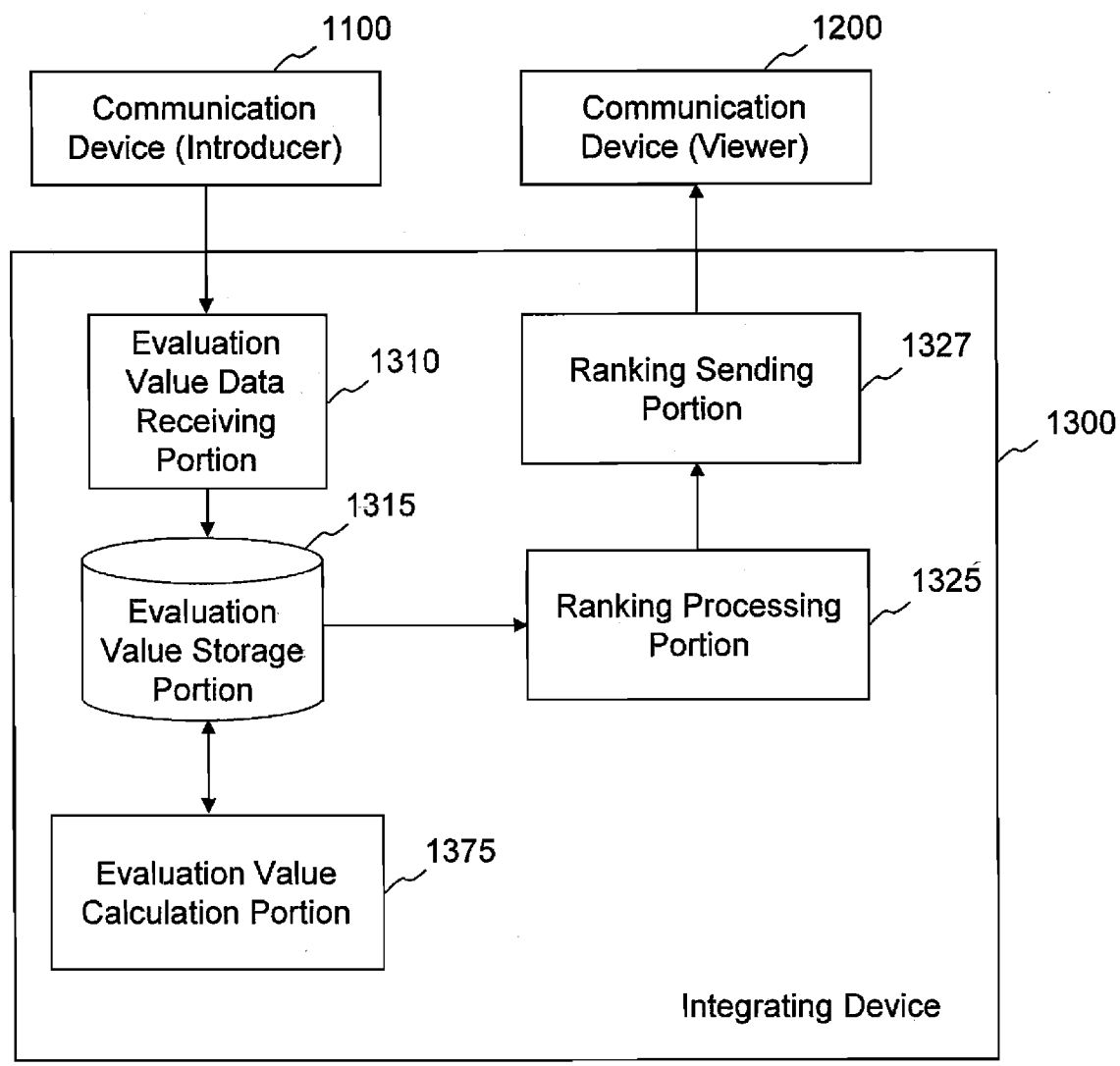
FIG. 14 is a functional configuration diagram of an integrating device.

Next, the functional configurations of the integrating devices 1300 shall be described. FIG. 14 is a function block diagram of the integrating device 1300. The integrating device 1300 includes an evaluation value data receiving portion 1310, an evaluation value storage portion 1315, a ranking processing portion 1325, a ranking sending portion 1327, and an evaluation value calculation portion 1375. The functional configuration of each of these portions shall be described hereinafter.

(4-1) Evaluation Value Data Receiving Portion, Evaluation Value Storage Portion, Evaluation Value Calculation Portion The evaluation value data receiving portion 1310 receives evaluation value data including the introducer evaluation values and introducer IDs from each of the communication devices 1100. Alternatively, the evaluation value data receiving portion 1310 receives the number of introductions, number of views, number of re-introductions, and the like per content from each of the communication devices 1100. The evaluation value storage portion 1315 stores this evaluation value data. In other words, the evaluation value storage portion 1315 stores the introducer evaluation values shown in FIG. 5 and the content introduction statuses shown in FIG. 6. The evaluation value calculation portion 1375 calculates the content evaluation value based on the introducer evaluation value and the content introduction status in the manner described above. Alternatively, the evaluation value calculation portion 1375 calculates the content evaluation value by totaling the number of introductions, number of views, and number of re-introductions per content. The evaluation value storage portion 1315 stores the calculated content evaluation value.

(4-2) Ranking Processing Portion and Ranking Sending Portion

The ranking processing portion 1325 ranks each of the introducers in the manner shown in FIG. 10 based on the introducer evaluation values within the evaluation value storage portion 1315. The ranking processing portion 1325 also ranks the content in the manner shown in FIG. 11 based on the content evaluation values within the evaluation value storage portion 1315. The ranking sending portion 1327 then sends the introducer evaluation value rankings and content evaluation value rankings that have undergone the ranking processing to the ranking receiving portions 1290 of the communication devices 1200.

(5) Processing Flow in Each Device

Next, processing performed by the communication devices 1100, which are the introducers, the communication device 1200, which is the viewer, and the integrating device 1300 shall be described.

Figure 15:
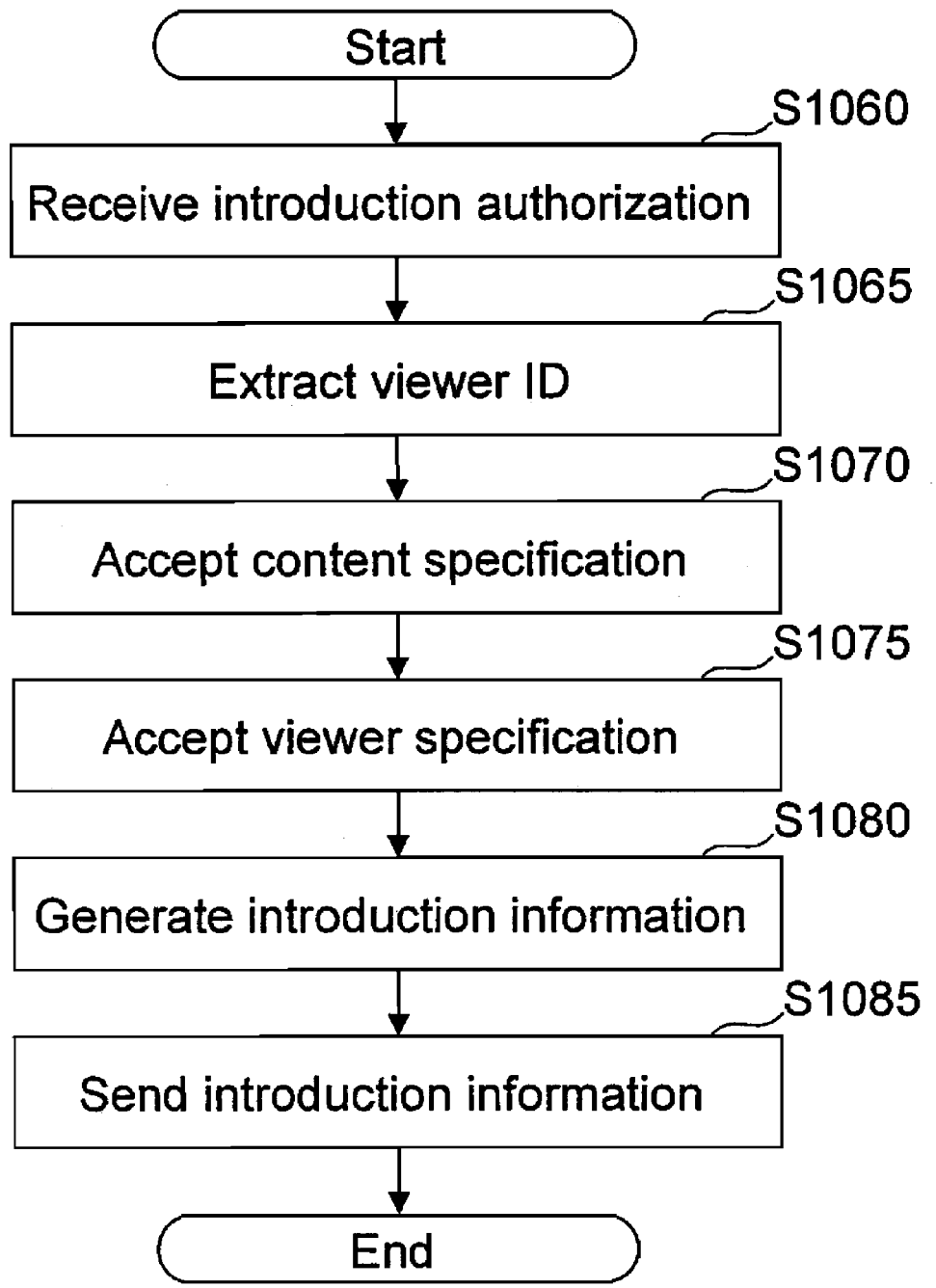
FIG. 15 is a flowchart illustrating an example of introduction authorization receiving processing and introduction information sending processing.

(5-1) Processing of Introducer Communication Device (5-1-1) Introduction Authorization Receiving Processing and Introduction Information Sending Processing First, introduction authorization receiving processing and introduction information sending processing performed by the communication device 1100 that is the introducer shall be explained. FIG. 15 is a flowchart illustrating an example of the introduction authorization receiving processing and the introduction information sending processing.

Step S1060: the introduction authorization receiving portion 1121 receives an introduction authorization configured of a viewer ID and an introducer ID.

Step S1065: the viewer ID extraction portion 1123 extracts the viewer ID from the introduction authorization received by the introduction authorization receiving portion 1121 in order to identify which communication device, or viewer, the introduction authorization was received from. The viewer ID storage portion 1125 stores the extracted viewer ID.

Steps S1070 and S1075: the user input/output accepting portion 1197 accepts a content selection and a specification of the viewer to which that content is to be introduced from the user of the communication device 1100. The content isolation portion 1131 and the viewer isolation portion 1133 respectively isolate the content IDs of the selected content and viewer IDs of the selected viewers, and output the resultants to the introduction information generation portion 1135.

Step S1080: the introduction information generation portion 1135 extracts the ID of its own terminal as the introducer ID from the own-terminal ID storage portion 1193. Then, the introduction information generation portion 1135 generates introduction information including the content ID, the viewer ID, and the introducer ID.

Step S1085: the introduction information sending portion 1137 sends the generated introduction information to the communication device 1200, which is the viewer.

(5-1-2) Introducer Evaluation Value Calculation Processing

Figure 16:
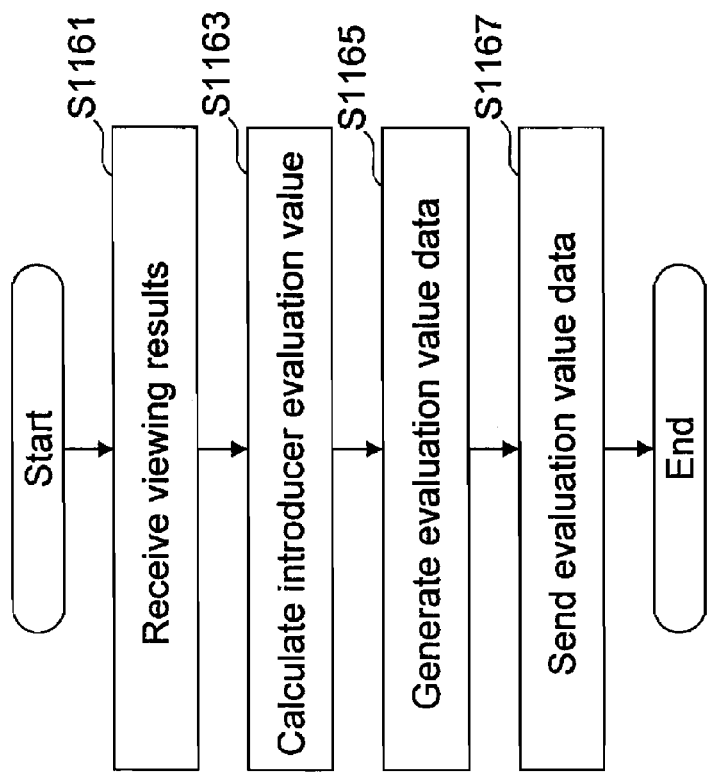
FIG. 16 is a flowchart illustrating an example of introducer evaluation value calculation processing.

Next, the introducer evaluation value calculation processing performed by the communication device 1100 shall be described. FIG. 16 is a flowchart illustrating an example of the introducer evaluation value calculation processing.

Step S1161: the viewing result receiving portion 1171 of the communication device 1100 receives the viewing results from the viewing result sending portion 1283 of the communication device 1200 that is the device to which the introduction information was sent. The viewing result storage portion 1173 stores these viewing results.

Step S1163: the evaluation value calculation portion 1175 calculates the introducer evaluation value for the communication device 1100 itself based on the viewing results stored in the viewing result storage portion 1173.

Steps S1165 and S1167: the evaluation value data generation portion 1177 generates the evaluation value data including the introducer evaluation value, the introducer ID, and the content introduction status. The evaluation value data sending portion 1179 sends the generated evaluation value data to the integrating device 1300.

(5-2) Processing of Integration Device

Figure 17:
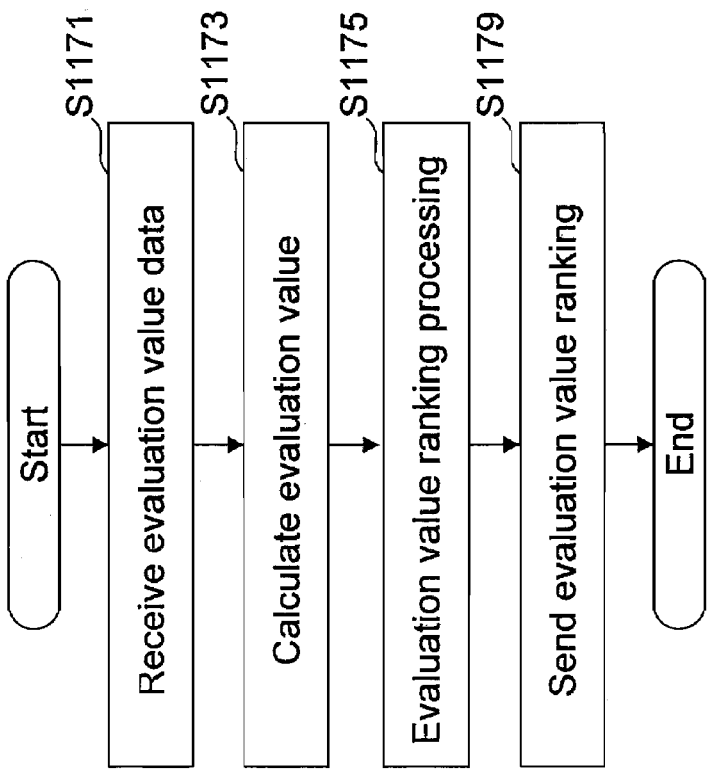
FIG. 17 is a flowchart illustrating an example of ranking processing performed by an integrating device.

Next, the ranking processing performed by the integrating device 1300 shall be explained. FIG. 17 is a flowchart illustrating an example of the ranking processing performed by the integrating device 1300.

Step S1171: the evaluation value data receiving portion 1310 of the integrating device 1300 receives evaluation value data including the introducer evaluation values, introducer IDs, and content introduction statuses from the evaluation value data sending portions 1179 of the communication devices. The evaluation value storage portion 1315 stores this evaluation value data.

Step S1173: the evaluation value calculation portion 1375 calculates the content evaluation value based on the evaluation value data.

Step S1175: the ranking processing portion 1325 ranks the introducer evaluation values based on the introducer evaluation values included in the evaluation value data, and ranks the content based on the content evaluation values.

Step S1179: the ranking sending portion 1327 then sends the introducer evaluation value rankings and content evaluation value rankings that have undergone the ranking processing to the ranking receiving portions 1290 of the communication devices 1200.

(5-3) Processing of Viewer Communication Device

Figure 18:
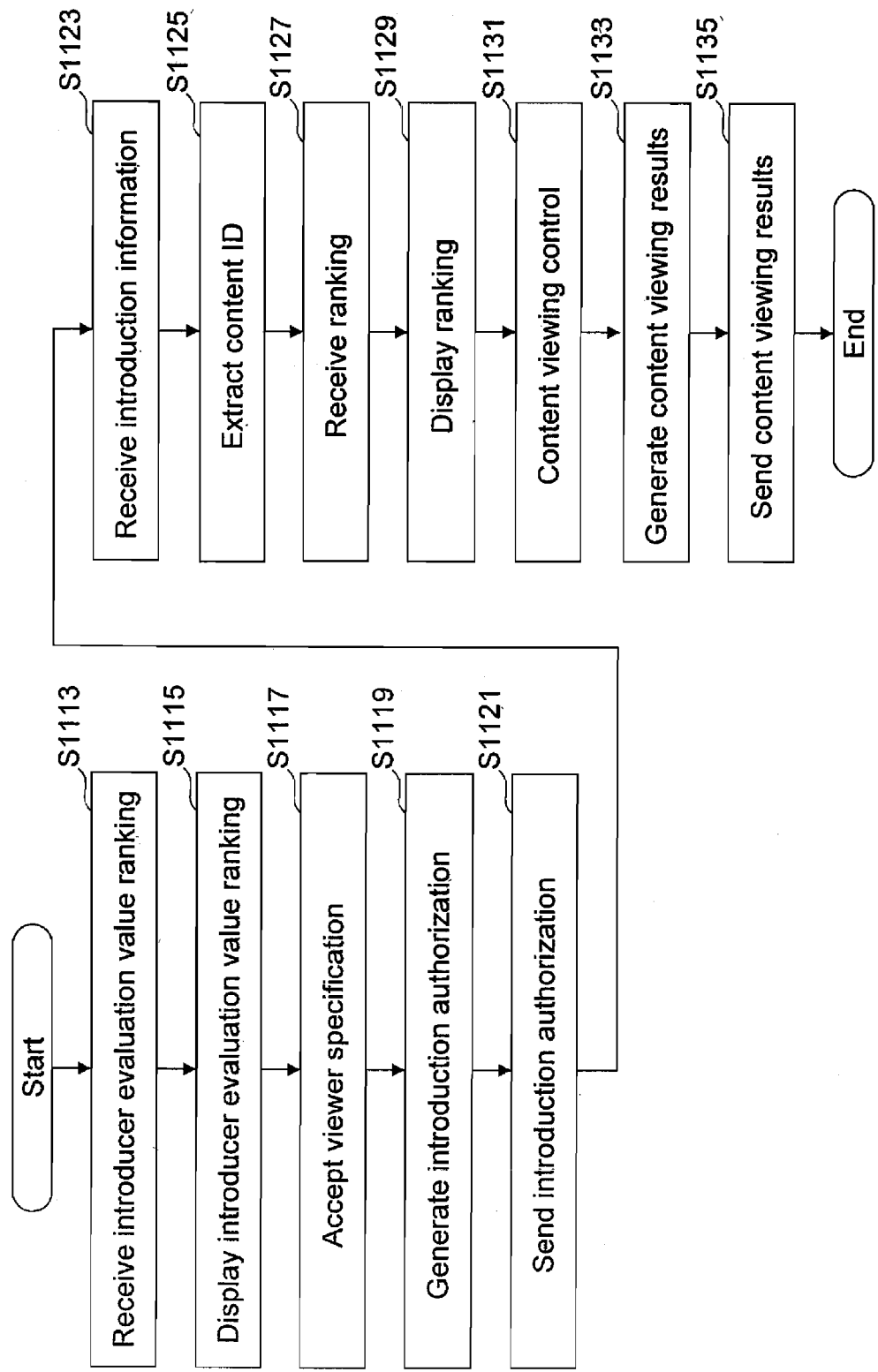
FIG. 18 is a flowchart illustrating an example of introduction authorization sending processing and introduction information receiving processing.

Next, the introduction authorization sending processing and introduction information receiving processing performed by the communication device 1200, which is the viewer, shall be explained. FIG. 18 is a flowchart illustrating an example of the introduction authorization sending processing and the introduction information receiving processing.

Steps S1113 and S1115: the ranking receiving portion 1290 receives the introducer evaluation value ranking from the integrating device 1300, and presents the introducer evaluation value ranking to the viewer via the user input/output accepting portion 1297.

Steps S1117 to S1121: the introducer evaluation value ranking is presented to the viewer, who is the user of the communication device 1200. Accordingly, the viewer can select an introducer by referring to the introducer evaluation value ranking. Here, the user input/output accepting portion 1297 accepts a specification of the introducer from the viewer. The introduction authorization generation portion 1245 generates an introduction authorization configured of the viewer ID and the introducer ID of the specified introducer. The introduction authorization sending portion 1247 sends the generated introduction authorization to the communication device 1100, which is the introducer.

Step S1123: the introduction information receiving portion 1251 receives the introduction information from the communication device 1100 that received the introduction authorization.

Step S1125: the content ID extraction portion 1253 extracts the content ID from the introduction information received from the introduction information receiving portion 1251.

Steps S1127 and S1129: the ranking receiving portion 1190 receives the content evaluation value ranking from the integrating device 1300. The viewing control portion 1295 outputs the content evaluation value ranking to the user input/output accepting portion 1197, thereby presenting the content evaluation value ranking to the user. The viewer of the communication device 1200 can determine whether or not to view the content based on this content evaluation value ranking.

Step S1131: the content receiving portion 1255 outputs information regarding content, based on the content ID of that content as extracted by the content ID extraction portion 1253, to the viewing control portion 1295, which shall be mentioned later. Here, it is assumed that the content receiving portion 1255 has received a notification that the viewer will view the content, via the viewing control portion 1295. In this case, the content receiving portion 1255 accesses the storage location of the content as obtained from the content ID storage portion 1213, and obtains video data, audio data, or the like. Then, the viewing control portion 1295 and the user input/output accepting portion 1297 output this video data and audio data.

Steps S1133 and S1135: upon receiving the notification that the viewer will view the content from the viewing control portion 1295, the viewing result generation portion 1281 generates the viewing results based on that notification. The viewing result generation portion 1281 sends the generated viewing results to the communication device 1100.

(6) Summary of Effects

The user of a communication device can grasp which communication device has a high introducer evaluation value, or in other words, the rank of the communication device among all of the communication devices, by receiving the introducer evaluation value ranking in the manner described thus far. Accordingly, the user of a communication device can obtain information regarding the selection of introducers; for example, the user can select the communication device having the highest introducer evaluation value and send the introduction authorization. Here, the possibility of receiving highly useful content increases when a communication device having a high introducer evaluation value is selected.

Furthermore, the user of the communication device can use the introducer evaluation value ranking as information for determining whether or not to view the content, i.e. determining whether or not to view the received content by referring to the introducer evaluation value ranking. For example, the user can use the introducer evaluation value ranking as a basis for selection of the content, whereby she/he views the content in the case where the content has been introduced by a communication device positioned higher in the introducer evaluation value ranking but does not view the content in the case where the introducer evaluation value ranking is lower. Further still, the introducer evaluation value ranking can also be used as a basis for selection of the content in the case where the communication device introduces the content itself. For example, the user of a communication device can select the content introduced by a communication device that has a high introducer evaluation value as the content to introduce itself.

On the other hand, the user of the communication device can grasp which content has a high content evaluation value, or in other words, the rank of the content among all the contents, based on the presented content evaluation value ranking. Accordingly, the user of the communication device can obtain information regarding the selection of content, such as that an introduced content is selected for viewing when the rank of that content is higher and so on. Here, the possibility that the user can receive highly useful content increases when content having a high content evaluation value is selected. Additionally, in the case where a communication device introduces the content as an introducer, it is possible to obtain information regarding the selection of the content to introduce, and content having a high content evaluation value can be selected as the content to introduce to other communication devices.

Furthermore, the user of the communication device can select the communication device to receive the introduction of content by sending an introduction authorization. Accordingly, it is possible to avoid contents being sent from a specific communication device in a one-sided manner while reflecting which communication device the user of a communication device intends to receive from.

The range of content that is viewed tends to be constrained in the case where content introductions are received with the range of content being limited in advance. However, by limiting the communication devices that introduce the content through the use of introduction authorizations, it is possible to prevent the content from being constrained more than in the case where the range itself of the content is directly limited.

(7) Variations

In the above first embodiment, the communication device 1200, which is the receiver of the content, is provided with the functions illustrated in FIG. 12, and the communication device 1100, which is the introducer of the content, is provided with the functions illustrated in FIG. 13. Here, each of the communication devices may be provided with functionality for carrying out both sending and receiving of content, rather than either sending or receiving content. In this case, the communication devices have the functional configurations of both the communication device 1200 shown in FIG. 12 and the communication device 1100 shown in FIG. 13. Furthermore, the communication devices may be provided with function to rank the calculated introducer evaluation values and content evaluation values. In this case, the communication devices further have the functional configuration of the integrating device shown in FIG. 14.

Second Embodiment (1) Configuration

Figure 19:
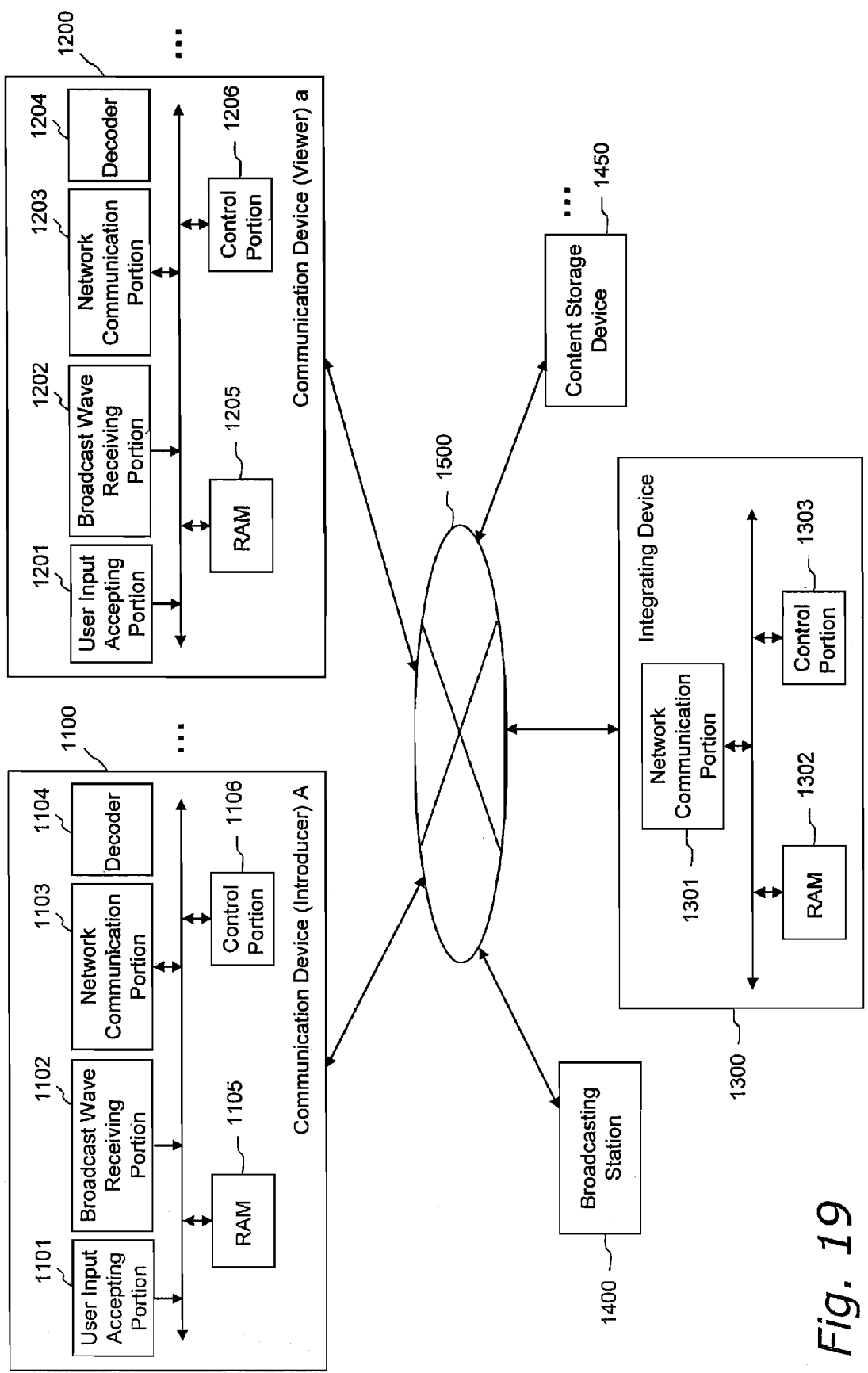
FIG. 19 is a diagram illustrating a network configuration of a content introduction system according to the second embodiment of the present invention.

In the content introduction system according to the second embodiment, the integrating device 1300 calculates the introducer evaluation values and ranks the introducer evaluation values. FIG. 19 is a diagram illustrating a network configuration of a content introduction system according to the second embodiment of the present invention. The network configuration diagram of the content introduction system illustrated in FIG. 19 is the same as that shown in FIG. 1 of the first embodiment, and therefore descriptions thereof shall be omitted. Furthermore, the hardware configuration of each of the devices are the same as in the first embodiment, and therefore descriptions thereof shall be omitted as well.

(2) Outline of Processing

Figure 20:
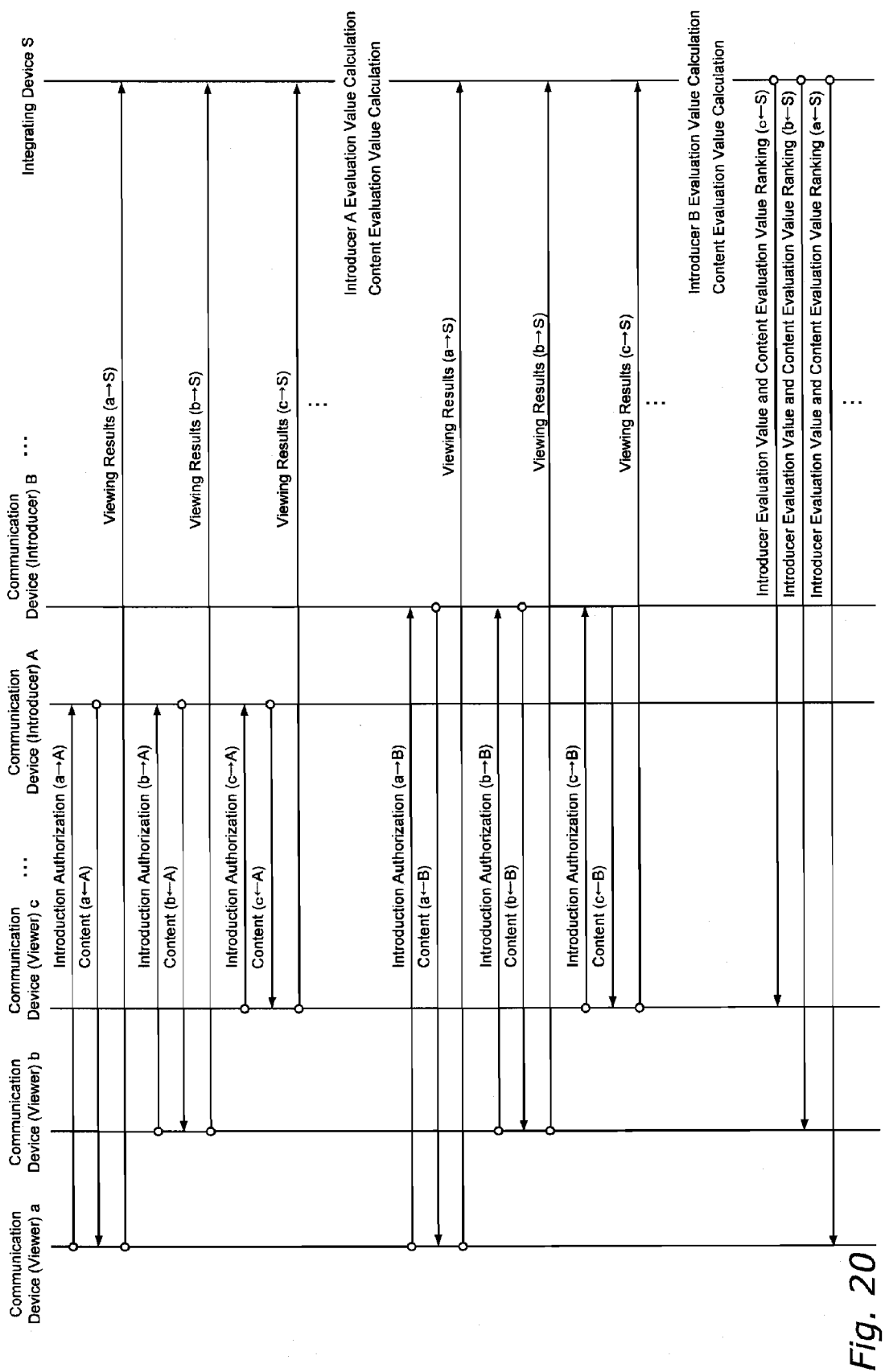
FIG. 20 is a diagram illustrating an outline of processing performed in the content introduction system according to the second embodiment of the present invention.

FIG. 20 is a diagram illustrating an outline of processing performed in the content introduction system according to the second embodiment of the present invention. Hereinafter, the sending/receiving of content and the sending/receiving of introducer evaluation values and introducer evaluation value rankings among the communication devices A and B, communication devices "a" to "c", and the integrating device 1300, shall be explained as examples. Note that these explanations assume that the communication devices A and B are content introducers and the communication devices "a" to "c" are the viewers that receive the content introductions. However, the communication devices A and B may be the viewers that receive the content introductions, and the communication devices "a" to "c" may be the content introducers.

(2-1) Content Introduction Processing

First, the processing for introducing content performed by the communication device A shall be explained with reference to FIG. 20. It is assumed that the viewer of the communication device "a" has selected the communication device A as the introducer she/he wishes to receive a content introduction from. Accordingly, the communication device "a" sends, to the communication device A, an introduction authorization authorizing content to be sent to it. At this time, the introduction authorization is configured so as to include, for example, a viewer ID of "communication device a" and an introducer ID of "communication device A".

The communication device A receives the introduction authorization from the communication device a, and in response to this, sends introduction information including content to the communication device "a". Here, the introduction information is configured so as to include, for example, a content ID of "content α", an introducer ID of "communication device A", and a viewer ID of "communication device a".

The sending and receiving of introduction authorizations and introduction information is carried out in the same manner between the communication device "b" and communication device "c", and the communication device A and communication device B. Note that although the content ID is being introduced here, the content itself may be introduced as well. In other words, the introduction information may include the content itself.

(2-2) Processing for Viewing Result Receiving and Evaluation Value Calculation

Having received the introduction information, the communication device 1200 sends viewing results indicating whether or not the introduced content has been viewed to the integrating device 1300. The viewing results include, for example, the viewer ID, content ID, whether or not the content has been viewed, the introducer ID, and so on. Note that viewer feedback, such as the degree of interest the viewer has in the introduced content, may be included in the viewing results.

The integrating device 1300 stores the received viewing results on, for example, a communication device-by-communication device basis. FIG. 21 is an example of data stored in a viewing result storage portion 1373 of the integrating device 1300. Next, the integrating device 1300 calculates introducer evaluation values for each of the communication devices 1100 based on the viewing results stored in the viewing result storage portion 1373 illustrated in FIG. 22. FIG. 22 is an example of the data of the evaluation value storage portion 1315, which shall be mentioned later; the introducer evaluation values are stored in the evaluation value storage portion 1315 by communication device 1100. Here, the integrating device 1300 calculates the introducer evaluation values based on the number of introduction authorizations, the number of introductions, the number of views, the viewing percentage, the number of re-introductions, and so on, in the same manner as in the first embodiment. By using the number of introduction authorizations, the number of introductions, the number of views, the viewing percentage, the number of re-introductions, and so on as evaluation elements for evaluating the introducer in this manner, it is possible to objectively calculate introducer evaluation values for each of the communication devices 1100. In addition, calculation of the introducer evaluation values with reference to the re-introduction notification can be used as an indicator of which communication device 1100 is introducing the content that has high spread results.

Next, the integrating device 1300 extracts a content introduction status indicating which communication device 1100 is involved with the introduction of each piece of content, based on the viewing results in FIG. 21. FIG. 23 is an example of data that makes up the content introduction status. Then, the content evaluation value is calculated by tallying the introducer evaluation values of the communication devices involved in the content introduction, in the same manner as in the first embodiment. Note that the content evaluation value may be calculated based on the number of introductions, the number of views, the number of re-introductions, and so on.

(2-3) Processing for Sending Evaluation Value Ranking of Integrating Device

FIG. 24 is an example of an introducer evaluation value ranking, and FIG. 25 is an example of a content evaluation value ranking. The integrating device 1300 ranks the introducers in order from, for example, the highest introducer evaluation value down, as shown in FIG. 24, based on the data in the evaluation value storage portion 1315 illustrated in FIG. 22. In addition, the integrating device 1300 ranks the content in order from, for example, the highest content evaluation value down, as shown in FIG. 25, based on the data in the evaluation value storage portion 1315. The integrating device 1300 then sends the introducer evaluation value rankings and content evaluation value rankings that have undergone the ranking processing to the communication devices 1200.

(3) Functional Configuration

Next, the functional configurations of the devices shall be described.

(3-1) Functional Configuration of Communication Device that is a Viewer

Figure 26:
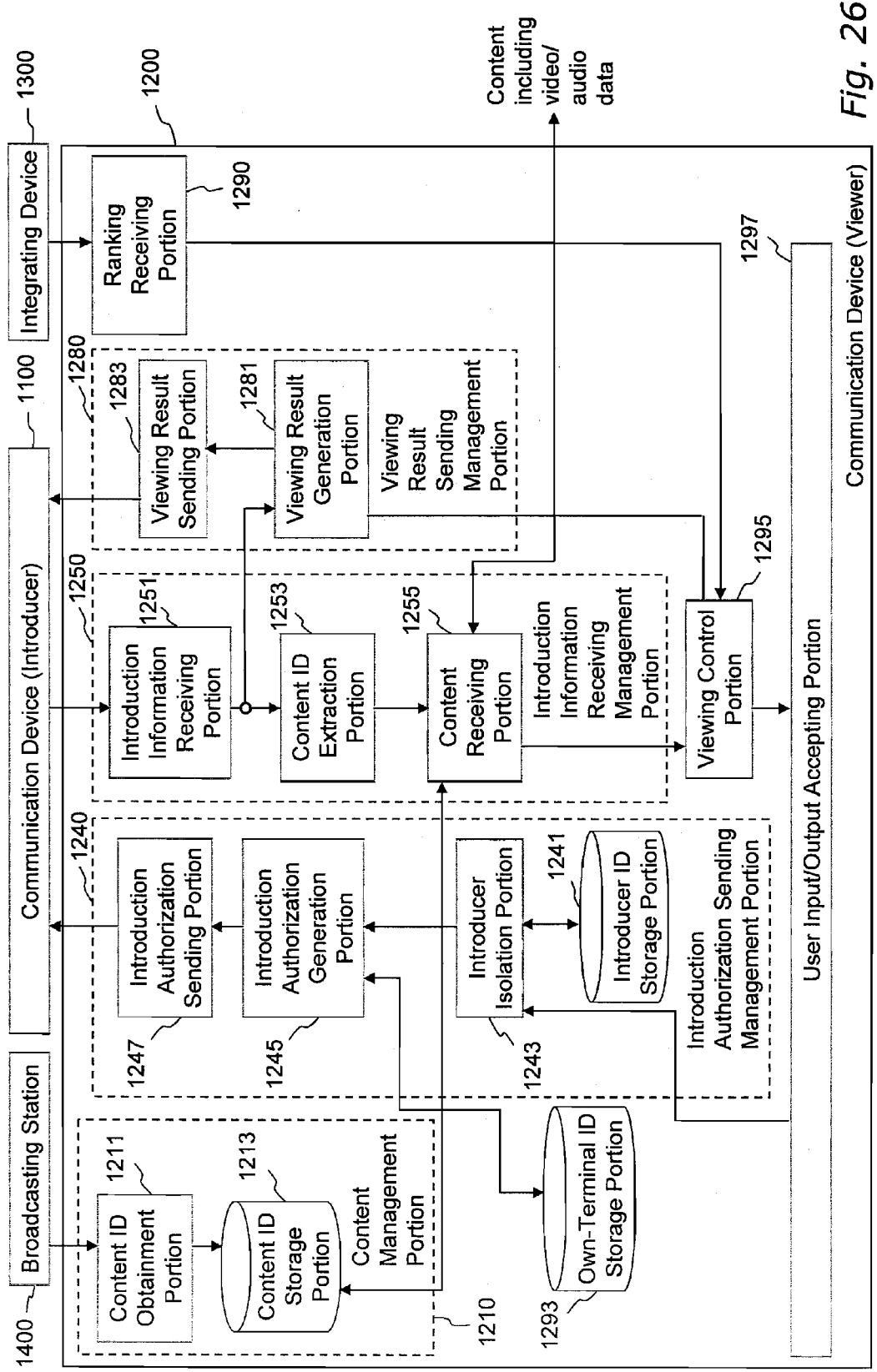
FIG. 26 is a functional configuration diagram of a communication device.

First, the functional configuration of the communication device 1200, which is the viewer, shall be described. FIG. 26 is a function block diagram of the communication device 1200. The communication device 1200 includes a content management portion 1210, an introduction authorization sending management portion 1240, an introduction information receiving management portion 1250, a viewing result sending management portion 1280, a ranking receiving portion 1290, an own-terminal ID storage portion 1293, a viewing control portion 1295, and a user input/output accepting portion 1297. Here, the communication device 1200 illustrated in FIG. 26 differs from the communication device 1200 illustrated in FIG. 12 and described in the first embodiment in that the viewing result sending portion 1283 sends the viewing results to the integrating device 1300. Hereinafter, descriptions shall be provided regarding the viewing result sending management portion 1280 only; the rest of the configuration is identical to that of the communication device 1200 of the first embodiment, and thus descriptions thereof shall be omitted.

The viewing result sending management portion 1280 includes a viewing result generation portion 1281 and a viewing result sending portion 1283. Upon receiving the notification that, for example, the viewer of the communication device "a" will view the content via the viewing control portion 1295, the viewing result generation portion 1281 generates the viewing results based on that notification. At this time, the viewing results are generated so as to include, for example, a viewer ID of "communication device a", a content ID of "content α", "yes" for whether or not the content has been viewed, and an ID of "integrating device" of the integrating device 1300 to which the viewing results are sent. The viewing result sending portion 1283 sends the generated viewing results to the integrating device 1300.

Figure 27:
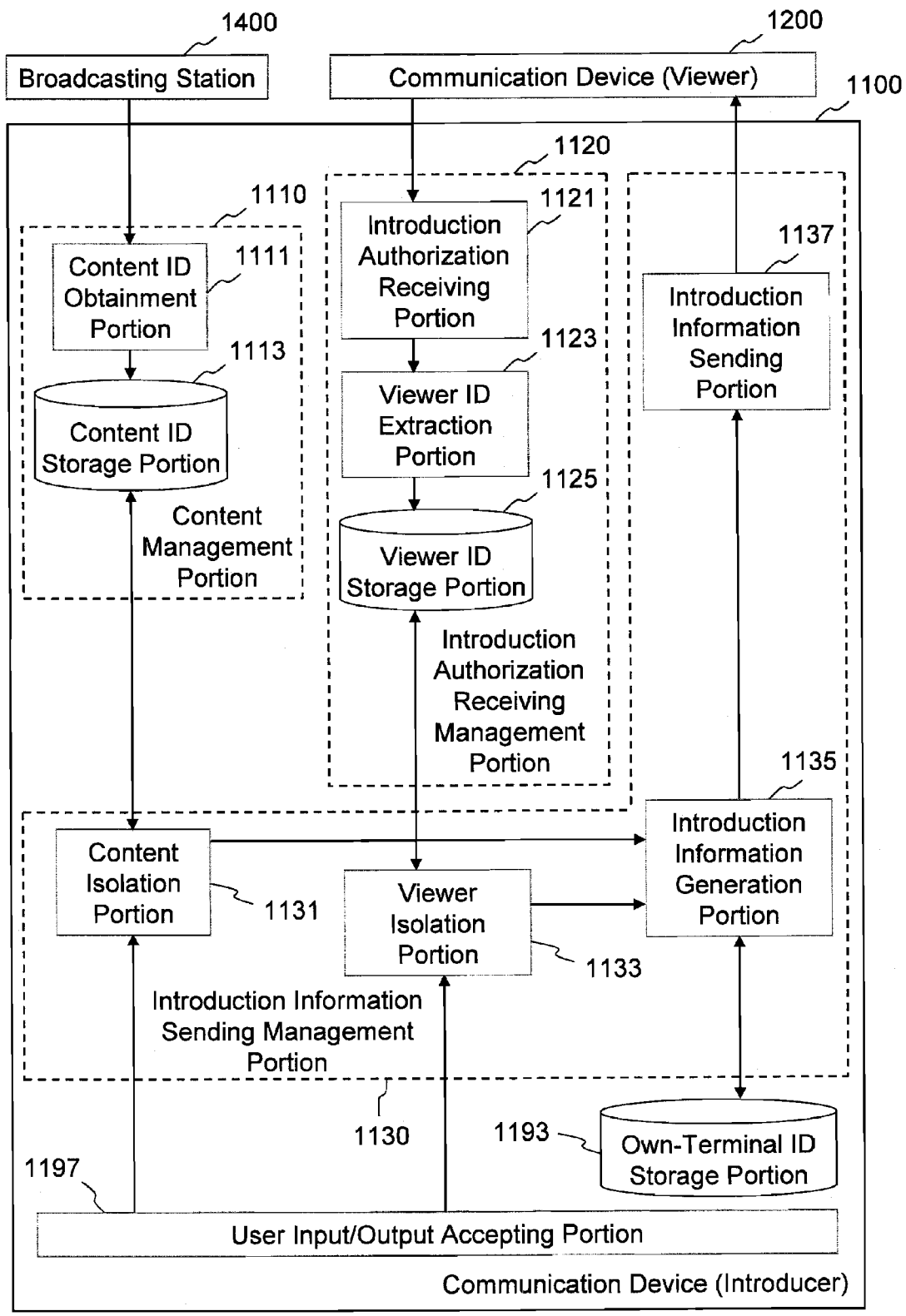
FIG. 27 is a functional configuration diagram of a communication device.

(3-2) Functional Configuration of Communication Device that is an Introducer Next, the functional configuration of the communication device 1100, which is the introducer, shall be described. FIG. 27 is a function block diagram of the communication device 1100. The communication device 1100 includes a content management portion 1110, an introduction authorization receiving management portion 1120, an introduction information sending management portion 1130, an own-terminal ID storage portion 1193, and a user input/output accepting portion 1197. Here, the communication device 1100 illustrated in FIG. 27 differs from the communication device 1100 illustrated in FIG. 13 and described in the first embodiment in that the evaluation value management portion 1170 is not included. The rest of the configuration of the communication device 1100 is the same as in the first embodiment, and therefore descriptions thereof shall be omitted.

(4) Functional Configuration of Integrating Device

Figure 28:
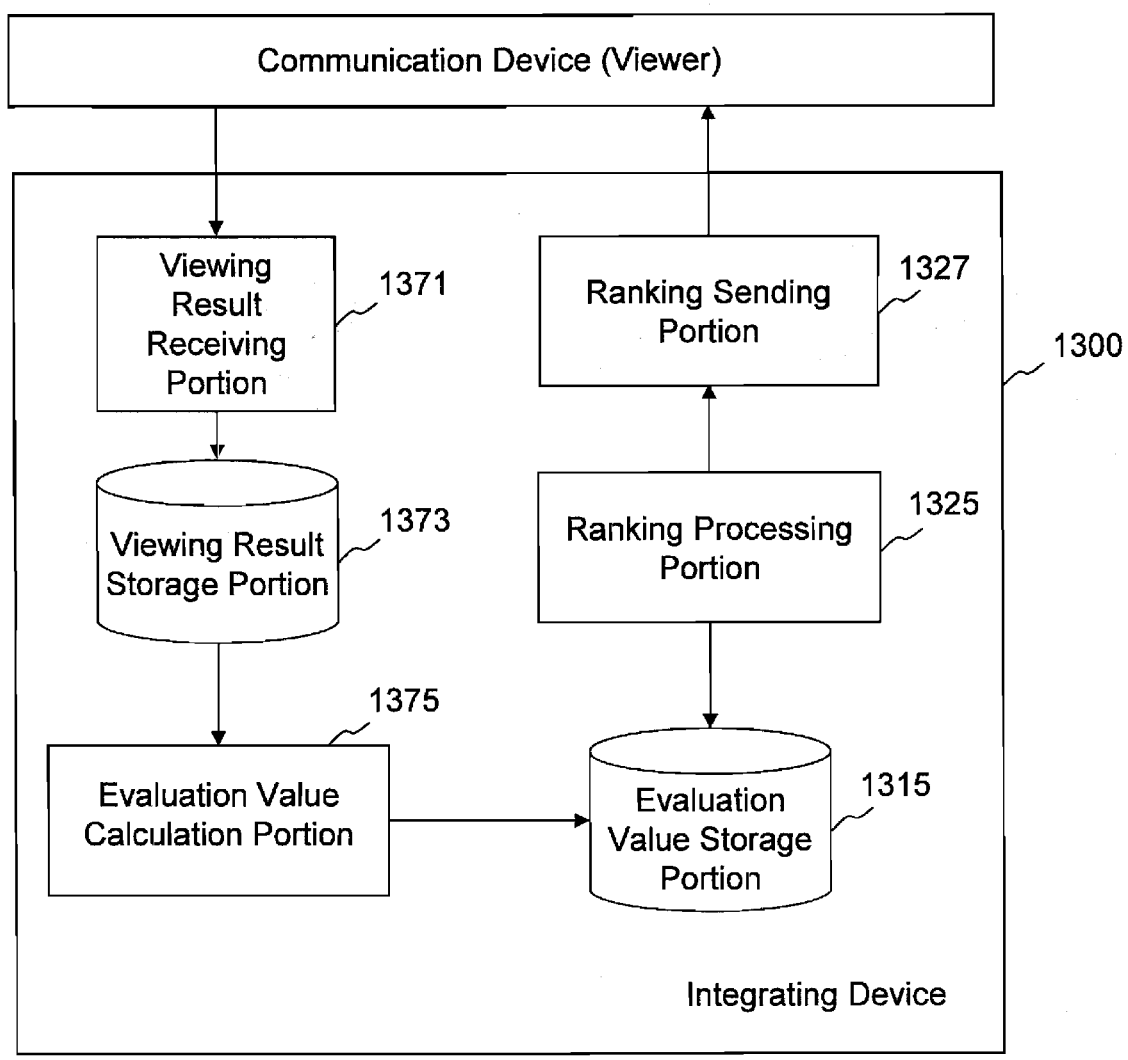
FIG. 28 is a functional configuration diagram of an integrating device.

Next, the functional configurations of the integrating devices 1300 shall be described. FIG. 28 is a function block diagram of the integrating device 1300. The integrating device 1300 includes a viewing result receiving portion 1371, the viewing result storage portion 1373, an evaluation value calculation portion 1375, an evaluation value storage portion 1315, a ranking processing portion 1325, and a ranking sending portion 1327. Here, the integrating device 1300 illustrated in FIG. 28 differs from the integrating device 1300 illustrated in FIG. 14 and described in the first embodiment in that the evaluation value data receiving portion 1310 is not included, while the viewing result receiving portion 1371 and the viewing result storage portion 1373 are included. Hereinafter, the functional configurations of these portions shall be described.

Descriptions shall be provided using the example shown in FIG. 20, where, for example, the communication device A sends introduction information to the communication device "a" and the communication device "b". The viewing result receiving portion 1371 of the integrating device 1300 receives viewing results from the viewing result sending portions 1283 of the communication device "a" and the communication device "b". The viewing result storage portion 1373 stores these viewing results in the manner previously shown in FIG. 21. The evaluation value calculation portion 1375 calculates an introducer evaluation value for each communication device based on the viewing results stored in the viewing result storage portion 1373. The introducer evaluation value is calculated from the viewing percentage, total number of introductions, number of views, number of re-introductions, and so on of the content, as described earlier. The evaluation value storage portion 1315 stores the calculated introducer evaluation values in the manner shown in FIG. 22.

Furthermore, the evaluation value calculation portion 1375 extracts a content introduction status, such as that shown in FIG. 23, indicating which communication device is involved with the introduction of each piece of content, based on the viewing results in FIG. 21. The evaluation value calculation portion 1375 then calculates the content evaluation value based on the introducer evaluation value and the information of the communication devices involved with the introduction of the content. The calculated content evaluation values are stored in the evaluation value storage portion 1315.

Next, the ranking processing portion 1325 ranks each of the communication devices 1100 in the manner shown in FIGS. 24 and 25 based on the introducer evaluation values and content evaluation values within the evaluation value storage portion 1315. The ranking sending portion 1327 then sends the introducer evaluation value rankings and content evaluation value rankings that have undergone the ranking processing to the ranking receiving portions 1290 of the communication devices 1200.

(5) Processing Flow in Each Device

Next, processing performed by the communication devices 1100, which are the introducers, the communication device 1200, which is the viewer, and the integrating device 1300 shall be described.

(5-1) Processing of Introducer Communication Device

Figure 29:
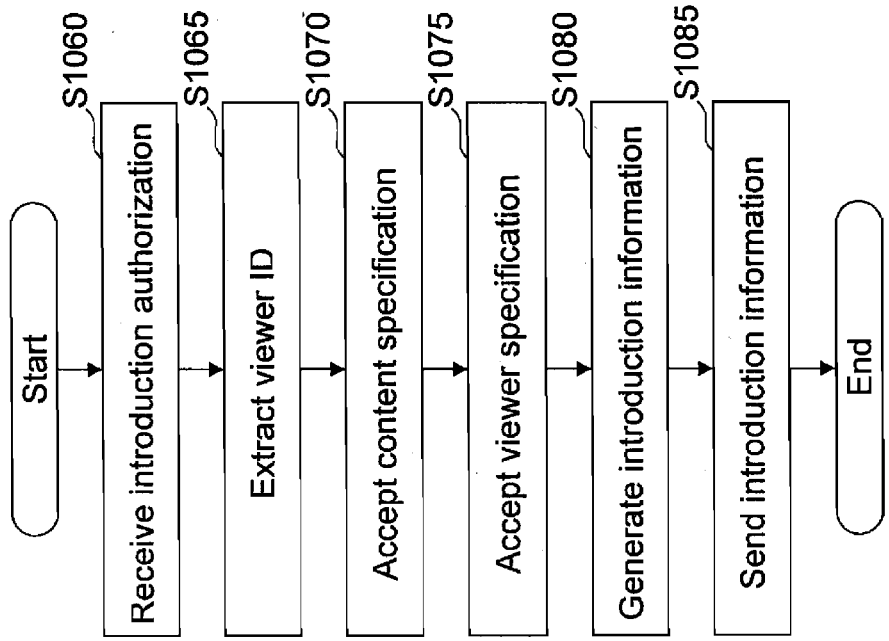
FIG. 29 is a flowchart illustrating an example of introduction authorization receiving processing and introduction information sending processing.

First, the introduction authorization receiving processing and introduction information sending processing performed by the communication device 1100, which is the Introducer, shall be described. FIG. 29 is a flowchart illustrating an example of the introduction authorization receiving processing and the introduction information sending processing. This processing is the same as the introduction authorization receiving processing and the introduction information sending processing illustrated in FIG. 15 and described in the first embodiment, and thus the processing from Steps S1060 to S1085 shall be briefly described hereinafter.

The introduction authorization receiving portion 1121 receives the introduction authorization from the communication device 1200 (see Step S1060). The viewer ID storage portion 1125 stores the viewer ID extracted from the introduction authorization by the viewer ID extraction portion 1123 (see Steps S1065 and S1070). The introduction information generation portion 1135 generates introduction information including the content ID, the viewer ID, and the introducer ID specified by the user of the communication device 1100 (see Steps S1075 and S1080). The introduction information sending portion 1137 sends the introduction information to the communication device 1200 (see Step S1085).

(5-2) Integration Device Processing

Figure 30:
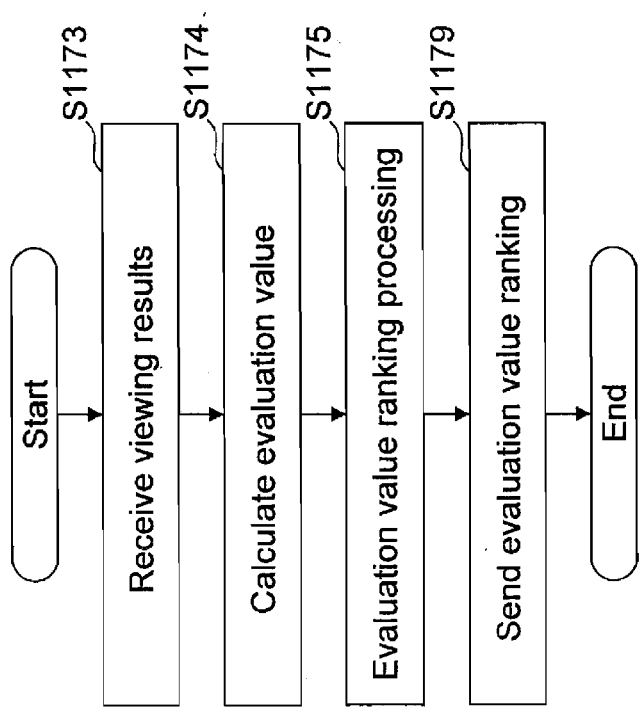
FIG. 30 is a flowchart illustrating an example of ranking processing performed by an integrating device.

Next, the ranking processing performed by the integrating device 1300 shall be explained. FIG. 30 is a flowchart illustrating an example of the ranking processing performed by the integrating device 1300.

Step S1173: the viewing result receiving portion 1371 receives viewing results from the viewing result sending portion 1283 of the communication device 1200. The viewing result storage portion 1373 stores these viewing results.

Step S1174: the evaluation value calculation portion 1375 calculates an introducer evaluation value for each communication device 1100 based on the viewing results stored in the viewing result storage portion 1373. Furthermore, the evaluation value calculation portion 1375 calculates the content evaluation value based on the information of the communication devices involved with the introduction of the content and the introducer evaluation value extracted from the viewing results.

Step S1175: the ranking processing portion 1325 performs ranking based on the calculated introducer evaluation value and content evaluation value.

Step S1179: the ranking sending portion 1327 sends the introducer evaluation value rankings and content evaluation value rankings that have undergone the ranking processing to the ranking receiving portions 1290 of the communication devices 1200.

(5-3) Processing of Viewer Communication Device

Figure 31:
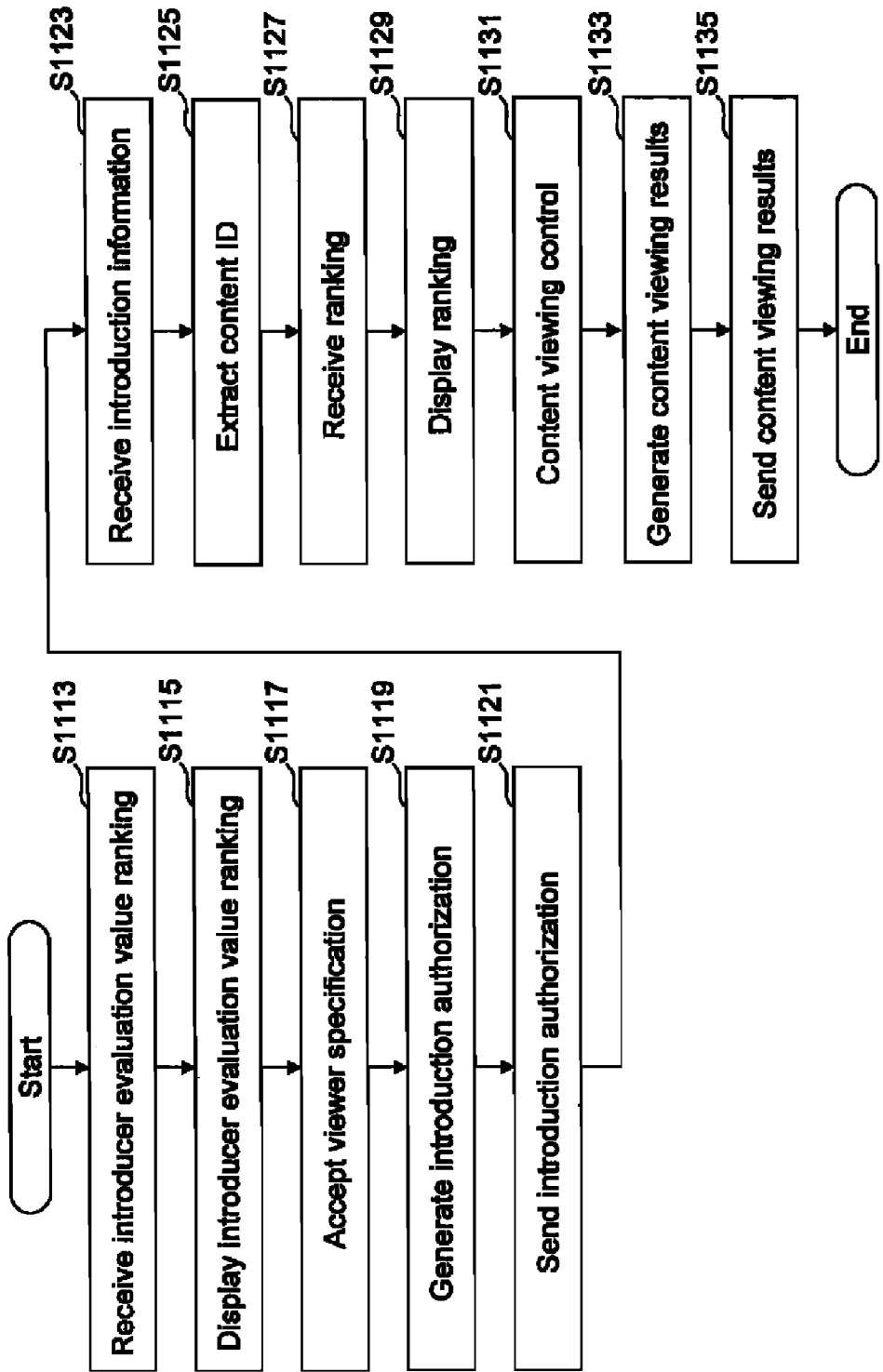
FIG. 31 is a flowchart illustrating an example of introduction authorization sending processing and introduction information receiving processing.

Next, the introduction authorization sending processing and introduction information receiving processing performed by the communication device 1200, which is the viewer, shall be explained. FIG. 31 is a flowchart illustrating an example of the introduction authorization sending processing and the introduction information receiving processing. This processing is the same as the introduction authorization sending processing and the introduction information receiving processing illustrated in FIG. 18 and described in the first embodiment, and thus the processing from Steps S1113 to S1135 shall be briefly described hereinafter.

The user input/output accepting portion 1297 presents the introducer evaluation value ranking received from the integrating device 1300 via the ranking receiving portion 1290 to the viewer (see Steps S1113 and S1115). The introduction authorization generation portion 1245 generates an introduction authorization configured of the viewer ID and the introducer ID of the specified introducer, and the introduction authorization sending portion 1247 sends the generated introduction authorization to the communication device 1100 (see Steps S1117 to S1121). The introduction information receiving portion 1251 receives the introduction information including the content ID from the communication device 1100 (see Step S1123). Upon receiving a notification from the viewing control portion 1295, the content receiving portion 1255 accesses the storage location of the content based on the content ID, and obtains video data, audio data, or the like (see Step S1125). The viewing control portion 1295 presents the content evaluation value ranking received from the integrating device 1300 by the ranking receiving portion 1290 to the user (see Steps S1127 and S1129). Then, the viewing control portion 1295 and the user input/output accepting portion 1297 output the video data and audio data (see Step S1131). The viewing result generation portion 1281 generates the viewing results based on the notification from the viewing control portion 1295 (see Step S1133). The viewing result generation portion 1281 sends the generated viewing results to the integrating device 1300 (see Step S1135).

(6) Summary of Effects

As described thus far, in the second embodiment, the integrating device can calculate the introducer evaluation value based on the viewing results by receiving the viewing results from each of the communication devices. Accordingly, there is no need for the communication devices to calculate their own introducer evaluation values. In addition to this, similar effects to those obtained in the first embodiment, described hereinafter, can be obtained here as well.

By receiving the introducer evaluation value ranking, the viewer of a communication device can obtain information regarding the selection of introducers; for example, the viewer can select the communication device having the highest introducer evaluation value and send the introduction authorization. Additionally, the viewer of a communication device can avoid contents being sent from a specific communication device in a one-sided manner while reflecting his/her intent through the sending of the introduction authorization.

Furthermore, the viewer of the communication device can determine whether or not to view the received content by referring to the introducer evaluation value ranking. Thus, the viewer of the communication device can determine whether or not to view content or whether or not to send the content to another communication device, and so on, based on the introducer evaluation value ranking.

The range of content that is viewed tends to be gradually constrained in the case where content introductions are received with the range of content being limited in advance. However, by limiting the communication devices that are introduced through the use of introduction authorizations, it is possible to prevent content from being constrained more than in the case where the range of content is directly limited.

Third Embodiment (1) Configuration (1-1) Overall Configuration

Figure 32:
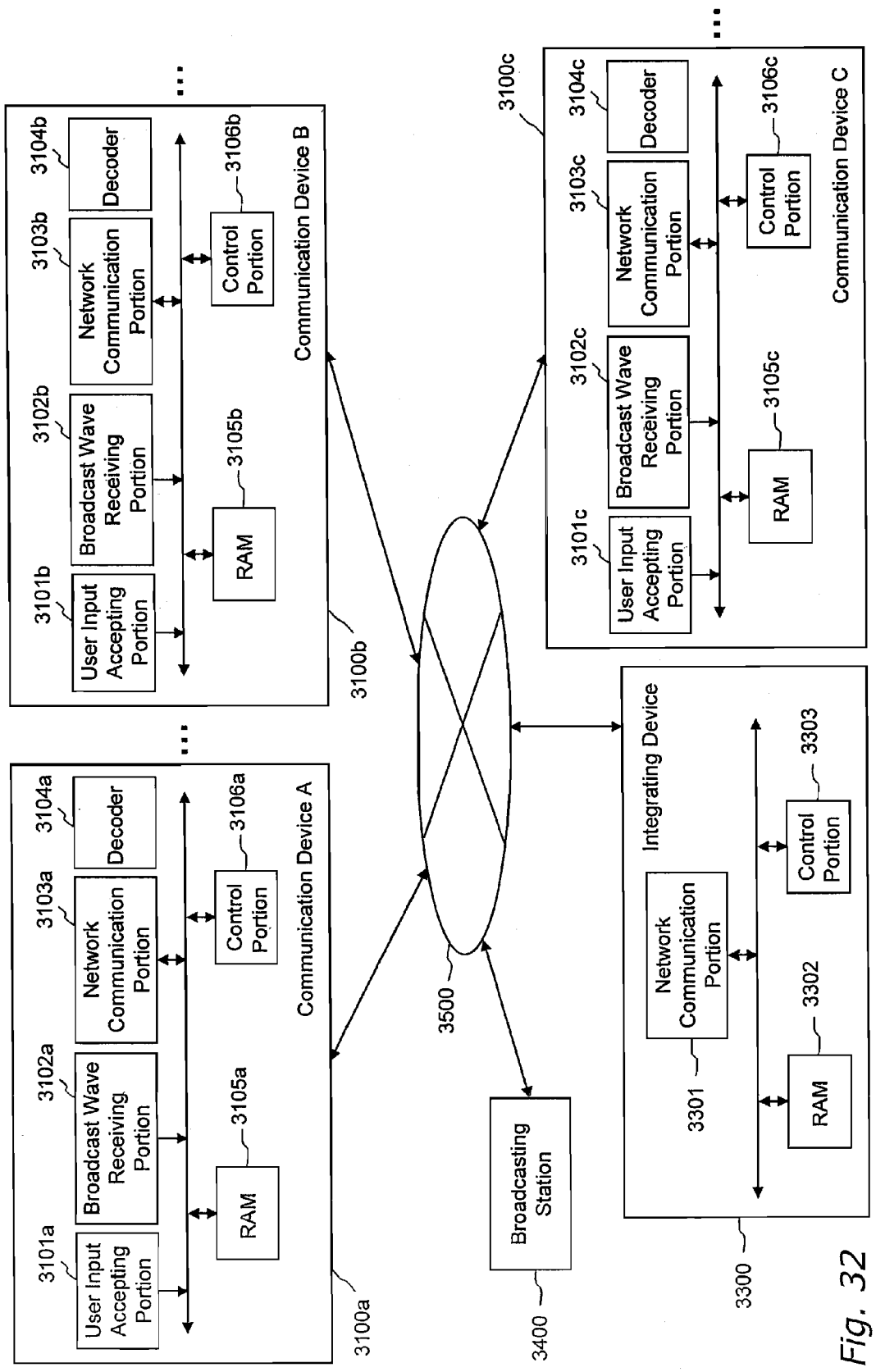
FIG. 32 is a diagram illustrating a network configuration including a communication device according to the third embodiment of the present invention.

FIG. 32 is a configuration diagram of a network including communication devices according to the third embodiment of the present invention. A plurality of communication devices 3100 (communication device A, communication device B, communication device C . . . ), an integrating device 3300, and a broadcasting station 3400 are connected via a network 3500. A user of the communication device 3100 introduces content or a content ID to another communication device 3100, receives introductions of content or a content ID from another communication device 3100, and so on. Accordingly, the users of each of the communication devices 3100 are introducers in the case of introducing content or a content ID, and viewers in the case of receiving content or a content ID from an introducer. Content or content IDs are sent and received among the communication devices, the introducer evaluation values, content introduction statuses, and the like calculated by the communication devices 3100 are sent to the integrating device 3300. The integrating device 3300 calculates content evaluation values based on the introducer evaluation values and content introduction statuses, and sends the resultants to the communication devices 3100. The hardware configurations of the communication devices 3100, integrating device 3300, and broadcasting station 3400 are identical to those described in the first embodiment, and therefore descriptions thereof shall be omitted here.

Figure 33:
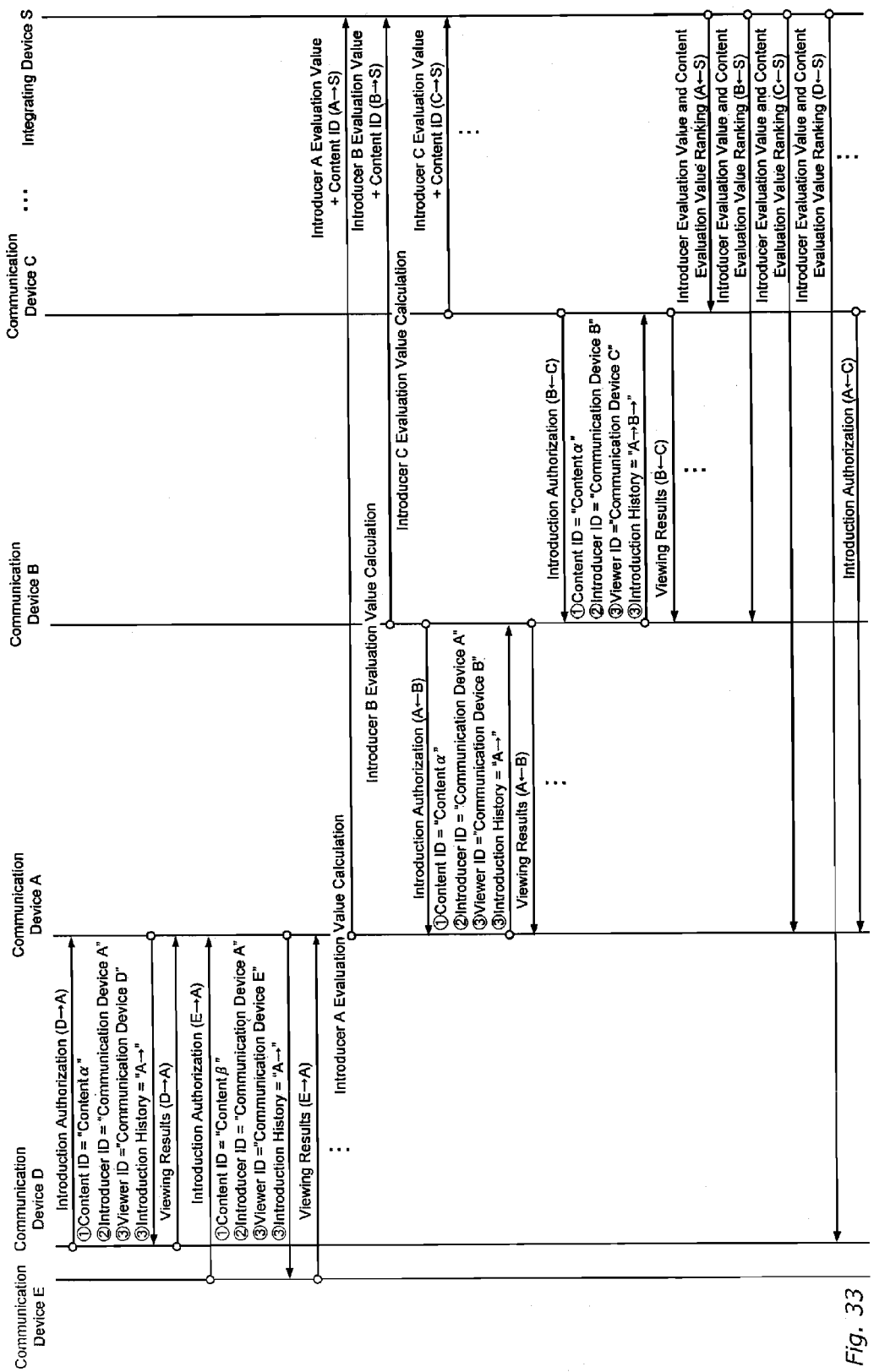
FIG. 33 is a diagram illustrating an outline of the processing for sending/receiving an introduction history, the introducer evaluation value, and the content evaluation value.

(2) Outline of Processing for Sending/Receiving Introduction History, Introducer Evaluation Value, and Content Evaluation Value FIG. 33 is a diagram illustrating an outline of the processing for sending/receiving an introduction history, the introducer evaluation value, and the content evaluation value. Here, it is assumed that content is introduced and the introduced content is received among the communication device A, communication device B, communication device C, communication device D, and communication device E.

(2-1) Introduction Authorization Reception, Introduction Information Transmission, and Viewing Result Reception Processing (2-1-1) Communication Device A First, the processing for receiving a content introduction and viewing results performed by the communication device A shall be explained with reference to FIG. 33. It is assumed that the viewer of the communication device D has selected the communication device A as the introducer she/he wishes to receive a content introduction from. Accordingly, the communication device D sends, to the communication device A, an introduction authorization authorizing content or a content ID to be sent to itself. Here, an introduction authorization including a viewer ID of "communication device D" and an introducer ID of "communication device A" is sent from the communication device D to the communication device A. Note that the communication devices may introduce the content itself, or may introduce a content ID that identifies the content. Hereinafter, it is assumed that the content introduction is performed using the content ID.

The communication device A receives the introduction authorization from the communication device D, and in response to this, sends introduction information including content to the communication device D. Here, the introduction information includes a content ID for identifying the content for which the communication device A is performing the introduction, the introducer ID of the introducer, which is the communication device A itself, the viewer ID of the viewer, which is the communication device D, and an introduction history of the content spanning until the sending of the content to the communication device A. For example, assuming the ID of the introduced content is "content α", the introduction information is configured so as to include a content ID of "content α", an introducer ID of "communication device A", a viewer ID of "communication device D", and an introduction history having data indicating "A→", as shown in FIG. 33. Here, the introduction history of "A→"

indicates that the communication device A is involved in the introduction of the content α, and in particular indicates that the content α was first introduced by the communication device A. In other words, this indicates that the communication device A is the source of the introduction of the content α.

Having received the introduction information, the communication device D sends viewing results indicating whether or not the introduced content has been viewed to the communication device A. The viewing results include, for example, the viewer ID, content ID, whether or not the content has been viewed, the introducer ID, and so on. Therefore, the communication device D generates, for example, a viewer ID of "communication device D", a content ID of "content α", "yes" for whether or not the content has been viewed, and an introducer ID of "communication device A" as the viewing results, and sends these to the communication device A. The communication device A stores the received viewing results on, for example, a content-by-content basis. Note that viewer feedback, such as the degree of interest the viewer has in the introduced content, may be included in the viewing results.

Referring again to FIG. 33, the communication device E sends an introduction authorization to the communication device A. Here, it is assumed that the communication device A introduces content having a content ID of "content β" to the communication device E. Therefore, the communication device A sends introduction information configured so as to include a content ID of "content β", an introducer ID of "communication device A", a viewer ID of "communication device E", and an introduction history having data of "A→" to the communication device E. Having received the introduction information, the communication device E sends viewing results to the communication device A.

Furthermore, referring to FIG. 33, the communication device B sends an introduction authorization to the communication device A. Here, it is assumed that the communication device A introduces content having a content ID of "content α" to the communication device B. Therefore, the communication device A sends introduction information configured so as to include a content ID of "content α", an introducer ID of "communication device A", a viewer ID of "communication device B", and an introduction history having data of "A→" to the communication device B. Having received the introduction information, the communication device B sends viewing results to the communication device A.

(2-1-2) Communication Device B

Referring to FIG. 33, the communication device C sends an introduction authorization to the communication device B. Here, it is assumed that the communication device B introduces content having a content ID of "content α", which has been introduced to the communication device B by the communication device A, to the communication device C. Accordingly, when the content α is introduced to the communication device C, the introduction history becomes "A→B→". Then, the communication device B sends introduction information configured so as to include a content ID of "content α", an introducer ID of "communication device B", a viewer ID of "communication device C", and an introduction history having data of "A→B→" to the communication device C. Having received the introduction information, the communication device C sends viewing results to the communication device B.

(2-2) Introducer Evaluation Value Calculation (2-2-1) Calculating Introducer Evaluation Value of Communication Device A as Introducer The communication device A obtains viewing results from the communication devices by repeating the sending/receiving of the introduction authorizations and the sending/receiving of the introduction information in the above manner. FIG. 34 is an example of the viewing results obtained by the communication device A, and is data stored in a viewing result storage portion 3173, which shall be described later. Referring to FIG. 34, the communication device D has viewed the content α, introduced by the communication device A. However, the communication device E has not viewed the content β, introduced by the communication device A. The communication device B has viewed the content α, introduced by the communication device A. The communication device A calculates the introducer evaluation value of the communication device A as an introducer based on these viewing results. For example, the introducer evaluation value is calculated through the following formula (1).

Introducer evaluation value=(Number of views of content)/(Total number of introductions of content)   (1)

The above formula (1) calculates the ratio between the total number of content introductions performed by the introducer and the number of views by a viewer who received the introductions of content. Through this, the introducer evaluation value is high in the case where the ratio of views to introductions is high. In other words, the introducer is considered to be sending content that is highly useful or of considerable interest to the viewer since the rate at which the viewer views content introduced by the introducer is high. In particular, in the case where the introducer evaluation value has been calculated by the above formula (1), the introducer evaluation value is high if the ratio of views to introductions is high, even if the number of times the user of the communication device viewed the content is low. It should be noted that the number of views includes the number of communication devices through which content was viewed in the case where the content was introduced to a plurality of communication devices, the number of pieces of content viewed through a communication device in the case where plural pieces of content were introduced to the communication device, and so on.

The above descriptions provide an example of a method for calculating the introducer evaluation value by sending the viewing results to a direct introduction source, or in other words, to a primary introduction source. However, an introducer evaluation value that incorporates the spread and length of the introduction path may be calculated, by back-tracking the introduction paths of each content based on the introduction history included in the introduction information that includes not only the viewing results of the primary introduction destination but also the viewing results of the secondary introduction destination and on.

FIG. 35 is an example of a viewing result storage portion of the communication device A. The communication device A introduces the content α to the communication devices B1, B2, and B3, which are primary introduction destinations. The primary communication device B1, which is a primary introduction destination, further introduces the content cc to communication devices C11 and C12, which are secondary introduction destinations. The primary communication device B2 further introduces the content α to communication devices C21 and C22, which are secondary introduction destinations. Furthermore, the communication devices C11, C12, and C21, which are secondary introduction destinations, each introduce the content α to the communication devices D111 to D115, D121 to D122, and D211 to D213, which are tertiary introduction destinations, respectively. Here, the communication device A, which is the introduction source of the content α, receives viewing results not only from the communication devices B1, B2, and B3, which are primary introduction destinations, but also from the communication devices C21 to C22, D111 to D115, D121 to D122, and D211 to D213, which are secondary or subsequent introduction destinations. Accordingly, the communication device A may calculate the introducer evaluation value based on these viewing results. Alternatively, each communication device may calculate its own introducer evaluation value based on the viewing results, and send the introducer evaluation value to the communication device that is the introduction source. For example, a communication device located partway along the content introduction path receives the viewing results from a communication device it introduced the content to directly, and calculates its own introducer evaluation value. Furthermore, the communication device located partway along the content introduction path sends its own introducer evaluation value and the viewing results of the introduced content to the communication device that is the introduction source of the content. The communication device that is the introduction source calculates its own introducer evaluation value based on the introducer evaluation value of the communication device that is the introduction destination and the viewing results of the introduced content.

This shall be described in more detail hereinafter. For example, it is assumed that the communication device that is the introduction source is $U(i)$, the communication device that is the direct introduction destination of $U(i)$ is $U(i-1)$, and "i" is an integer. Furthermore, it is assumed that the introduced content is $C(j)$, and "j" is an integer as well.

Here, the introducer evaluation values of the communication devices are calculated through the following equation.

[Equation 1]

$$\text{Introducer evaluation value of communication device } U(i) =$$

$$\sum_{\text{Introduced content } C(j)} \text{Introducer evaluation value of } U(i) \text{ with respect to Content } C(j)$$

$$\text{Introducer evaluation value of } U(i) \text{ with respect to Content } C(j) =$$

$$\frac{\text{Number of introduced destinations } U(i-1) \text{ having viewed Content } C(j)}{\text{Number of introduced destinations } U(i-1) \text{ having introduceded Content } C(j)} +$$

$$\frac{1}{\text{Number of introduced destinations } U(i-1)} \times$$

$$\sum_{\text{Introduced destination } U(i-1)} \text{Introducer evaluation value of } U(i-1) \text{ with respect to Content } C(j)$$

$$\text{Introducer evaluation value of } U(i-1) \text{ with respect to Content } C(j) =$$

$$\frac{\text{Number of introduced destinations } U(i-2) \text{ having viewed Content } C(j)}{\text{Number of introduced destinations } U(i-2) \text{ having introduceded Content } C(j)} +$$

$$\frac{1}{\text{Number of introduced destinations } U(i-2)} \times$$

$$\sum_{\text{Introduced destination } U(i-2)} \text{Introducer evaluation value of } U(i-2) \text{ with respect to Content } C(j)$$

⋮

Applying the above equation to, for example, the viewing results illustrated in FIG. 35, the introducer evaluation value of the introduction source of content α, which is the communication device A, is calculated in the following manner.

[Equation 2]

Introducer evaluation value of communication device $C11$ located partway along the introduction path with respect to Content $\alpha = \frac{3}{5}$ Introducer evaluation value of communication device $C12$ located partway along the introduction path with respect to Content $\alpha = \frac{1}{2}$ Introducer evaluation value of communication device $B1$ located partway along the introduction path with respect to Content $\alpha = \frac{2}{2} + \frac{1}{2}\left(\frac{3}{5} + \frac{1}{2}\right)$ Introducer evaluation value of communication device $C21$ located partway along the introduction path with respect to Content $\alpha = \frac{1}{3}$ Introducer evaluation value of communication device $B2$ located partway along the introduction path with respect to Content $\alpha = \frac{1}{2} + \frac{1}{2}\left(\frac{1}{3}\right)$ Introducer evaluation value of communication device A with respect to Content $\alpha =$
$$\frac{2}{3} + \frac{1}{3}\left(\frac{2}{2} + \frac{1}{2}\left(\frac{3}{5} + \frac{1}{2}\right) + \frac{1}{2} + \frac{1}{2}\left(\frac{1}{3}\right)\right)$$

Introducer evaluation value of communication device A with respect to Content $\beta = \frac{1}{2}$ Introducer evaluation value of communication device $A =$
$$\left[\frac{2}{3} + \frac{1}{3}\left(\frac{2}{2} + \frac{1}{2}\left(\frac{3}{5} + \frac{1}{2}\right) + \frac{1}{2} + \frac{1}{2}\left(\frac{1}{3}\right)\right)\right] + \left[\frac{1}{2}\right]$$

By calculating the introducer evaluation value in the above manner, the introducer evaluation value can be calculated reflecting not only the viewing results of direct introduction destinations but also the viewing results of secondary introduction destinations and so on.

Note that the calculation of the introducer evaluation value is not limited to the above method; various other methods can be used.

In addition to this, the introducer evaluation value may also be calculated based on the total number of introduction authorizations received, the total number of introductions of the content, the number of views of the content, the number of re-introductions, and so on. A large number of introduction authorizations or introductions means that content introductions have been requested from more communication devices and therefore the evaluation value as an introducer is ranked higher. A large number of views means that more users of the communication devices are viewing introduced content and therefore the evaluation value as an introducer is ranked higher.

By using the number of introduction authorizations, the number of introductions, the number of views, the viewing percentage, the number of re-introductions, and so on as evaluation elements for evaluating the introducer, it is possible for a terminal to objectively calculate its own introducer evaluation value.

The communication device A sends the calculated introducer evaluation value of the communication device A along with the content introduction status as evaluation value data to the integrating device 3300. Here, the "content introduction status" expresses which content the communication devices, acting as introducers, have introduced, and is generated so as to include the introducer ID and content ID of the introduced content. As shown in FIG. 33, in the case where the communication device A introduces the content α and the content β, the communication device A generates a content introduction status including an introducer ID of "communication device A" and content IDs of "content α" and "content β".

(2-2-2) Calculating Introducer Evaluation Value of Communication Devices B and C as Introducers In the same manner as above, the other communication devices, including the communication devices B, C, and so on, also calculate introducer evaluation values and send the resultants along with content introduction statuses to the integrating device 3300.

(2-3) Calculation of Content Evaluation Value by Integrating Device

The integrating device 3300 receives the introducer evaluation values and the content introduction statuses from each of the communication devices, and calculates the content evaluation value based thereupon. The content evaluation value is calculated, for example, by tallying the introducer evaluation values of the communication devices involved in the introduction of a content.

To be more specific, assume that, for example the integrating device 3300 has received and stored the introducer evaluation values illustrated in FIG. 36 and the content introduction statuses illustrated in FIG. 37. Here, FIG. 36 is an example of the introducer evaluation values, and FIG. 37 is an example of the content introduction statuses; these are examples of the data stored in an evaluation value storage portion 3315 of the integrating device 3300. According to the introducer evaluation values in FIG. 36, the integrating device 3300 has received an introducer evaluation value of "70" from the communication device A, an introducer evaluation value of "100" from the communication device B, and an introducer evaluation value of "50" from the communication device C. Furthermore, according to the content introduction statuses in FIG. 37, the integrating device 3300 has obtained the communication device A, the communication device B, and the communication device C as communication devices that introduced the content α. In this case, the integrating device 3300 calculates a content evaluation value of "220" for the content α, by adding together the introducer evaluation value "70" of the communication device A, the introducer evaluation value "100" of the communication device B, and the introducer evaluation value "50" of the communication device C. In other words, the content evaluation values are calculated by adding weight to the values based on who introduced the content, and adding the values together. FIG. 38 is an example of the content evaluation values stored in the evaluation value storage portion 3315. By calculating the content evaluation values in this manner, the higher the introducer evaluation value of the introducer of a content is, the higher the evaluation value of the content itself becomes. It is possible to consider introducers with higher introducer evaluation values to be introducers that send content that is highly useful or of considerable interest to the viewer. Therefore, it is possible to evaluate whether content is highly useful or of considerable interest by calculating the content evaluation value thereof based on the introducer evaluation value.

The integrating device 3300 may receive the content introduction status including the number of introductions performed by each of the communication devices, such as that shown in FIG. 37. Then, the content evaluation value may be calculated with the number of introductions factored in. The integrating device 3300 calculates a content evaluation value of "490" for the content α, by adding together the introducer evaluation value "70" of the communication device A multiplied by the number of introductions of the content α by the communication device A "2", the introducer evaluation value "100" of the communication device B multiplied by the number of introductions of the content α by the communication device B "3", and the introducer evaluation value "50" of the communication device C multiplied by the number of introductions of the content α by the communication device C "1".

Alternatively, the content evaluation value may be calculated from, for example, the total number of times each content has been introduced, the number of pieces of content aside from the introduced piece of content, the number of views of content aside from the introduced content, the total number of views of each piece of content, the number of re-introductions of each piece of content, and so on. A large number of introductions means that the content has been introduced more and therefore the content evaluation value is ranked higher. Furthermore, a large number of pieces of content aside from the introduced piece of content means that the introduced content has been selected and introduced from among a larger pool of content and therefore the content evaluation value is ranked higher. In the same manner, a large number of views of other content means that the introduced content has been more stringently selected and therefore the content evaluation value is ranked higher. Furthermore, a large number of views means that the content has been viewed more and therefore the content evaluation value is ranked higher. In this case, the integrating device 3300 receives the number of introductions, number of views, number of re-introductions, and so on a content-by-content basis from the communication devices, and calculates the total number of introductions, total number of views, and total number of re-introductions by adding those together.

Note that the content evaluation value may be calculated with a plurality of evaluation elements being combined.

(2-4) Ranking Processing Performed by Integrating Device

FIG. 39 is an example of an introducer evaluation value ranking. The integrating device 3300 ranks, for example, the introducer evaluation values of the communication devices shown in FIG. 36 based on the introducer evaluation values in the manner shown in FIG. 39. FIG. 40 is an example of content evaluation value ranking performed by a ranking processing portion 3325. The integrating device 3300 ranks the content in the manner shown in FIG. 40 based on the content evaluation values calculated in the manner described above.

The integrating device 3300 then sends the introducer evaluation value rankings and content evaluation value rankings that have undergone the ranking processing to the communication devices.

(2-5) Introducer Evaluation Value Ranking and Content Evaluation Value Ranking Reception The communication devices receive the introducer evaluation value ranking and content evaluation value ranking from the integrating device. Through this, the viewer of each communication device can obtain information regarding the selection of introducers and selection of content.

(3) Degree of Freedom in Selection of Introducer and Content

The user of a communication device 3100 can obtain the degree of freedom in the selection of introducers and content, an example of which shall be explained hereinafter, by receiving the introducer evaluation value ranking and content evaluation value ranking.

For example, the communication device C receives introduction information of the content α including an introduction history of "A →B →" from the communication device B, as shown in FIG. 33. Furthermore, the communication device C receives the introducer evaluation value ranking and content evaluation value ranking shown in FIGS. 39 and 40, respectively, from the integrating device 3300. The user of the communication device C selects introducers, the content she/he will view, the content she/he will introduce to other viewers, and so on based on the introduction history, introducer evaluation value ranking, and content evaluation value ranking. Hereinafter, selection of an introducer based on the introducer evaluation value ranking, selection of content based on the content evaluation value ranking, and selection of an introducer based on the introduction history shall be described.

(2-5-1) Selection of Introducer Based on Introducer Evaluation Value Ranking

The viewer of the communication device C, which has received the introducer evaluation value ranking, can select the introducer having the highest introducer evaluation value as a communication device. In this manner, an introducer can be selected based on the introducer evaluation value ranking, and thus the degree of freedom of the introducer can be increased. Note that the communication device may be caused to automatically select the highest-ranked communication device as the introducer based on the introducer evaluation value ranking.

(2-5-2) Selection of Content Based on Content Evaluation Value Ranking

In the case where the viewer of the communication device C receives the introduction of content along with the content evaluation value ranking, she/he can determine whether or not to view the content based on the content evaluation value ranking of the introduced content. In the case where the communication device C, which is the viewer, receives plural content introductions, the viewer can select the content having the highest content evaluation value as the content to be viewed. On the other hand, in the case where the user of the communication device C is the introducer of the content, she/he can select the highest-ranked content based on the content evaluation value ranking when selecting content to introduce to a viewer. In this manner, the content to be introduced, the content to be viewed, and so on can be selected based on the content evaluation value ranking, and thus it is possible to selectively view highly useful or interesting content while increasing the degree of freedom of viewers or introducers.

Note that a communication device may automatically select the content ranked highest as the content to be introduced, the content to be viewed, and so on, based on the content evaluation value ranking.

(2-5-3) Selection of Introducer Based on Introduction History The introduction history "A→B→" of the content α received by the communication device C indicates that the communication device A is the source of the introduction of the content α. In other words, the viewer of the communication device C can understand the transfer history of the content α and in particular can also understand that the introduction source of the content α is the communication device A. In this case, the viewer of the communication device C can select the communication device A, which is the source of the introduction of the content α, as the introducer, by referring to the introduction history. Also, the communication device C can receive an introduction of content from the communication device A, which is the source of the introduction, by sending an introduction authorization, as shown in FIG. 33, to the communication device A. In this manner, the viewer of a communication device can select an introducer based on the introduction history by the communication device obtaining the introduction history from the introducing device. Accordingly, the degree of freedom of the viewer is improved in terms of selection of the introducer; for example, an introduction authorization can be set in the communication device of the introducer selected based on the introduction history.

Furthermore, because the introduction history is information regarding which introducer was involved in the introduction of content received by the communication device, it is possible to obtain introducer information indicating the competence of a communication device as an introducer. In other words, because introducer information of no relevance to the introduction of content is not obtained, introducer information of introducers that have the potential to introduce content that is highly useful to the viewer that received the content introduction can be obtained. Furthermore, when a viewer selects the original introducer of the content as the next introducer based on the introduction history, the chance that highly useful or interesting content can be received increases.

It should be noted that a communication device may automatically select the source of the content introduction as the introducer based on the introduction history.

(2-5-4) Other

In addition, it is also possible for the introduction history, introducer evaluation value ranking, and content evaluation value ranking to be used comprehensively in the selection of introducers and selection of content. For example, it is possible to comprehensively judge to, for example, select introduced content as content to be viewed in the case where the content has been introduced by an introducer with a high introducer evaluation value rank, even if the content is low in the content evaluation value ranking.

Additionally, introduction information may be received from another communication device, and an introduction path model, in which that information is integrated and diagrammed, may be presented to the viewer. Through this, the viewer can select an introducer and send an introduction authorization, select content, and so on with reference to the introduction information, introduction path model, and the like received from the other communication device.

Furthermore, for example, viewing results such as those shown in FIG. 35 may be received from another communication device, and results compiled per communication device or per content may be presented to the viewer. Through this, the viewer can select an introducer, select content, and so on with reference to the complied results.

(3) Functional Configuration of Communication Device

Figure 41:
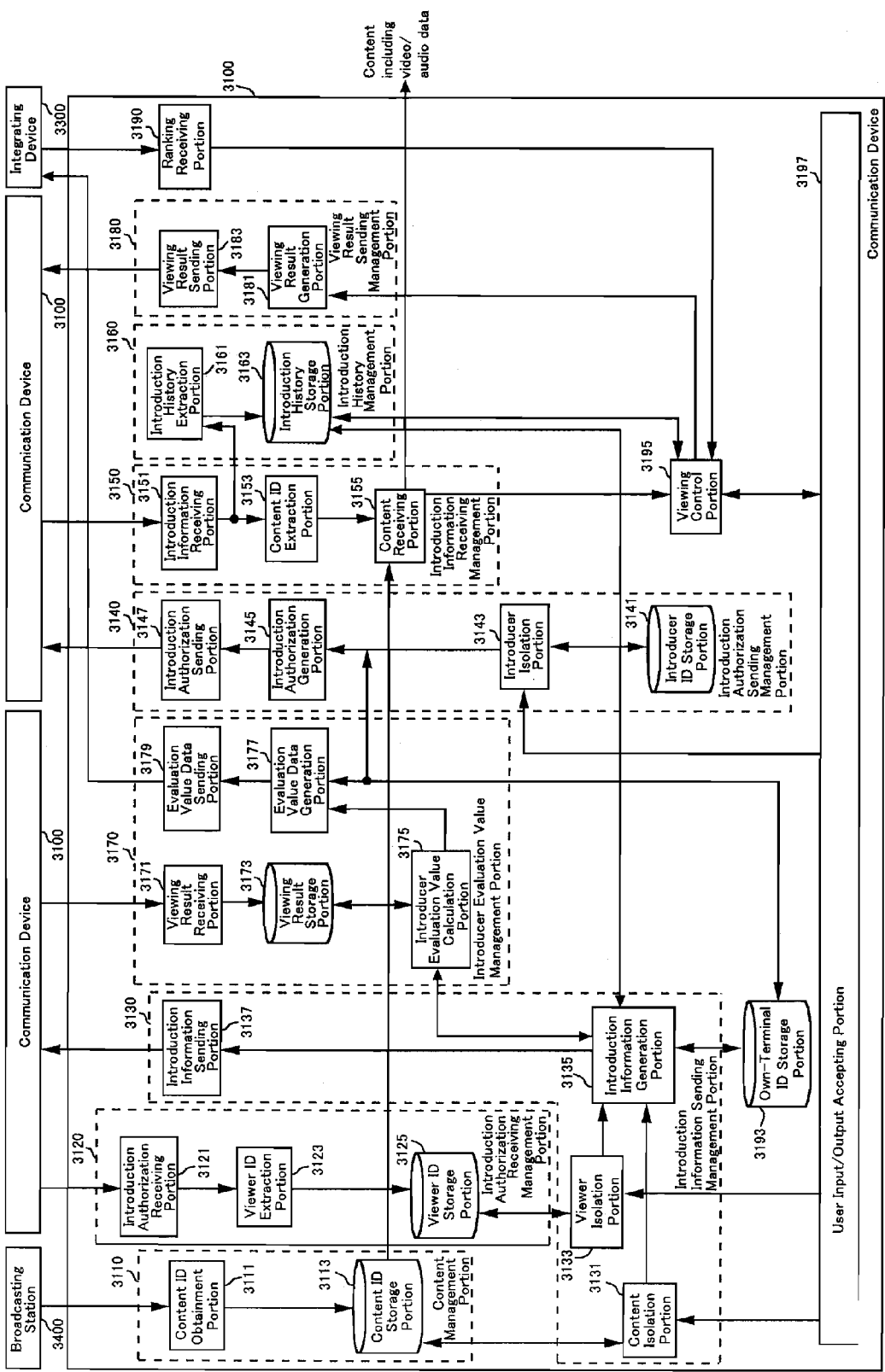
FIG. 41 is a diagram illustrating a functional configuration of a communication device according to the third embodiment.

Next, the functional configurations of the communication devices 3100 shall be described. FIG. 41 is a function block diagram of the communication device 3100. The communication device 3100 includes a content management portion 3110, an introduction authorization receiving management portion 3120, an introduction information sending management portion 3130, an introduction authorization sending management portion 3140, an introduction information receiving management portion 3150, an introduction history management portion 3160, an introducer evaluation value management portion 3170, a viewing result sending management portion 3180, a ranking receiving portion 3190, an own-terminal ID storage portion 3193, a viewing control portion 3195, and a user input/output accepting portion 3197. The functional configurations of each of these portions shall be described hereinafter. Note that the communication devices 3100 have identical functional configurations.

(3-1) Content Management Portion

The content management portion 3110 includes a content ID obtainment portion 3111 and a content ID storage portion 3113. The content ID obtainment portion 3111 obtains a content ID for identifying content and a storage location of the content such as URL from the broadcasting station 3400 or the like. The content ID storage portion 3113 associates the content ID with the storage location and stores these. Note that although the content ID and storage location are being stored here, the content itself may be stored within the communication device 3100 as well.

(3-2) User Input/Output Accepting Portion, Own-Terminal ID Storage Portion

The user input/output accepting portion 3197 accepts various inputs such as selection of introducers, selection of content, and so on from the user of the communication device 3100. The own-terminal ID storage portion 3193 stores the communication device ID of the communication device 3100 itself.

(3-3) Introduction Authorization Sending Management Portion

The introduction authorization sending management portion 3140 includes an introduction authorization sending portion 3147, an introduction authorization generation portion 3145, an introducer isolation portion 3143, and an introducer ID storage portion 3141. Note that the selection of an introducer performed by the viewer is assumed to include not only cases where the viewer randomly selects an introducer but also selections based on introduction histories, introducer evaluation value rankings, and so on presented to the viewer through the user input/output accepting portion 3197. An introducer ID for identifying the introducer is stored in the introducer ID storage portion 3141. Furthermore, the introduction authorization is generated by, for example, associating the viewer ID of the viewer that authorizes the introduction of content with the introducer ID of the communication device that receives the introduction authorization.

Here, descriptions shall be provided using the example shown in FIG. 33, in which the communication device D sends an introduction authorization to the communication device A. The viewer, or the user of the communication device D, selects the communication device A as the introducer of content. The user input/output accepting portion 3197 of the communication device D accepts, from the viewer that is the user of the communication device D, a specification of the communication device A as the introducer that is to introduce content. The introducer isolation portion 3143 isolates the introducer's introducer ID accepted by the user input/output accepting portion 3197, based on the introducer ID storage portion 3141. Next, the introduction authorization generation portion 3145 obtains a viewer ID of "communication device D" from the own-terminal ID storage portion 3193, and receives the introducer ID isolated by the introducer isolation portion 3143. Then, the introduction authorization generation portion 3145 generates an introduction authorization configured of a viewer ID of "communication device D" and an introducer ID of "communication device A". The introduction authorization sending portion 3147 sends the generated introduction authorization to the communication device A.

(3-4) Introduction Information Receiving Management Portion

The introduction information receiving management portion 3150 includes an introduction information receiving portion 3151, a content ID extraction portion 3153, and a content receiving portion 3155. As described earlier, the introduction authorization sending portion 3147 of the communication device D sends an introduction authorization authorizing the communication device D to send introduction information to the communication device A. Through this, the introduction information receiving portion 3151 of the communication device D receives introduction information from the communication device A. Here, the introduction information is configured so as to include, for example, a content ID of "content α", an introducer ID of "communication device A", a viewer ID of "communication device D", and an introduction history having data of "A→", as shown in FIG. 33. The content ID extraction portion 3153 extracts "content α" as the content ID from the introduction information.

The content receiving portion 3155 outputs information regarding the introduced content α to the viewing control portion 3195, which shall be mentioned later. Information regarding the content α is, for example, information that describes an outline of the content α. Here, it is assumed that the content receiving portion 3155 has received a notification that the viewer of the communication device D will view the content α, via the viewing control portion 3195, mentioned later. In this case, the content receiving portion 3155 obtains the storage location of the "content α" from the content ID storage portion 3113, accesses the obtained storage location, and obtains the video data, audio data, or the like of the "content α". Then, this video data, audio data, or the like is outputted to the viewing control portion 3195. Through this, the viewer of the communication device D can view the content α introduced by the communication device A.

(3-5) Introduction History Management Portion

The introduction history management portion 3160 includes an introduction history extraction portion 3161 and an introduction history storage portion 3163. The introduction history extraction portion 3161 extracts the introduction history from the introduction information received by the introduction information receiving portion 3151. For example, the introduction history extraction portion 3161 of the communication device D extracts an introduction history of "A→" from the introduction information. The introduction history storage portion 3163 stores the extracted introduction history on a content-by-content basis. By referring to the extracted introduction history, the viewer of a communication device can select the introducer of content. It should be noted that the introduction history extraction portion 3161 may automatically select the source of the content introduction as the introducer based on the introduction history. Through the introduction history extraction portion 3161 automatically selecting the communication device that first sent the content and setting the introduction authorization, the viewer's chances of receiving highly useful or interesting content increase.

(3-6) Viewing Control Portion

The viewing control portion 3195 receives information regarding the content α introduced by the communication device A from the content receiving portion 3155. The viewing control portion 3195 inquires with the viewer whether or not she/he will view the content α, via the user input/output accepting portion 3197 of the communication device D. When the user input/output accepting portion 3197 accepts input from the viewer indicating she/he will view the content α, the viewing control portion 3195 notifies the content receiving portion 3155 of the viewer's intent. Then, the content receiving portion 3155 obtains the video data, audio data, or the like of the "content α". After this, the viewing control portion 3195 receives the video data, audio data, or the like of the "content α" from the content receiving portion 3155, and outputs this to the user input/output portion.

Furthermore, the viewing control portion 3195 outputs the introduction history within the introduction history storage portion 3163 to the user input/output accepting portion 3197. For example, the viewing control portion 3195 outputs the introduction history "A→" regarding the content α to the user input/output accepting portion 3197, along with inquiring about whether or not the content α will be viewed. Through this, the viewer of the communication device D can select the next introducer with reference to the introduction history of the content α. Alternatively, the viewer can determine whether or not to view the content with reference to the manner in which the content is being introduced.

Furthermore, the viewing control portion 3195 outputs the introducer evaluation value ranking and the content evaluation value ranking received from the ranking receiving portion 3190, which shall be mentioned later, to the user input/output accepting portion 3197. Through this, the viewer of the communication device D can select introducers or content based on the introducer evaluation value ranking and the content evaluation value ranking.

Finally, upon receiving, for example, a notification that the viewer of the communication device D will view the content via the user input/output accepting portion 3197, the viewing control portion 3195 notifies a viewing result generation portion 3181 that the viewer of the communication device D has viewed the content α.

(3-7) Viewing Result Sending Management Portion

The viewing result sending management portion 3180 includes the viewing result generation portion 3181 and a viewing result sending portion 3183. Upon receiving the notification that the viewer of the communication device D will view the content via the viewing control portion 3195, the viewing result generation portion 3181 generates the viewing results based on that notification. At this time, the viewing results are generated so as to include, for example, a viewer ID of "communication device D", a content ID of "content α", "yes" for whether or not the content has been viewed, and an introducer ID of "communication device A". The viewing result sending portion 3183 of the communication device D sends the generated viewing results to the source of the content introduction, which is the communication device A.

(3-8) Introduction Authorization Receiving Management Portion

The introduction authorization receiving management portion 3120 includes an introduction authorization receiving portion 3121, a viewer ID extraction portion 3123, and a viewer ID storage portion 3125. Descriptions shall be provided using the example shown in FIG. 33, where the communication device A receives an introduction authorization from the communication device D and sends introduction information. The introduction authorization receiving portion 3121 of the communication device A receives an introduction authorization from the communication device D. In this case, the introduction authorization receiving portion 3121 of the communication device A receives an introduction authorization configured of a viewer ID of "communication device D" and an introducer ID of "communication device A". This introduction authorization means that the communication device D, which is a viewer, has specified the communication device A as an introducer.

The viewer ID extraction portion 3123 extracts the viewer ID from the introduction authorization received by the introduction authorization receiving portion 3121 in order to identify which communication device the introduction authorization was received from. The viewer ID storage portion 3125 stores the extracted viewer ID and manages which viewer the communication device A has received the introduction authorization from.

(3-9) Introduction Information Sending Management Portion

The introduction information sending management portion 3130 includes a content isolation portion 3131, a viewer isolation portion 3133, an introduction information generation portion 3135, and an introduction information sending portion 3137. As mentioned above, the communication device A has received an introduction authorization from the communication device D, and therefore is capable of sending introduction information including content to the communication device D.

Here, the user input/output accepting portion 3197 accepts a content selection of content and a specification of the viewer to which that content is to be introduced from the introducer, which is the user of the communication device A. Here, selection of content is assumed to include not only cases where content is randomly selected but also selections based on introduction histories, introducer evaluation value rankings, content evaluation value rankings, and so on presented to the viewer through the user input/output accepting portion 3197.

The content isolation portion 3131 isolates the content ID of the content accepted by the user input/output accepting portion 3197 based on the content ID storage portion 3113. Furthermore, the viewer isolation portion 3133 isolates the viewer ID of the viewer accepted by the user input/output accepting portion 3197 based on the viewer ID storage portion 3125. Here, because the communication device A introduces the content α to the communication device D, as shown in FIG. 33, the content isolation portion 3131 and the viewer isolation portion 3133 of the communication device A respectively output a content ID of "content α" and a viewer ID of "communication device D" to the introduction information generation portion 3135. Also, the introduction information generation portion 3135 obtains the ID of the communication device A itself, as the introducer ID, from the own-terminal ID storage portion 3193. Furthermore, based on the content ID from the content isolation portion 3131, the introduction information generation portion 3135 extracts the introduction history of the corresponding content from the introduction history storage portion 3163. Here, the source of the introduction of the content α is the communication device A itself, and therefore the introduction history of the content α is not yet stored within the introduction history storage portion 3163. Therefore, the introduction information generation portion 3135 generates an introduction history of "A→" as the introduction history of the content α. Note that in the case where the introduction history of the corresponding content is stored within the introduction history storage portion 3163, an introduction history in which the introducer ID of the terminal itself is added to the introduction history is generated. For example, in the case where an introduction history of "A→B→" is taken from the introduction history storage portion 3163, and the introducer ID is "communication device C", an introduction history of "A→B→C→" is generated.

Through this, the introduction information generation portion 3135 generates introduction information including a content ID of "content α", a viewer ID of "communication device D", an introducer ID of "communication device A", and an introduction history of "A→". The introduction information sending portion 3137 sends the generated introduction information to the communication device D, which is the viewer.

(3-10) Introducer Evaluation Value Management Portion

The introducer evaluation value management portion 3170 includes a viewing result receiving portion 3171, the viewing result storage portion 3173, an introducer evaluation value calculation portion 3175, an evaluation value data generation portion 3177, and an evaluation value data sending portion 3179.

Using the case shown in FIG. 33, where the communication device A has sent introduction information to the communication device D and the communication device E, as an example, the viewing result receiving portion 3171 of the communication device A receives viewing results from the viewing result sending portions 3183 of the communication device D and the communication device E. The viewing result storage portion 3173 stores these viewing results as illustrated earlier in FIG. 34. The introducer evaluation value calculation portion 3175 calculates an introducer evaluation value for the communication device A itself based on the viewing results stored in the viewing result storage portion 3173. The introducer evaluation value is calculated from the viewing percentage, total number of introductions, number of views, number of re-introductions, and so on of the content, as described earlier.

Furthermore, the introducer evaluation value calculation portion 3175 generates the content introduction status expressing which content the communication device A is introducing, and sends this content introduction status along with the introducer evaluation value to the evaluation value data generation portion 3177. The introducer evaluation value calculation portion 3175 generates the content introduction status by, for example, obtaining the content ID of the content its own terminal introduced from the introduction information generation portion 3135. Here, the content introduction status of the communication device A is generated so as to include, for example, an introducer ID for the communication device A of "communication device A" and content IDs for the content introduced by the communication device A of "content α" and "content β".

The evaluation value data generation portion 3177 generates evaluation value data for sending to the integrating device 3300, based on the introducer evaluation value and content introduction status. Here, the evaluation value data is generated so as to include, for example, the introducer evaluation value, the introducer ID, and the content introduction status. Therefore, assuming the introducer evaluation value of the communication device A is "70", the evaluation value data generation portion 3177 generates evaluation value data including an introducer evaluation value of "70", an introducer ID of "communication device A", and content IDs of "content α" and "content β". The evaluation value data sending portion 3179 sends the generated evaluation value data to the integrating device 3300. Note that the content introduction status may be generated so as to include the number of introductions of each communication device.

(3-11) Ranking Receiving Portion

The ranking receiving portion 3190 receives the introducer evaluation value ranking and content evaluation value ranking from the integrating device 3300, and sends these to the viewing control portion 3195. The viewing control portion 3195 outputs the received rankings to the user input/output accepting portion 3197, thereby presenting the rankings to the user of the communication device.

(4) Functional Configuration of Integrating Device

Figure 42:
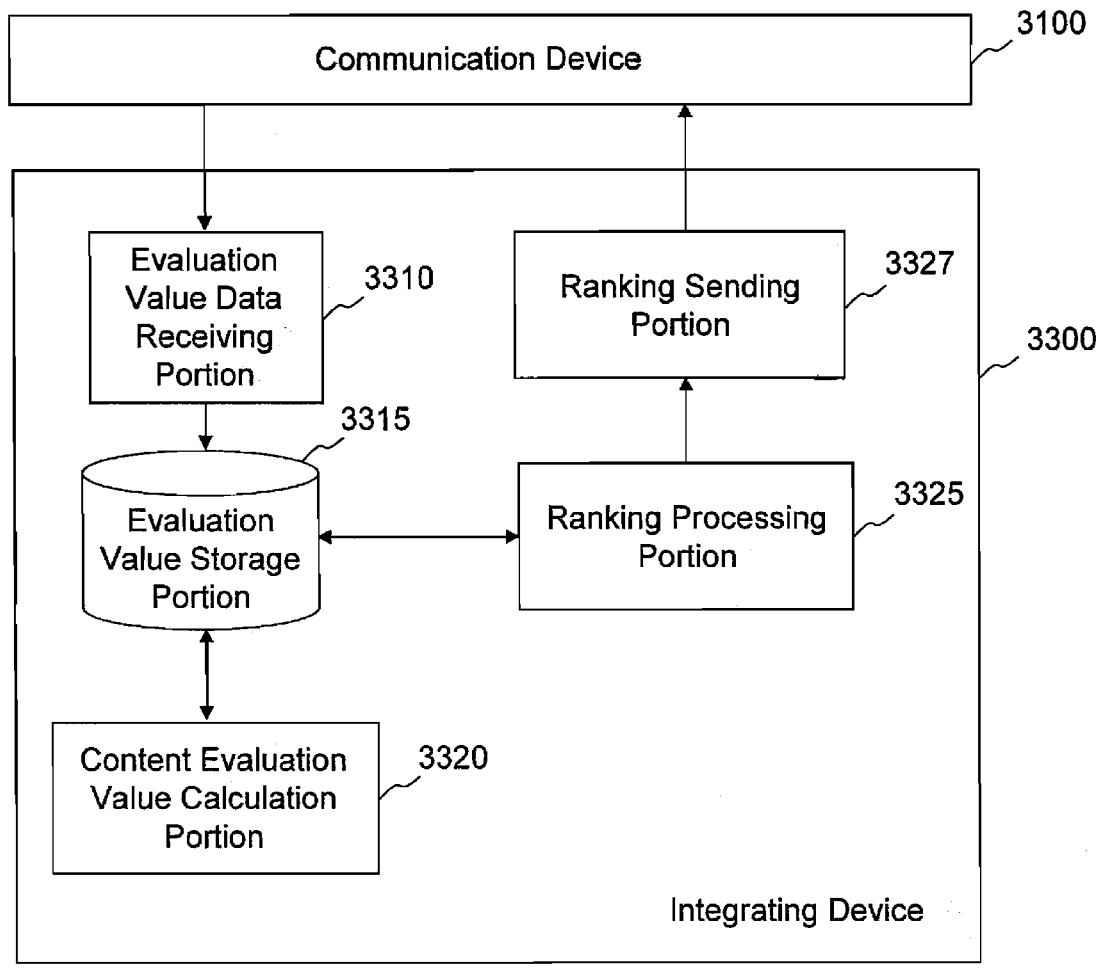
FIG. 42 is a diagram illustrating a functional configuration of an integrating device according to the third embodiment.

Next, the functional configurations of the integrating devices 3300 shall be described. FIG. 42 is a function block diagram of the integrating device 3300. The integrating device 3300 includes an evaluation value data receiving portion 3310, an evaluation value storage portion 3315, a content evaluation value calculation portion 3320, a ranking processing portion 3325, and a ranking sending portion 3327. The functional configuration of each of these portions shall be described hereinafter.

(4-1) Evaluation Value Data Receiving Portion, Evaluation Value Storage Portion

The evaluation value data receiving portion 3310 receives evaluation value data including the introducer evaluation values and content introduction statuses from each of the communication devices 3100. The evaluation value storage portion 3315 stores this evaluation value data. In other words, the evaluation value storage portion 3315 stores the introducer evaluation values shown in FIG. 36 and the content introduction statuses shown in FIG. 37.

(4-2) Content Evaluation Value Calculation Portion

The content evaluation value calculation portion 3320 calculates the content evaluation value based on the introducer evaluation value and content introduction statuses stored in the evaluation value storage portion 3315. The content evaluation value is calculated from, for example, the total of the introducer evaluation values of the communication devices 3100 involved in the introduction of the content, the total number of introductions, the total number of views, the number of re-introductions, and so on, as mentioned earlier. The evaluation value storage portion 3315 stores the content evaluation values calculated by the content evaluation value calculation portion 3320.

(4-3) Ranking Processing Portion and Ranking Sending Portion

The ranking processing portion 3325 ranks the introducers and the content in the manner shown in FIGS. 39 and 40 based on the introducer evaluation values and content evaluation values within the evaluation value storage portion 3315. The ranking sending portion 3327 sends the introducer evaluation value rankings and content evaluation value rankings that have undergone the ranking processing to the ranking receiving portions 3190 of the communication devices 3100.

Figure 43:
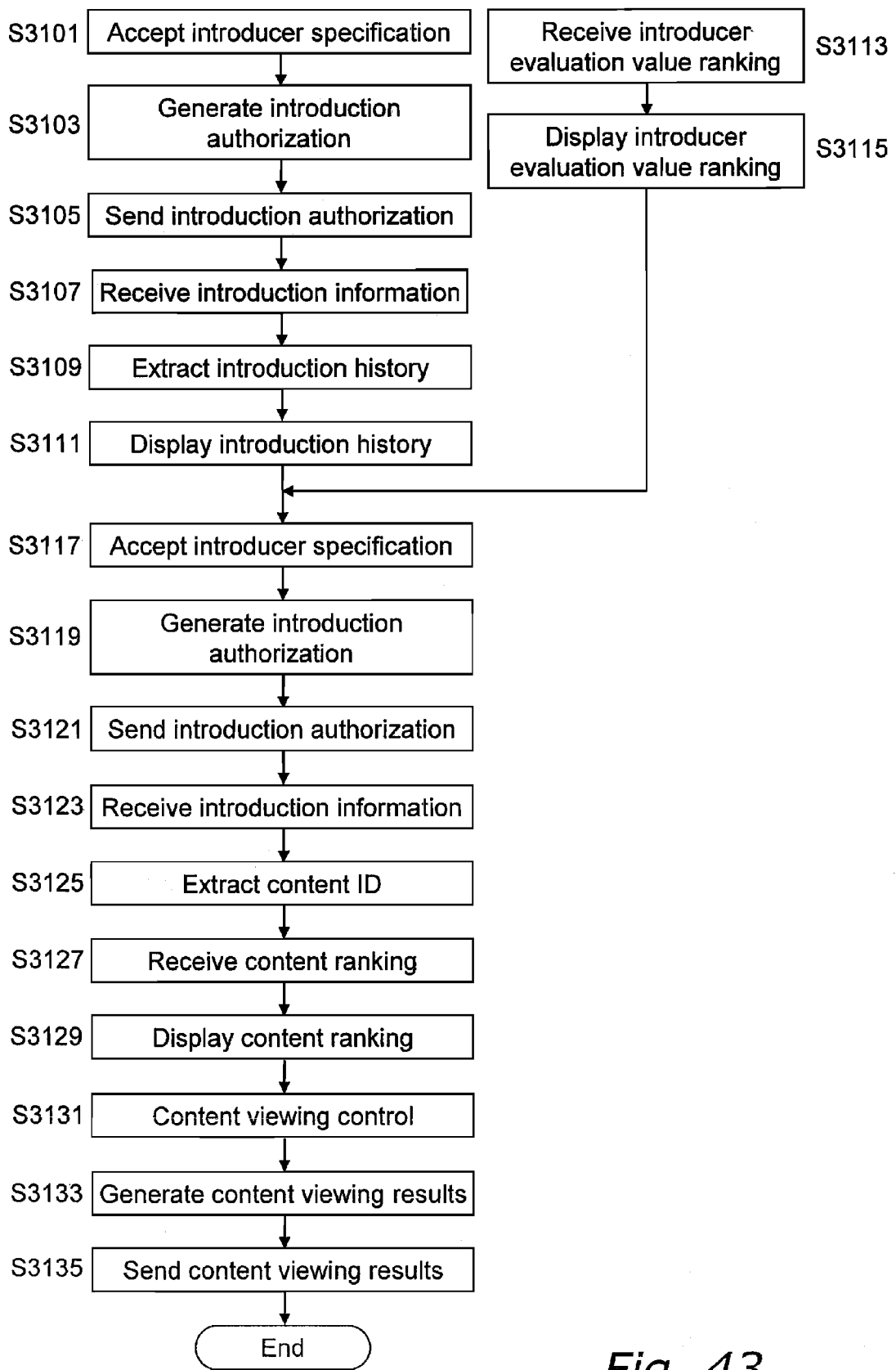
FIG. 43 is a flowchart illustrating an example of introduction authorization sending processing and introduction information receiving processing.

(5) Communication Device Processing (5-1) Introduction Authorization and Viewing Result Sending Processing and Introduction Information Receiving Processing Next, the introduction authorization sending processing and the introduction information receiving processing performed by the communication device 3100 shall be described. FIG. 43 is a flowchart illustrating an example of the introduction authorization sending processing and the introduction information receiving processing.

Step S3101: the user input/output accepting portion 3197 accepts a specification of the introducer from the viewer, who is the user of the terminal itself.

Step S3103: next, the introduction authorization generation portion 3145 generates an introduction authorization configured of a viewer ID of the ID of the terminal itself, and the introducer ID isolated by the introducer isolation portion 3143.

Step S3105: the introduction authorization sending portion 3147 sends the generated introduction authorization to the communication device 3100, which is the introducer.

Step S3107: the introduction information receiving portion 3151 receives the introduction information from the communication device 3100 to which the introduction authorization was sent.

Step S3109: the introduction history extraction portion 3161 extracts the introduction history from the introduction information received by the introduction information receiving portion 3151. The introduction history storage portion 3163 stores the extracted introduction history on a content-by-content basis.

Step S3111: the viewing control portion 3195 outputs the introduction history within the introduction history storage portion 3163 to the user input/output accepting portion 3197, and the introduction history of the content is presented to the viewer thereby.

Steps S3113 and S3115: the ranking receiving portion 3190 receives the introducer evaluation value ranking from the integrating device 3300, and presents the introducer evaluation value ranking to the viewer via the user input/output accepting portion 3197.

Steps S3117 to S3121: the content introduction history is presented along with the introducer evaluation value ranking to the viewer, who is the user of the communication device 3100. Accordingly, the viewer can select an introducer by referring to the introduction history and/or the introducer evaluation value ranking. Here, the user input/output accepting portion 3197 accepts a specification of the introducer from the viewer. The introduction authorization generation portion 3145 generates an introduction authorization configured of the viewer ID and the introducer ID of the specified introducer. The introduction authorization sending portion 3147 sends the generated introduction authorization to the communication device 3100, which is the introducer.

Step S3123: The introduction information receiving portion 3151 receives the introduction information from the communication device 3100 to which the introduction authorization was sent.

Step S3125: the content ID extraction portion 3153 extracts the content ID from the introduction information received from the introduction information receiving portion 3151.

Steps S3127 and S3129: the ranking receiving portion 3190 receives the content evaluation value ranking from the integrating device 3300. The viewing control portion 3195 outputs the content evaluation value ranking to the user input/output accepting portion 3197, thereby presenting the content evaluation value ranking to the user.

Step S3131: furthermore, the content receiving portion 3155 outputs information regarding content, based on the content ID of that content as extracted by the content ID extraction portion 3153, to the viewing control portion 3195, which shall be mentioned later. Here, it is assumed that the content receiving portion 3155 has received a notification that the viewer will view the content, via the viewing control portion 3195. In this case, the content receiving portion 3155 accesses the storage location of the content as obtained from the content ID storage portion 3113, and obtains video data, audio data, or the like. Then, this video data, audio data, or the like is outputted via the viewing control portion 3195 and the user input/output accepting portion 3197.

Steps S3133 and S3135: upon receiving the notification that the viewer will view the content from the viewing control portion 3195, the viewing result generation portion 3181 generates the viewing results based on that notification. The viewing result generation portion 3181 sends the generated viewing results to the communication device 3100, which is the introducer.

Figure 44:
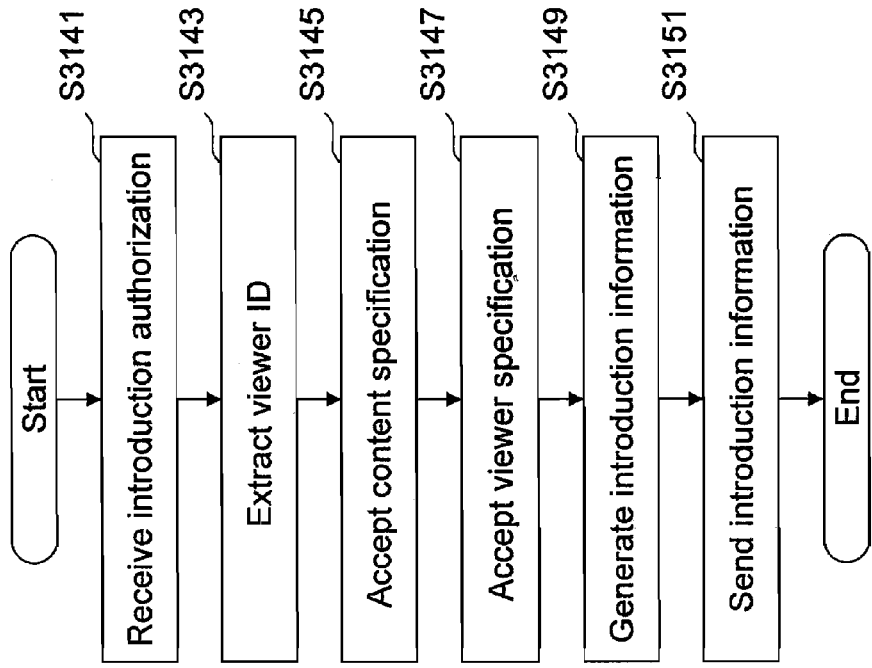
FIG. 44 is a flowchart illustrating an example of introduction authorization receiving processing and introduction information sending processing.

(5-2) Introduction Authorization Receiving Processing and Introduction Information Sending Processing Next, the introduction information receiving processing and the introduction authorization sending processing performed by the communication device 3100 shall be described. FIG. 44 is a flowchart illustrating an example of the introduction authorization receiving processing and the introduction information sending processing.

Step S3141: the introduction authorization receiving portion 3121 receives an introduction authorization configured of a viewer ID and an introducer ID.

Step S3143: the viewer ID extraction portion 3123 extracts the viewer ID from the introduction authorization in order to identify which communication device 3100, or viewer, the introduction authorization was received from. The viewer ID storage portion 3125 stores the extracted viewer ID.

Steps S3145 and S3147: the user input/output accepting portion 3197 accepts a content selection and a specification of the viewer to which that content is to be introduced, from the user of the communication device 3100. The content isolation portion 3131 and the viewer isolation portion 3133 isolate the content IDs and viewer IDs of the selected content and the selected viewers, and output the resultants to the introduction information generation portion 3135.

Step S3149: based on the content IDs, the introduction information generation portion 3135 extracts the introduction history of the corresponding content from the introduction history storage portion 3163. Furthermore, the introduction information generation portion 3135 extracts the ID of its own terminal as the introducer ID from the own-terminal ID storage portion 3193. Then, the introduction information generation portion 3135 generates introduction information including the content ID, the viewer ID, the introducer ID, and the introduction history.

Step S3151: the introduction information sending portion 3137 sends the generated introduction information to the communication device 3100, which is the viewer.

(5-3) Introducer Evaluation Value Calculation Portion

Figure 45:
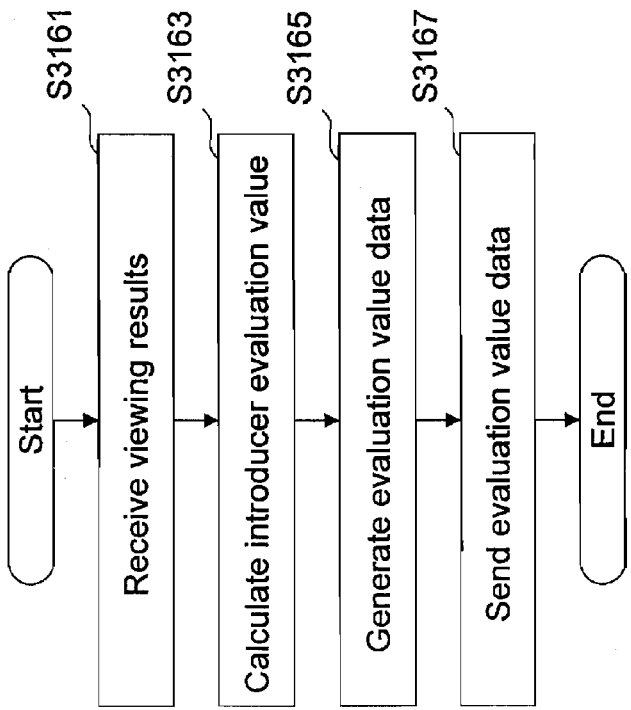
FIG. 45 is a flowchart illustrating an example of introducer evaluation value calculation processing.

Next, the introducer evaluation value calculation processing performed by the communication device 3100 shall be described. FIG. 45 is a flowchart illustrating an example of the introducer evaluation value calculation processing.

Step S3161: the viewing result receiving portion 3171 receives the viewing results from the viewing result sending portion 3183 of the communication device 3100 that is the device to which the introduction information was sent. The viewing result storage portion 3173 stores these viewing results.

Step S3163: the introducer evaluation value calculation portion 3175 calculates an introducer evaluation value for the communication device 3100 itself based on the viewing results stored in the viewing result storage portion 3173. Furthermore, the introducer evaluation value calculation portion 3175 generates the content introduction status expressing which content the communication device 3100 is introducing.

Steps S3165 and S3167: the evaluation value data generation portion 3177 generates the evaluation value data including the introducer evaluation value and the content introduction status. The evaluation value data sending portion 3179 sends the generated evaluation value data to the integrating device 3300.

(6) Integrating Device Processing

Figure 46:
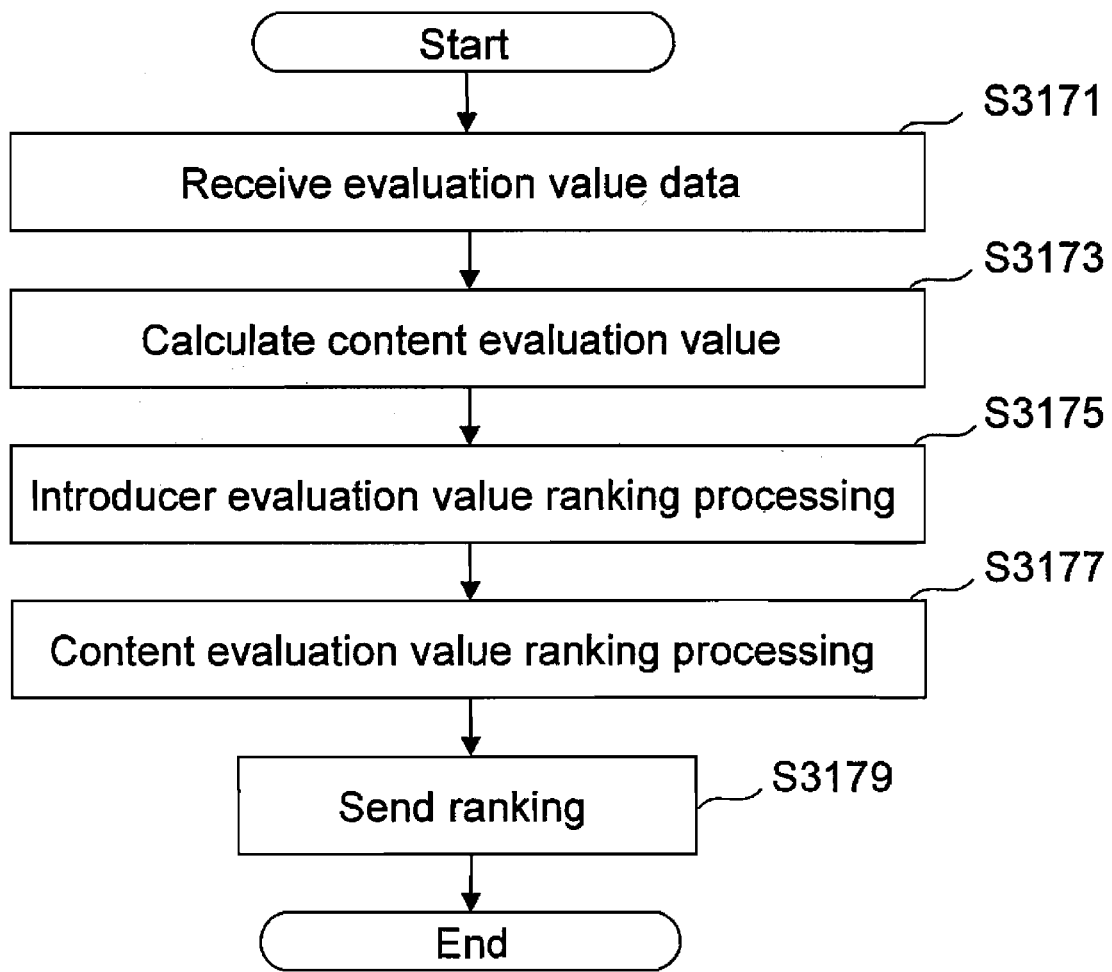
FIG. 46 is a flowchart illustrating an example of ranking processing performed by an integrating device.

Next, the ranking processing performed by the integrating device 3300 shall be explained. FIG. 46 is a flowchart illustrating an example of the ranking processing performed by the integrating device 3300.

Step S3071: the evaluation value data receiving portion 3310 of the integrating device 3300 receives evaluation value data from the evaluation value data sending portions 3179 of the communication devices 3100. The evaluation value storage portion 3315 stores this evaluation value data.

Step S3073: the content evaluation value calculation portion 3320 calculates the content evaluation value based on the introducer evaluation value and content introduction statuses stored in the evaluation value storage portion 3315.

Steps S3075 and S3077: the ranking processing portion 3325 ranks the respective introducer evaluation values and the content evaluation values based on the introducer evaluation values and content evaluation values.

Step S3079: the ranking sending portion 3327 sends the introducer evaluation value rankings and content evaluation value rankings that have undergone the ranking processing to the ranking receiving portions 3190 of the communication devices 3100.

(7) Summary of Effects

The viewer of a communication device can receive not only introduction histories but also introducer evaluation value rankings and content evaluation value rankings. Accordingly, she/he can select the introducer to which to send an introduction authorization, the content to view, and the content to introduce, with reference to these pieces of information. Therefore, the viewer's degree of freedom regarding the selection of the introducer and content is improved.

For example, the viewer can select an introducer from among the introducers involved in the introduction of the content with reference to the introduction history. By selecting an introducer from the introduction history, the chances that the viewer can receive highly useful or interesting content increase. Furthermore, the chances that the viewer can receive highly useful or interesting content also increase in the case where a communication device that is high in the introducer evaluation value ranking is selected as an introducer. Referring to the content evaluation value ranking makes it possible to make judgments based on the content evaluation values, such as whether the introduced content is highly useful or interesting content. Accordingly, the viewer can determine whether or not to view the introduced content or select the content to be introduced to the viewer based on this content evaluation value ranking. By referring to the introduction history of the introduced content, the viewer can determine whether or not to view the content.

Furthermore, the viewer sending an introduction authorization to the introducer communication device makes it possible to avoid content being sent from a specific user in a one-sided manner while at the same time reflecting the intent of the viewer regarding which introducer to receive content from. The introducer communication device can also avoid wasteful sending of content.

The range of content that is viewed tends to be constrained in the case where content introductions are received with the range of content being limited in advance. However, by limiting the communication devices that are introduced through the use of introduction authorizations, it is possible to prevent the content from being constrained more than in the case where the range itself of the content is directly limited.

(8) Variations (i)

Figure 47:
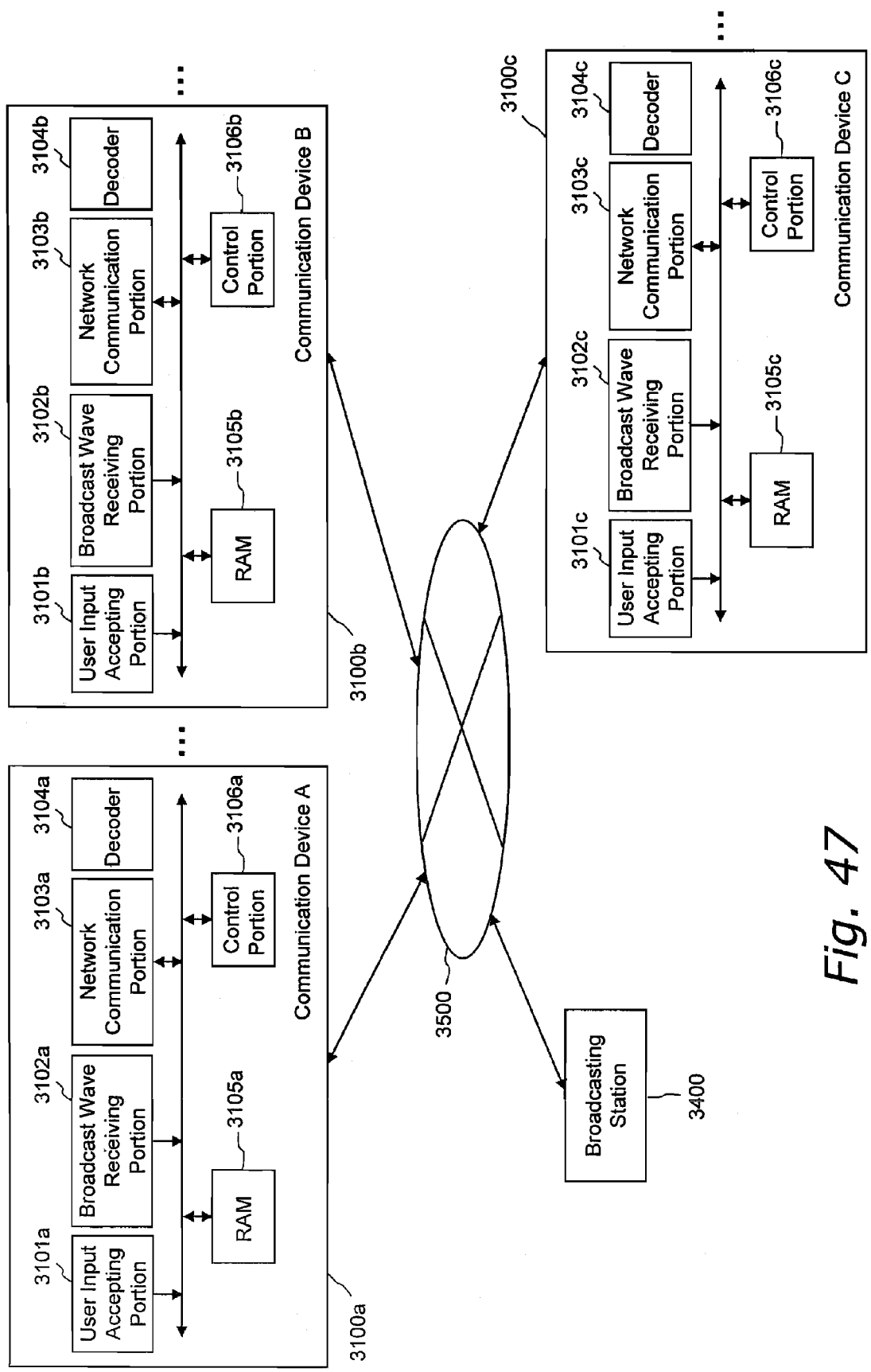
FIG. 47 illustrates a network configuration in which an integrating device is not included.
Figure 48:
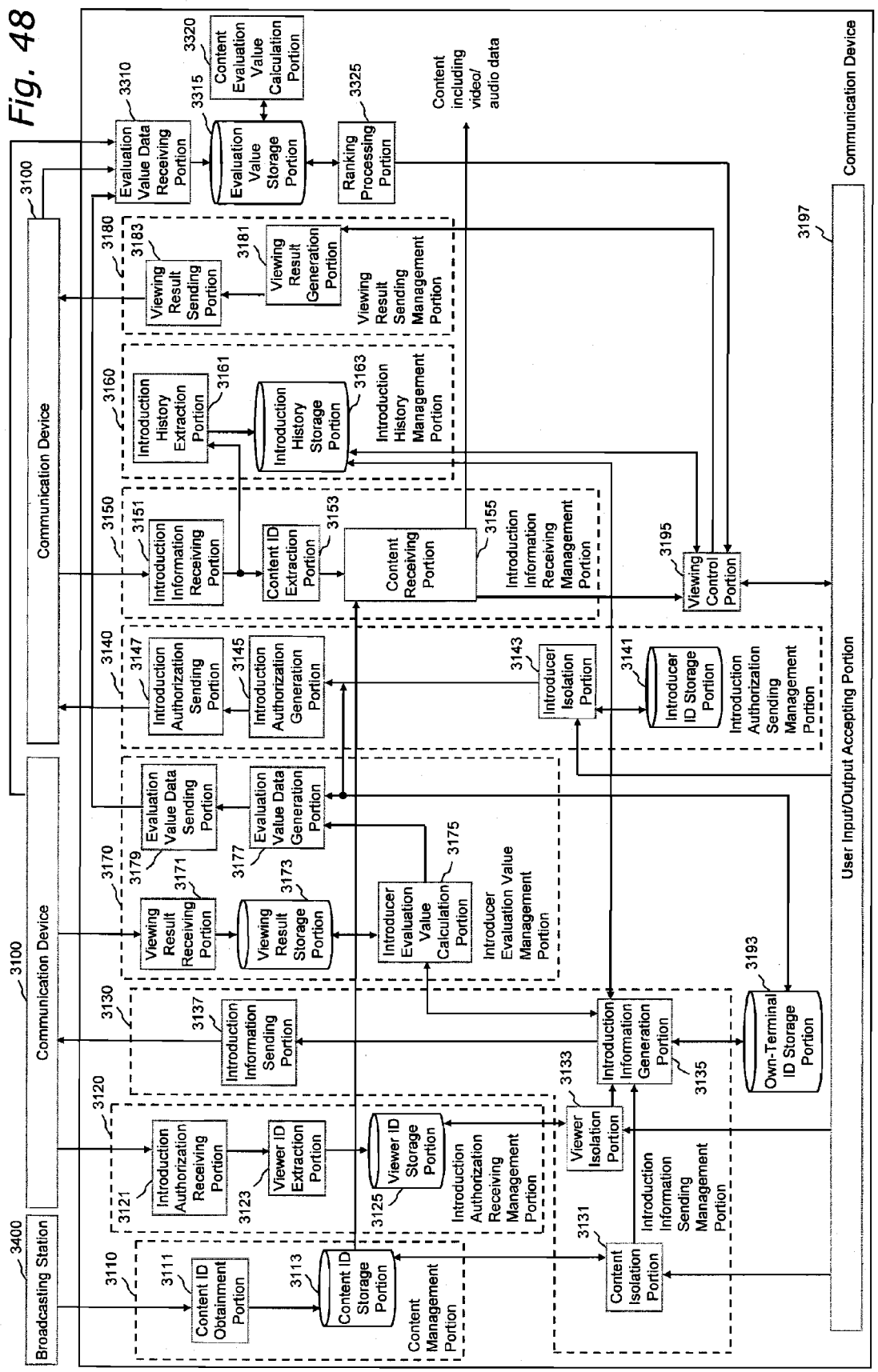
FIG. 48 illustrates a functional configuration of a communication device in the network configuration illustrated in FIG. 47.

In the above third embodiment, the integrating device ranks the introducer evaluation values and the content evaluation values. However, the communication devices may be provided with functionality to rank the introducer evaluation values and content evaluation values. In such a case, the integrating device is not necessary on the network. FIG. 47 illustrates a network configuration in the case where the integrating device is not included, and FIG. 48 illustrates the functional configuration of a communication device in the network configured as shown in FIG. 47. In this case, each communication device can collect evaluation value data from other communication devices, calculate the introducer evaluation values and content evaluation values using the collected evaluation value data and its own evaluation value data, and rank these.

(ii)

Figure 49:
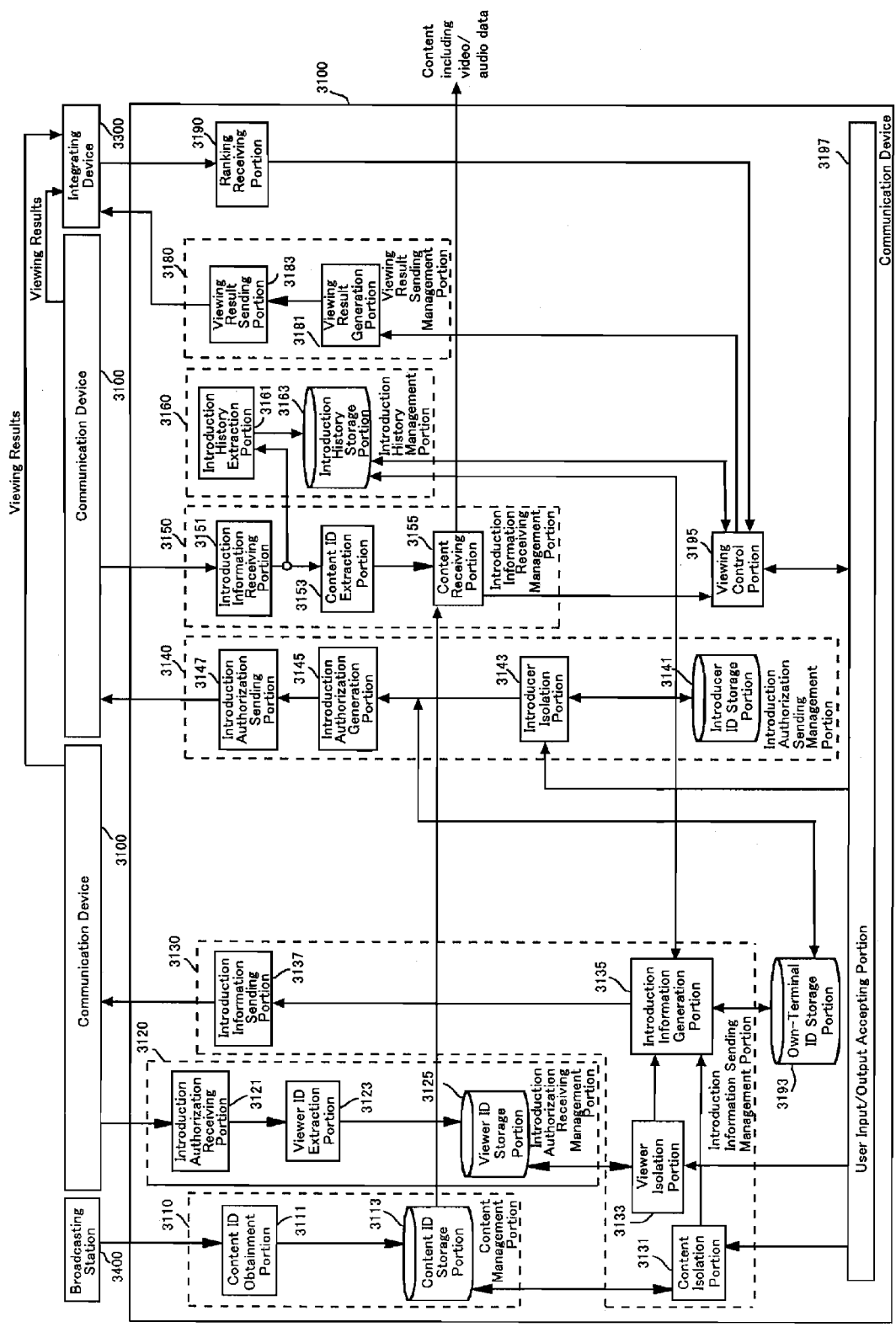
FIG. 49 illustrates a functional configuration of a communication device in the case where the communication device sends viewing results to an integrating device.
Figure 50:
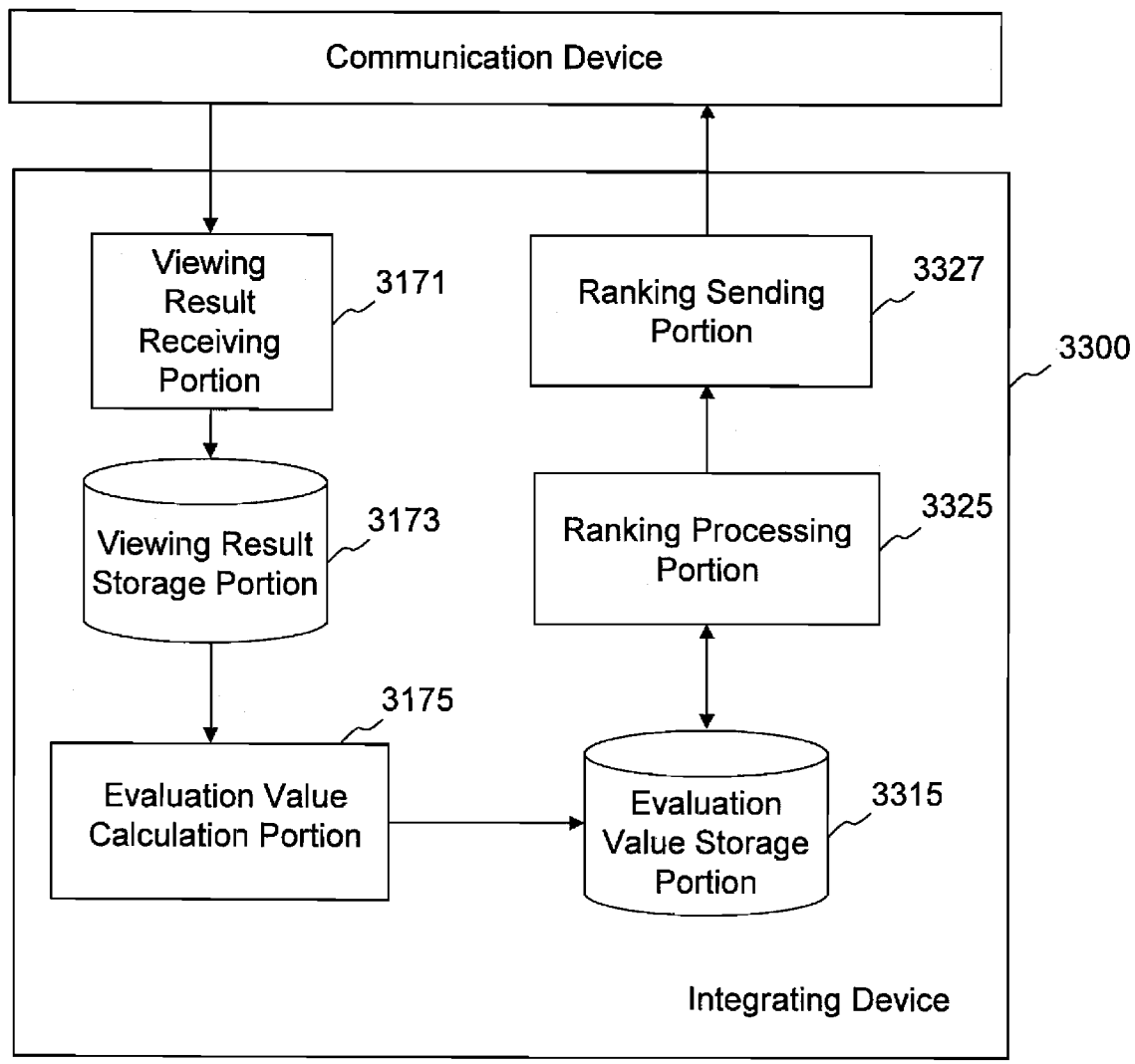
FIG. 50 is a block diagram illustrating a functional configuration of an integrating device that calculates evaluation values based on received viewing results and ranks the evaluation values.

In the above third embodiment, each communication device calculates an introducer evaluation value and sends evaluation value data to the integrating device. However, each communication device may send viewing results to the integrating device, and the integrating device may calculate and rank the introducer evaluation values and content evaluation values, in the same manner as in the second embodiment. The ranking results may then be sent from the integrating device to each communication device. FIG. 49 illustrates a functional configuration of the communication device in the case where the communication device sends the viewing results to the integrating device. FIG. 50 is a block diagram illustrating the functional configuration of the integrating device that calculates the evaluation values based on the received viewing results and ranks the evaluation values; this is the same configuration as that shown in FIG. 28 and described in the second embodiment.

(iii)

Figure 51:
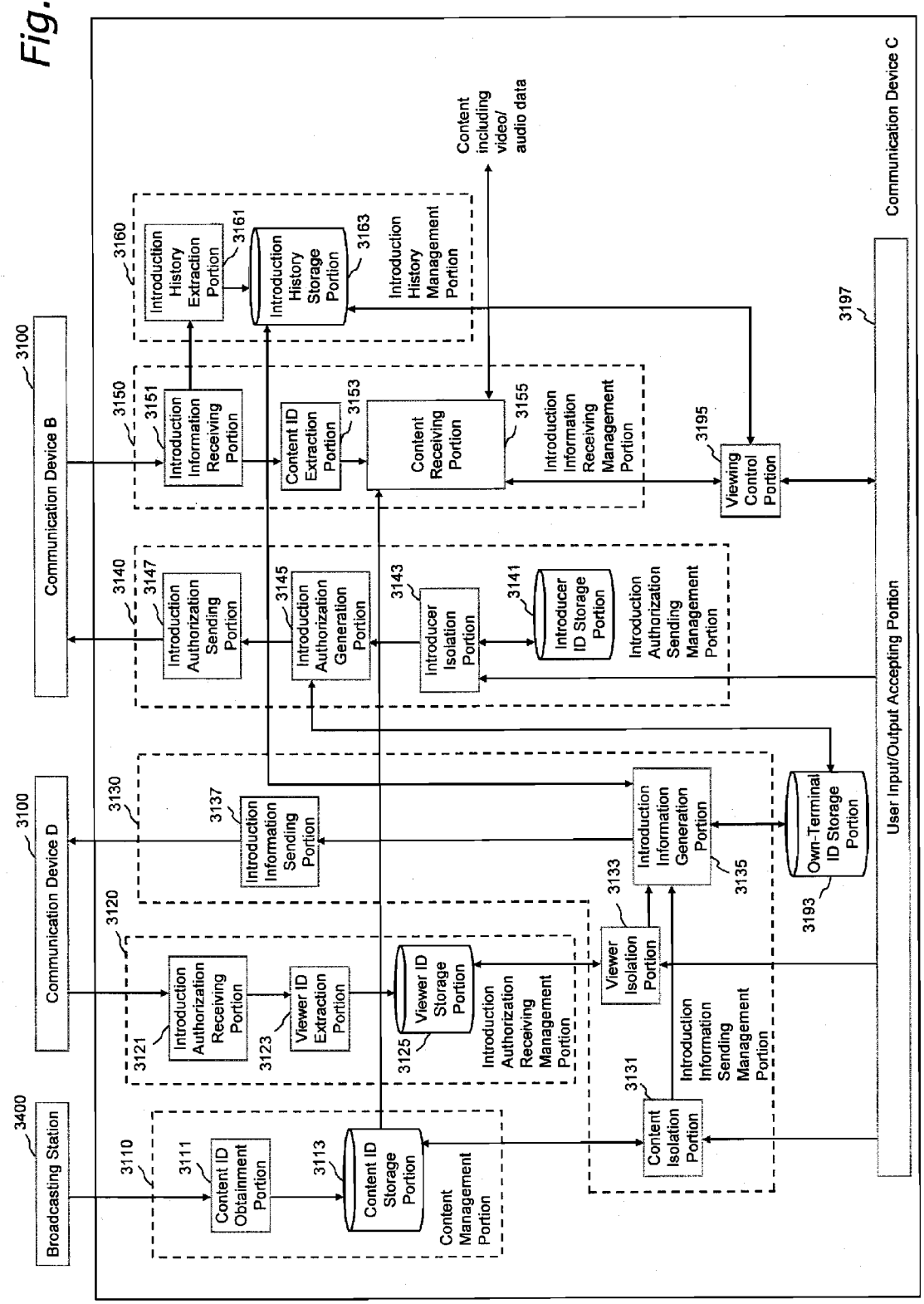
FIG. 51 is a block diagram illustrating a functional configuration of a communication device in the case where only the introduction history is sent.

In the above third embodiment, the communication devices send and receive the introducer evaluation value rankings, content evaluation value rankings, and introduction histories to and from other communication devices. However, the configuration may be such that any one of these is sent and received to and from the other communication devices; for example, the communication device may send and receive only the introduction history. FIG. 51 is a block diagram illustrating the functional configuration of the communication device in the case where only the introduction information, which includes the introduction history, is sent and received. The communication device in FIG. 51 improves the degree of freedom in terms of introducer selection and content selection by referring to the introduction history, in the same manner as described above.

Other Embodiments (1) Integrated Circuit

The functional configurations of the communication device illustrated in FIG. 12, the communication device illustrated in FIG. 13, and the integrating device shown in FIG. 14 and described in the first embodiment, the functional configurations of the communication device illustrated in FIG. 26, the communication device illustrated in FIG. 27, and the integrating device shown in FIG. 28 and described in the second embodiment, and the functional configurations of the communication device illustrated in FIG. 41 and the integrating device shown in FIG. 42 and described in the third embodiment can typically be implemented by an LSI, or an integrated circuit. These devices can be implemented individually as single chips, or may be implemented with a single chip including some or all of the devices.

Although "LSI" (Large-Scale Integration) is mentioned here, the circuit may be called "IC" (Integrated Circuit), a "system LSI", a "super LSI", an "ultra LSI", and so on depending on the degree of integration.

Furthermore, the method for implementing the integrated circuit is not limited to LSI; the circuit may be implemented through a dedicated circuit, a generic processor, or the like. An FPGA (Field Programmable Gate Array) capable of post-production programming or a reconfigurable processor in which the connections and settings of the circuit cells within the LSI can be reconfigured may be used as well.

Additionally, should technology for implementing integrated circuits that can replace LSI appear due to advancements in semiconductor technology or the appearance of different technologies, the integration of the above functional blocks may be performed using such technology. The application of biotechnologies is a possibility as well.

(2) Program and Storage Medium

A computer program that causes a computer to execute the aforementioned methods and a computer-readable storage medium in which that program is stored also fall within the scope of the present invention. Here, a flexible disk, hard disk, CD-ROM, MO, DVD, DVD-ROM, DVD-RAM, BD (Blu-Ray Disc), semiconductor memory, and the like can be given as examples of computer-readable storage mediums.

The stated computer program is not limited to a program stored in the stated storage medium; the compute program may be transmitted through an electric communication line, a wireless or hard-wired communication line, a network as represented by the Internet, or the like.

The content introduction system of the present invention is useful as technology for realizing a scheme in which users central to current topics are presented to a user and that user is notified of the users that are central to the current topics, whereupon the user from which content is to be introduced is selected from among the users and provided with authorization to introduce the content, after which the content is introduced.

The invention claimed is:

1. A first communication device including a sending/receiving unit for sending content to and receiving content from a second communication device in a communication network including a plurality of communication devices, the first communication device comprising:
    an introduction information receiving unit operable to receive, from the second communication unit, content identification information for identifying the content, introducer identification information for identifying the second communication device as a sender of the content to the first communication device, and an introduction history including identification information for identifying a communication device that originally sent the content and identification information for identifying any other communication device that sent the content after being sent by the communication device that originally sent the content and before being received by the second communication device;
    an evaluation value calculation unit operable to calculate an evaluation value based on the introduction history as an evaluation element for evaluating a value of content senders;
    an evaluation value receiving unit operable to receive an evaluation value from each communication device other than the first communication device;
    a ranking generation unit operable to rank an evaluation value of the first communication device and the evaluation value for each communication device other than the first communication device, and generate an evaluation value ranking; and
    a presentation unit operable to present the evaluation value ranking and the introduction history to a user of the first communication device.

2. The first communication device according to claim 1,
    wherein the evaluation element further includes an introducer evaluation element for evaluating a value of a content sender or a content evaluation element for evaluating a value of the content,
    an evaluation value further includes an introducer evaluation value calculated based on the introducer evaluation element and a content evaluation value calculated based on the content evaluation element, and
    the evaluation value ranking includes an introducer evaluation value ranking that is a result of ranking the introducer evaluation value and a content evaluation value ranking that is a result of ranking the content evaluation value.

3. The first communication device according to claim 1, further comprising:
    an introduction authorization receiving unit operable to receive an introduction authorization authorizing sending of the content or the content identification information from each communication device other than the first communication device,
    wherein the sending/receiving unit sends the content to a communication device that is the source of the introduction authorization, and
    the evaluation element is a number of the introduction authorizations received by the introduction authorization receiving unit.

4. The first communication device according to claim 1, wherein the evaluation element further includes a number of introductions of the content or the content identification information.

5. The first communication device according to claim 1, wherein the evaluation element further includes a number of pieces of content aside from the sent content or a number of views of content aside from the sent content.

6. The first communication device according to claim 1, further comprising:
    a viewing result receiving unit operable to receive, from a communication device to which the content has been sent, a viewing result indicating whether or not the user of the communication device to which the content has been sent has viewed the content sent by the first communication device or the content corresponding to the content identification information sent by the first communication device,
    wherein the evaluation element further includes the viewing result.

7. The first communication device according to claim 6,
    wherein the viewing result is a number of times the content sent by the first communication device or the content corresponding to the content identification information sent by the first communication device has been viewed by the user of the communication device to which the content was sent, or a ratio of a number of views to the number of introductions of the content or of the content identification information performed by the first communication device.

8. The first communication device according to claim 1, further comprising:
    a viewing result receiving unit operable to receive, from a communication device to which the content was directly sent, a viewing result indicating whether or not the content has been viewed by the user of a communication device subsequent to the communication device to which the content was directly sent, or an introducer evaluation value of the communication device to which the content was directly sent calculated based on the viewing result, in addition to the viewing result indicating whether or not the user of the communication device to which the content was directly sent has viewed the content sent by the first communication device or the content corresponding to the content identification information sent by the first communication device, wherein the evaluation element further includes the viewing result or the introducer evaluation value of the communication device to which the content was directly sent.

9. The first communication device according to claim 1, wherein the sending/receiving unit receives the introduction information that has been sent to or received by among each communication device other than the first communication device.

10. The first communication device according to claim 9, wherein the presentation unit further presents, to the user of the first communication device, the introduction information or an introduction path model obtained by integrating and diagramming the introduction information.

11. The first communication device according to claim 10, further comprising:
a third introduction authorization sending unit operable to refer to the introduction information or the introduction path model and operable to send an introduction authorization authorizing the content to be sent to the first communication device.

12. The first communication device according to claim 1, further comprising:
an introduction information generation unit operable to generate introduction information in which the content identification information of the content received by the sending/receiving unit, communication device identification information for identifying the first communication device, and an introduction history including identification information for identifying the communication device that originally sent the content and identification information for identifying any other communication device that sent the content after being sent by the communication device that originally sent the content and before being sent to the first communication device, are associated with one another,
wherein the sending/receiving unit sends the introduction information to a communication device to which the content is re-sent.

13. The first communication device according to claim 1, further comprising:
an introduction authorization sending unit operable to send an introduction authorization authorizing other content to be sent to the first communication device, based on the introduction history, to the communication device that originally sent the content or to any other communication device that sent the content after being sent by the communication device that originally sent the content and before being received by the second communication device.

14. A communication method for a first communication device of sending content to and receiving content from a second communication device in a communication network including a plurality of communication devices, the communication method comprising:
receiving, using an introduction information receiving unit, from the second communication unit, content identification information for identifying content, introducer identification information for identifying the second communication device as a sender of the content to the first communication device, and an introduction history including identification information for identifying a communication device that originally sent the content and identification information for identifying any other communication device that sent the content after being sent by the communication device that originally sent the content and before being received by the second communication device;
calculating, using an evaluation value calculation unit, an evaluation value based on the introduction history as an evaluation element for evaluating a value of a content sender;
receiving, using an evaluation value receiving unit, an evaluation value from each communication device other than the first communication device;
ranking, using a ranking generation unit, an evaluation value of the first communication device and the evaluation value for each communication device other than the first communication device, and generating an evaluation value ranking; and
presenting, using a presentation unit, the evaluation value ranking and the introduction history to a user of the first communication device.

15. A non-transitory computer-readable storage medium storing a communication program to be executed by a first communication device for sending content to and receiving content from a second communication device in a communication network including a plurality of communication devices, the communication program causing the first communication device to perform steps comprising:
receiving from the second communication unit, content identification information for identifying content, introducer identification information for identifying the second communication device as a sender of the content to the first communication device, and an introduction history including identification information for identifying a communication device that originally sent the content and identification information for identifying any other communication device that sent the content after being sent by the communication device that originally sent the content and before being received by the second communication device;
calculating an evaluation value based on the introduction history as an evaluation element for evaluating a value of a content sender;
receiving an evaluation value from each communication device other than the first communication device;
ranking an evaluation value of the first communication device and the evaluation value for each communication device other than the first communication device, and generating an evaluation value ranking; and
presenting the evaluation value ranking and the introduction history to a user of the first communication device.

16. An integrated circuit for a first communication device including a sending/receiving unit for sending content to and receiving content from a second communication device in a communication network including a plurality of communication devices, the integrated circuit comprising:
an introduction information receiving unit operable to receive, from the second communication unit, content identification information for identifying the content, introducer identification information for identifying the second communication device as a sender of the content to the first communication device, and an introduction history including identification information for identifying a communication device that originally sent the content and identification information for identifying any other communication device that sent the content after being sent by the communication device that originally sent the content and before being received by the second communication device;

an evaluation value calculation unit operable to calculate an evaluation value based on the introduction history as an evaluation element for evaluating a value of a content sender;

an evaluation value receiving unit operable to receive an evaluation value from each communication device other than the first communication device;

a ranking generation unit operable to rank an evaluation value of the first communication device and the evaluation value for each communication device other than the first communication device, and generate an evaluation value ranking; and a presentation unit operable to present the evaluation value ranking and the introduction history to a user of the first communication device.

* * * * *